(12) United States Patent
Ohsawa et al.

(10) Patent No.: US 7,243,345 B2
(45) Date of Patent: Jul. 10, 2007

(54) MULTI-THREAD EXECUTING METHOD AND PARALLEL PROCESSING SYSTEM

(75) Inventors: Taku Ohsawa, Tokyo (JP); Satoshi Matsushita, Tokyo (JP)

(73) Assignee: NEC Corporation, Tokyo (JP)

( * ) Notice: Subject to any disclaimer, the term of this patent is extended or adjusted under 35 U.S.C. 154(b) by 554 days.

(21) Appl. No.: 10/189,455

(22) Filed: Jul. 8, 2002

(65) Prior Publication Data

US 2003/0014473 A1    Jan. 16, 2003

(30) Foreign Application Priority Data

Jul. 12, 2001   (JP) .............................. 2001-212247

(51) Int. Cl.
*G06F 9/45* (2006.01)
*G06F 9/44* (2006.01)

(52) U.S. Cl. ...................................... 717/149; 717/119

(58) Field of Classification Search ................ 717/119, 717/127, 140, 146, 149; 712/216, 248, 228, 712/25, 26; 718/104, 106–107; 709/209
See application file for complete search history.

(56) References Cited

U.S. PATENT DOCUMENTS

| | | | | |
|---|---|---|---|---|
| 4,953,078 A | * | 8/1990 | Petit ............................. | 712/248 |
| 5,560,029 A | * | 9/1996 | Papadopoulos et al. ....... | 712/25 |
| 5,717,926 A | * | 2/1998 | Browning et al. ........... | 718/104 |
| 5,812,811 A | * | 9/1998 | Dubey et al. ................ | 712/216 |
| 5,900,025 A | * | 5/1999 | Sollars ........................ | 712/248 |
| 5,913,059 A | | 6/1999 | Torii | |
| 6,049,867 A | * | 4/2000 | Eickemeyer et al. ......... | 712/228 |
| 6,061,710 A | * | 5/2000 | Eickemeyer et al. ......... | 718/107 |
| 6,076,157 A | * | 6/2000 | Borkenhagen et al. ...... | 712/228 |
| 6,389,446 B1 | | 5/2002 | Torii | |

FOREIGN PATENT DOCUMENTS

| | | |
|---|---|---|
| GB | 2340271 A | 2/2000 |
| JP | 08-249183 | 9/1996 |
| JP | 10-27108 | 1/1998 |

(Continued)

OTHER PUBLICATIONS

Pritpal S. Ahuja et al., "Multipath Execution: Opportunities and Limits", Jul. 1998, ACM Press, pp. 101-108.*

(Continued)

*Primary Examiner*—Wei Zhen
*Assistant Examiner*—Anna Deng
(74) *Attorney, Agent, or Firm*—Foley & Lardner LLP

(57) ABSTRACT

In a multi-thread executing method of dividing a single program into a plurality of threads and executing the program by a plurality of processors in parallel, at a time of every fork instruction of the executing thread, when there already exists a child thread generated form the above thread, the program cancels the child thread or makes invalid all the fork instructions other than the first fork instruction having succeeded in forking the child thread, hence to select one fork instruction for creating an effective child thread from a plurality of fork instructions existing within a parent thread, during the execution of the parent thread. Therefore, it can assure the Fork-Once limitation at a time of the program execution.

36 Claims, 38 Drawing Sheets

FOREIGN PATENT DOCUMENTS

| | | |
|---|---|---|
| JP | 10-78880 | 3/1998 |
| JP | 2000-047887 | 2/2000 |
| JP | 2001-282549 | 10/2001 |
| JP | 2001-282549 A | 10/2001 |

OTHER PUBLICATIONS

Torii, Sunao et al., Proposal for a MUSCAT on-chip control parallel processor. *Jōhō Shori Gakkai Ronbunshi* [Papers of the Information Processing Society], Japan, Information Processing Society, Jun. 1998, vol. 39, No. 6, pp. 1622-1631.

Osawa, Taku et al, Investigation of the mixed thread execution scheme under MUSCAT. *Jōhō Shori Gakkai Kenkyū Hōkoku* [Information Processing Society Research Reports], Japan, Information Processing Society, Aug. 4, 1999, vol. 99, No. 67, pp. 169-174.

Culler, "Suggestion of On-Chip Multiprocessor-Oriented Multi-Stream Control Architecture MSCAT", papers of Joint Symposium on Parallel Processing JSSPP97, Information Processing Society of Japan, May 1997) pp. 229-236.

\* cited by examiner

FIG. 1

(a)
```
INSTRUCTION 0
INSTRUCTION 1
INSTRUCTION 2
INSTRUCTION 3
INSTRUCTION 4
    :
```

(b)
```
      fork th1
      INSTRUCTION 0
      fork th2
      INSTRUCTION 1
      term th2
th2   INSTRUCTION 2
      term th1
th1   INSTRUCTION 3
      INSTRUCTION 4
         :
```

(e)
```
      fork th1
      INSTRUCTION 0
      fork th2
      INSTRUCTION 1
th2   INSTRUCTION 2
th1   INSTRUCTION 3
      INSTRUCTION 4
         :
```

(c)
```
PE1                   PE2
fork th1    ───────▶  INSTRUCTION 3
INSTRUCTION 0         (CANCEL)
fork th2    ───────▶  INSTRUCTION 2
INSTRUCTION 1         term th1(INVALID)
term th2              INSTRUCTION 3
                      INSTRUCTION 4
                           :
```

(f)
```
PE1                   PE2
fork th1    ───────▶  INSTRUCTION 3
INSTRUCTION 0         (CANCEL)
fork th2    ───────▶  INSTRUCTION 2
INSTRUCTION 1         INSTRUCTION 3
(term)                INSTRUCTION 4
                           :
```

(d)
```
PE1                   PE2
fork th1    ───────▶  INSTRUCTION 3
INSTRUCTION 0         INSTRUCTION 4
fork th2(INVALID)          :
INSTRUCTION 1
term th2(INVALID)
INSTRUCTION 2
term th1
```

(g)
```
PE1                   PE2
fork th1    ───────▶  INSTRUCTION 3
INSTRUCTION 0         INSTRUCTION 4
fork th2(INVALID)          :
INSTRUCTION 1
INSTRUCTION 2
(term)
```

FIG. 8
(a)
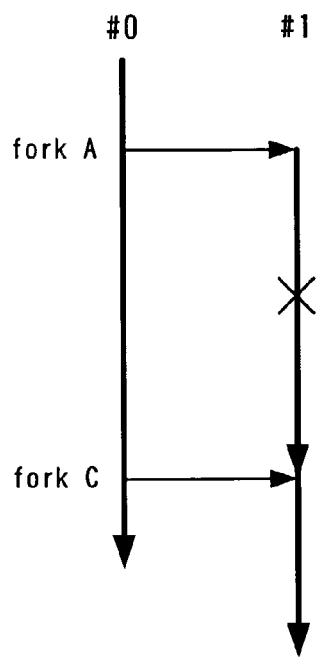
(b)
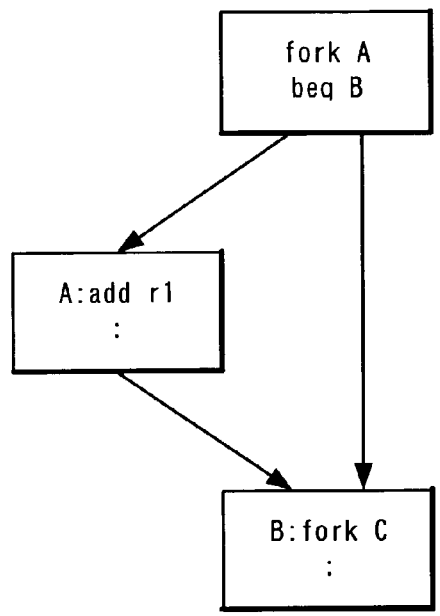
(c)
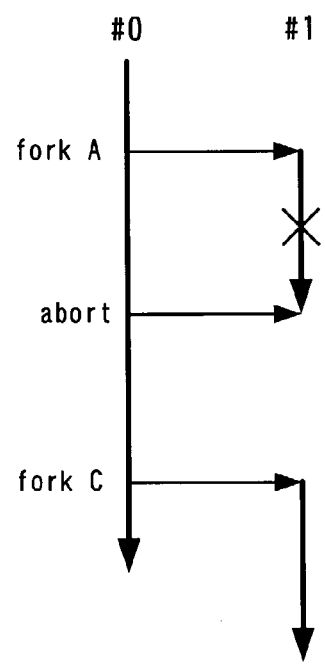
(d)
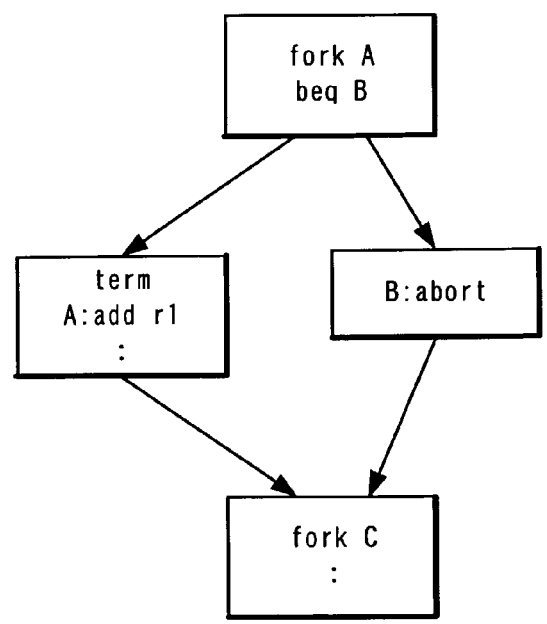

FIG. 9
(a) 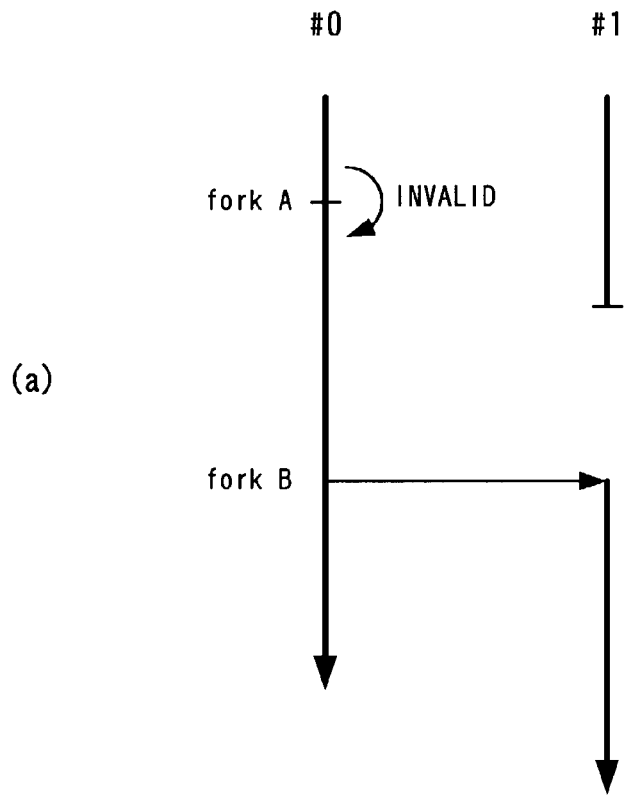
(b) 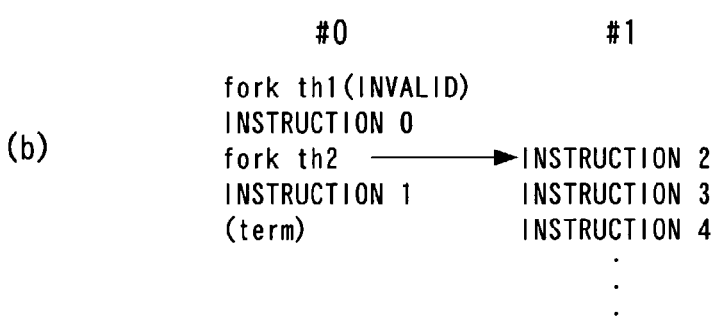
(c) 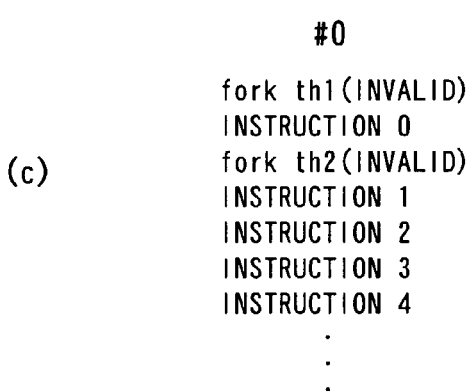

MULTI-THREAD EXECUTING METHOD AND PARALLEL PROCESSING SYSTEM

BACKGROUNDS OF THE INVENTION

1. Field of the Invention

The present invention relates to a program parallel executing method in a parallel processing system, and more particularly to a multi-thread executing method and a parallel processing system for dividing a single program into a plurality of threads and executing the above program in parallel by a plurality of processors.

2. Description of the Related Art

As a method of processing a single program in parallel by a parallel processing system, there is a multi-thread executing method of dividing a program into instruction flows called as threads and executing the above program by a plurality of processors in parallel. As the articles describing this method, there are Japanese Patent Publication Laid-Open No. 10-27108 (hereinafter, referred to as article 1), "Suggestion of On-Chip Multiprocessor-Oriented Multi-Stream Control Architecture MUSCAT" (pp. 229–236, papers of Joint Symposium on Parallel Processing JSPP97, Information Processing Society of Japan, May 1997) (hereinafter, referred to as article 2), Japanese Patent Publication Laid-Open No. 10-78880 (hereinafter, referred to as article 3). The conventional technique described in these articles will be described below.

In a general multi-thread executing method, to generate a new thread on another processor is said as "fork a thread", a thread on the side of performing the fork operation is called as a parent thread, a newly generated thread is called as a child thread, a position to fork a thread is called as a fork point, and a head position of a child thread is called as a fork destination address or a starting point of a child thread. In the articles 1 to 3, a fork instruction is inserted in a fork point in order to fork a thread. A fork destination address is specified in the fork instruction, a child thread starting from the fork destination address is generated in another processor by the execution of the fork instruction, and the execution of the child thread is started. Further, an instruction called as a term instruction for finishing the processing of a thread is prepared, and each processor finishes the processing of a thread by executing the term instruction.

FIG. 37 shows an outline of the processing of the conventional multi-thread executing method. FIG. 37(a) shows a single program divided into three threads A, B, and C. When a single processor processes the program, one processor PE sequentially processes the threads A, B, and C, as illustrated in FIG. 37(b). On the contrary, in the multi-thread executing method in the articles 1 to 3, one processor PE1 executes the thread A, and the thread B is generated in the other processor PE2 according to the fork instruction embedded in the thread A, while the processor PE1 is executing the thread A, and then the processor PE2 executes the thread B, as illustrated in FIG. 37(c). The processor PE2 generates the thread C in the processor PE3 according to the fork instruction embedded in the thread B. The processors PE1 and PE2 finish the processing of the threads according to the term instructions embedded just before the starting points of the respective threads B and C, and when the processor PE3 executes the last instruction of the thread C, it executes the next instruction (generally, a system call instruction). As mentioned above, simultaneous execution of threads in parallel by a plurality of processors can improve the performance, compared with the serial processing.

As the other conventional multi-thread executing method, as illustrated in FIG. 37(d), there is a multi-thread executing method in which the processor PE1 executing the thread A performs a plurality of times of fork, so to generate the thread B in the processor PE2 and the thread C in the processor PE3 respectively. Contrary to the model of FIG. 37(d), the multi-thread executing method, as illustrated in FIG. 37(c), which is restricted to only one generation of an effective child thread according to a thread during its existence, is called as a Fork-Once Parallel Execution model. The Fork-Once Parallel Execution model can simplify the thread management greatly and a thread controller can be realized by hardware on a realistic hardware scale. Since in the individual processors, the other processor of creating a child thread is restricted to one processor, a parallel processing system with the adjacent processors connected with each other in a single direction like a ring, enables multi-thread execution. The present invention is assumed to use this Fork-Once Parallel Execution model.

Here, when there is not a vacant processor that can generate a child thread at a time of a fork instruction, one of the following two methods is adopted hitherto.

(1) A processor executing a parent thread waits for the execution of a fork instruction until a vacant processor where a child thread can be generated appears.

(2) A processor executing a parent thread stores a fork destination address and the content of a register file at a fork point into a physical register on its backside and continues the following processing of the parent thread. The content of the fork destination address and the register file stored in the physical register on the back is referred when a vacant processor capable of creating a child thread appears, thereby creating the child thread.

In order to make a parent thread generate a child thread and make the child thread perform some predetermined processing, it is necessary to pass at least the values of a register required by the child thread, of the registers of the register file at a fork point of the parent thread, from the parent thread to the child thread. In order to reduce the cost of transferring data between the threads, the articles 2 and 3 are provided with a register-value inheritance mechanism at a time of thread generation by hardware. This means that all the content of the register file of the parent thread is copied into the child thread. After creating the child thread, the register values of the parent thread and the child thread vary independently, and the data transfer between the threads by using a register is not performed. As the other conventional technique about the data transfer between the threads, a parallel processing system provided with a mechanism for individually transferring the values of a register according to an instruction in every register is proposed.

Though the precedent threads whose execution has been decided are basically executed in parallel in the multi-thread executing method, there are many cases of failing to obtain enough executable threads in an actual program. There may be produced a probability that a desired performance cannot be obtained because the ratio of parallelism is cut down owing to dynamic decided dependencies and limit of complier analysis ability. Therefore, in the article 1, control speculation is introduced, thereby supporting the speculative execution of threads by hardware. In the control speculation, a thread having a high possibility of execution is executed in a speculative way before decision of execution. A speculating thread performs a temporary execution within a range capable of canceling the execution by hardware. Such a state that a child thread performs a temporary execution is called as a temporary executing state, and when a child thread is in a temporary execution state, it is said that a parent thread is in a thread temporary creating state. In a child thread in a temporary executing state, writing into a shared memory and a cache memory is restrained and writing into a temporary buffer separately provided is performed. When the rightness of the speculation is determined, a speculation success notice is issued from a parent thread to a child thread, and the child thread reflects the content of the temporary buffer on the shared memory and the cache memory, into a normal state with no use of the temporary buffer. The parent thread turns from a thread temporarily creating state into a thread creating state. On the other hand, when a failure in the speculation is determined, a thread abort instruction (abort) is executed in a parent thread, and the execution of the child thread and the later is cancelled. The parent thread turns from a thread temporarily creating state to a thread non-generated state, thereby to be able to generate a child thread again. Namely, the Fork-Once Parallel Execution model limits a thread to generate at most one thread, if performing the control speculation and failing in the speculation, a fork becomes possible again. Also in this case, the effective child thread is at most one.

In the MUSCAT described in the article 2, many exclusive instructions for flexibly controlling the parallel operation of threads, such as a sync instruction between threads, are prepared.

In order to realize the multi-thread execution of the Fork-Once Parallel Execution model in which a thread generates at most one effective child thread during its existence, as described in the article 2, all the threads are restricted to be the instruction codes of respectively executing a valid fork only once, in a compile stage of creating a parallel program from a serial processing program. In short, the Fork-Once limitation is statically assured on the parallel program.

However, it is difficult for a complier to keep the above limitation of Fork-Once Parallel Execution, because of the problems such as divided compile and a function call. In the conventional multi-thread executing method and parallel processing system, a parallel program which fails to keep the above limitation cannot run properly. For example, in a program including a main function and a func function as illustrated in FIG. 38 and FIG. 39, if a fork instruction is inserted both in the main function and the func function as illustrated in FIG. 38, the above limitation of Fork-Once Parallel Execution is being kept when a control flow branching from a block a to a block b is executed. However, when a control flow branching from the block a to a block c is executed, a fork is twice performed from the same thread and therefore, the limitation of Fork-Once Parallel Execution is not assured, thereby disturbing the normal run of the program. Therefore, it has been necessary to assure the Fork-Once limitation by inserting a fork instruction into only one of the main function and the func function, in a compile stage. FIG. 39 shows an example of a parallel program in which the fork instruction is inserted only in the func function and the precedent execution of the block d at a time of the block a in the main function is abandoned.

SUMMARY OF THE INVENTION

The present invention is proposed in consideration of the above situation, and an object of the present invention is to provide a new multi-thread executing method and a parallel processing system capable of performing a multi-thread execution by the Fork-Once Parallel Execution model even in a parallel program without full assurance of the Fork-Once limitation.

According to the first aspect of the invention, a multi-thread executing method of dividing a single program into a plurality of threads and executing the program by a plurality of processors in parallel, comprising the following steps in which:

each of the processors assures Fork-Once limitation at a time of program execution, by selecting one fork instruction for creating an effective child thread from a plurality of fork instructions existing within a parent thread, during execution of the parent thread; and the processor having generated an effective child thread finishes processing of a thread by executing an instruction up to an address just before a starting address of the effective child thread.

In the preferred construction, the multi-thread executing method may comprise a step of canceling the child thread when there already exists a child thread generated from the parent thread for every fork instruction of the parent thread.

In another preferred construction, the multi-thread executing method may comprise a step of making invalid all the fork instructions other than the first fork instruction having succeeded in forking a child thread, in a processor having started execution of the parent thread.

In another preferred construction, the multi-thread executing method may comprise a step of finishing the processing of a thread in the processor, according to a term instruction corresponding to a fork instruction having forked the effective child thread, of the term instructions inserted just before fork destination addresses within a parallel program correspondingly to the respective fork instructions.

In another preferred construction, the multi-thread executing method may comprise a step of finishing the processing of a thread in the processor, on condition that a value of a program counter is coincident with the starting address of the effective child thread.

In another preferred construction, the multi-thread executing method may comprise a step of waiting the execution of the fork instruction until the other processor capable of starting the execution of the child thread appears after execution of the parent thread starts in one processor when there exists no other processor capable of starting execution of a child thread at a time of a fork instruction.

In another preferred construction, the multi-thread executing method may comprise a step of, after execution of the parent thread starts in one processor, when there exists no other processor capable of starting execution of a child thread at a time of a fork instruction, saving content of a register file of the parent thread and performing a fork of a child thread based on the above saved information if the other processor capable of starting the execution of the child thread appears.

In another preferred construction, the multi-thread executing method may comprise a step of making such a fork instruction invalid that has no other processor capable of starting execution of a child thread at a time of every fork instruction, after execution of the parent thread starts in one processor.

In another preferred construction, the multi-thread executing method may comprise a step of making such a fork instruction invalid that has no other processor capable of starting execution of a child thread at a time of every fork instruction and before a register file of the parent thread is updated, after execution of the parent thread starts in one processor.

In another preferred construction, the multi-thread executing method may comprise a step of making such a fork instruction invalid that has no other processor capable of starting execution of a child thread at a time of every fork instruction and before a register to be inherited by a child thread, of the registers of a register file of the parent thread, is updated, after execution of the parent thread starts in one processor.

According to the second aspect of the invention, a multi-thread executing method in a parallel processing system which has a plurality of processors for fetching, decoding, and executing instructions of threads simultaneously according to a program counter, each of the processor having a temporary buffer capable of canceling execution of a thread, and which is provided with a function of starting the execution of a child thread starting from a fork destination address specified by a fork instruction within a parent thread executed by one of the processors, in a fork destination processor concerned with the parent thread executing processor, by making the child thread inherit at least a value of a register necessary for the child thread, of a register file of the parent thread, the method comprising the following steps of:

(a) starting the execution of the parent thread in the processor, with a forked bit provided in the processor reset;

(b) storing the fork destination address into a register provided in the processor at a time of every fork instruction in the parent thread; when the forked bit is reset, forking the child thread to the fork destination processor and then setting the forked bit if the fork destination processor is free; while making the fork instruction invalid if the fork destination processor is busy; when the forked bit is set, canceling the thread execution of the fork destination processor and forking the child thread to the fork destination processor; and (c) finishing the processing of a thread in the processor in which the forked bit is set and a value of a program counter is coincident with the fork destination address stored in the register.

In the preferred construction, the multi-thread executing method may comprise a step of finishing the processing of a thread in the processor, according to a term instruction corresponding to a fork instruction having forked an effective child thread, of the term instructions inserted just before the fork destination addresses within a parallel program correspondingly to the respective fork instructions, instead of the above step of finishing the processing of a thread in the processor in which the forked bit is set and the value of the program counter is coincident with the fork destination address stored in the register.

According to the third aspect of the invention, a multi-thread executing method in a parallel processing system which has a plurality of processors for fetching, decoding, and executing instructions of threads simultaneously according to a program counter, each of the processor having a temporary buffer capable of canceling execution of a thread, and which is provided with a function of starting the execution of a child thread starting from a fork destination address specified by a fork instruction within a parent thread executed by one of the processors, in a fork destination processor concerned with the parent thread executing processor, by making the child thread inherit at least a value of a register necessary for the child thread, of a register file of the parent thread, the method comprising the following steps of:

(a) starting the execution of the parent thread in the processor, with a forked bit and a fork active bit provided in the processor reset;

(b) storing the fork destination address into a register provided in the processor at a time of every fork instruction within the parent thread and setting the fork active bit;

(c) resetting the fork active bit when the register file of the parent thread is updated;

(d) when the fork active bit of the processor is set and the forked bit is reset, forking the child thread to the fork destination processor if the fork destination processor turns free, then setting the forked bit and resetting the fork active bit, while when the forked bit is set, canceling the thread execution of the fork destination processor, so to fork the child thread to the fork destination processor;

(e) finishing the processing of a thread in the processor in which the forked bit is set and a value of a program counter is coincident with the fork destination address stored in the register.

In the preferred construction, the multi-thread executing method may comprise a step of finishing the processing of a thread in the processor, according to a term instruction corresponding to a fork instruction having forked an effective child thread, of the term instructions inserted just before the fork destination addresses within a parallel program correspondingly to the respective fork instructions, instead of the above step of finishing the processing of a thread in the processor in which the forked bit is set and the value of the program counter is coincident with the fork destination address stored in the register.

According to another aspect of the invention, a multi-thread executing method in a parallel processing system which has a plurality of processors for fetching, decoding, and executing instructions of threads simultaneously according to a program counter, each of the processor having a temporary buffer capable of canceling execution of a thread, and which is provided with a function of starting the execution of a child thread starting from a fork destination address specified by a fork instruction within a parent thread executed by one of the processors, in a fork destination processor concerned with the parent thread executing processor, by making the child thread inherit at least a value of a register necessary for the child thread, of a register file of the parent thread, the method comprising the following steps of:

(a) starting the execution of the parent thread in the processor, with a forked bit and a fork active bit provided in the processor reset;

(b) storing the fork destination address into a register provided in the processor at a time of every fork instruction within the parent thread and setting the fork active bit;

(c) resetting the fork active bit when a register to be inherited by the child thread, of the registers within the register file of the parent thread, is updated;

(d) when the fork active bit of the processor is set and the forked bit is reset, forking the child thread to the fork destination processor if the fork destination processor turns free, then setting the forked bit and resetting the fork active bit, while when the forked bit is set, canceling the thread execution of the fork destination processor, so to fork the child thread to the fork destination processor;

(e) finishing the processing of a thread in the processor in which the forked bit is set and a value of a program counter is coincident with the fork destination address stored in the register.

In the preferred construction, the multi-thread executing method may comprise a step of finishing the processing of a thread in the processor, according to a term instruction corresponding to a fork instruction having forked an effective child thread, of the term instructions inserted just before the fork destination addresses within a parallel program correspondingly to the respective fork instructions, instead of the above step of finishing the processing of a thread in the processor in which the forked bit is set and the value of the program counter is coincident with the fork destination address stored in the register.

According to another aspect of the invention, a multi-thread executing method in a parallel processing system which has a plurality of processors for fetching, decoding, and executing instructions of threads simultaneously according to a program counter, each of the processor having a temporary buffer capable of canceling execution of a thread, and which is provided with a function of starting the execution of a child thread starting from a fork destination address specified by a fork instruction within a parent thread executed by one of the processors, in a fork destination processor concerned with the parent thread executing processor, by making the child thread inherit at least a value of a register necessary for the child thread, of a register file of the parent thread, the method comprising the following steps of:

(a) starting the execution of the parent thread in the processor, with a forked bit provided in the processor reset;

(b) storing the fork destination address into a register provided in the processor at a time of every fork instruction within the parent thread; when the forked bit is reset, if the fork destination processor of the processor is free, immediately forking the child thread to the fork destination processor; while if the above processor is not free, waiting the fork instruction until the above processor turns free, then forking the child thread to the fork destination processor, and setting the forked bit; when the forked bit is set, canceling the thread execution of the fork destination processor so to fork the child thread to the fork destination processor; and (c) finishing the processing of a thread in the processor in which the forked bit is set and a value of a program counter is coincident with the fork destination address stored in the register.

In the preferred construction, the multi-thread executing method may comprise a step of finishing the processing of a thread in the processor, according to a term instruction corresponding to a fork instruction having forked an effective child thread, of the term instructions inserted just before the fork destination addresses within a parallel program correspondingly to the respective fork instructions, instead of the above step of finishing the processing of a thread in the processor in which the forked bit is set and the value of the program counter is coincident with the fork destination address stored in the register.

According to another aspect of the invention, a multi-thread executing method in a parallel processing system which has a plurality of processors for fetching, decoding, and executing instructions of threads simultaneously according to a program counter, each of the processor having a temporary buffer capable of canceling execution of a thread, and which is provided with a function of starting the execution of a child thread starting from a fork destination address specified by a fork instruction within a parent thread executed by one of the processors, in a fork destination processor concerned with the parent thread executing processor, by making the child thread inherit at least a value of a register necessary for the child thread, of a register file of the parent thread, the method comprising the following steps of:

(a) starting the execution of the parent thread in the processor, with a forked bit provided in the processor reset;

(b) storing the fork destination address into a register provided in the processor at a time of every fork instruction within the parent thread, when the forked bit is reset, if the fork destination processor of the processor is free, immediately forking the child thread to the fork destination processor based on content of the register file and setting the forked bit; while if the fork destination processor of the processor is busy, saving the content of the register file into a save buffer provided in the processor and holding a fork of the child thread until the fork destination processor turns free; when the forked bit is set, canceling the thread execution of the fork destination processor so to fork the child thread to the fork destination processor; and (c) finishing the processing of a thread in the processor in which the forked bit is set and a value of a program counter is coincident with the fork destination address stored in the register.

In the preferred construction, the multi-thread executing method may comprise a step of finishing the processing of a thread in the processor, according to a term instruction corresponding to a fork instruction having forked an effective child thread, of the term instructions inserted just before the fork destination addresses within a parallel program correspondingly to the respective fork instructions, instead of the above step of finishing the processing of a thread in the processor in which the forked bit is set and the value of the program counter is coincident with the fork destination address stored in the register.

According to another aspect of the invention, a multi-thread executing method in a parallel processing system including a plurality of processors for fetching, decoding, and executing instructions of threads simultaneously according to a program counter, and provided with a function of starting the execution of a child thread starting from a fork destination address specified by a fork instruction within a parent thread executed by one of the processors, in a fork destination processor concerned with the parent thread executing processor, by making the child thread inherit at least a value of a register necessary for the child thread, of a register file of the parent thread, the method comprising the following steps of:

(a) starting the execution of the parent thread in the processor, with a forked bit provided in the processor reset;

(b) at a time of every fork instruction within the parent thread, when the forked bit is reset, if the fork destination processor concerned with the parent thread executing processor is free, forking the child thread, then setting the forked bit, and storing the fork destination address into a register provided in the processor; while if the fork destination processor is busy, making the fork instruction invalid; and when the forked bit is set, making the fork instruction invalid; and (c) finishing the processing of a thread in the processor in which the forked bit is set and a value of a program counter is coincident with the fork destination address stored in the register.

In the preferred construction, the multi-thread executing method may comprise a step of finishing the processing of a thread in the processor, according to a term instruction corresponding to a fork instruction having forked an effective child thread, of the term instructions inserted just before the fork destination addresses within a parallel program correspondingly to the respective fork instructions, instead of the above step of finishing the processing of a thread in the processor in which the forked bit is set and the value of the program counter is coincident with the fork destination address stored in the register.

According to another aspect of the invention, a multi-thread executing method in a parallel processing system including a plurality of processors for fetching, decoding, and executing instructions of threads simultaneously according to a program counter, and provided with a function of starting the execution of a child thread starting from a fork destination address specified by a fork instruction within a parent thread executed by one of the processors, in a fork destination processor concerned with the parent thread executing processor, by making the child thread inherit at least a value of a register necessary for the child thread, of a register file of the parent thread, the method comprising the following steps of:

(a) starting the execution of the parent thread in the processor, with a forked bit provided in the processor reset;

(b) at a time of every fork instruction within the parent thread, when the forked bit is reset, setting the fork active bit provided in the processor and storing the fork destination address into a register provided in the processor, while when the forked bit is set, making the fork instruction invalid;

(c) resetting the fork active bit when the register file of the parent thread is updated;

(d) when the fork active bit of the processor is set, if the fork destination processor concerned with the parent thread executing processor is free, forking the child thread starting from the fork destination address stored in the register of the processor to the fork destination processor, then setting the forked bit of the processor and resetting the fork active bit; and (e) finishing the processing of a thread in the processor in which the forked bit is set and a value of a program counter is coincident with the fork destination address stored in the register.

In the preferred construction, the multi-thread executing method may comprise a step of finishing the processing of a thread in the processor, according to a term instruction corresponding to a fork instruction having forked an effective child thread, of the term instructions inserted just before the fork destination addresses within a parallel program correspondingly to the respective fork instructions, instead of the above step of finishing the processing of a thread in the processor in which the forked bit is set and the value of the program counter is coincident with the fork destination address stored in the register.

According to another aspect of the invention, a multi-thread executing method in a parallel processing system including a plurality of processors for fetching, decoding, and executing instructions of threads simultaneously according to a program counter, and provided with a function of starting the execution of a child thread starting from a fork destination address specified by a fork instruction within a parent thread executed by one of the processors, in a fork destination processor concerned with the parent thread executing processor, by making the child thread inherit at least a value of a register necessary for the child thread, of a register file of the parent thread, the method comprising the following steps of:

(a) starting the execution of the parent thread in the processor, with a forked bit provided in the processor reset;

(b) at a time of every fork instruction within the parent thread, when the forked bit is reset, setting the fork active bit provided in the processor and storing the fork destination address into a register provided in the processor, while when the forked bit is set, making the fork instruction invalid;

(c) resetting the fork active bit when a register to be inherited by the child thread, of the registers of the register file of the parent thread, is updated;

(d) when the fork active bit is set, if the fork destination processor concerned with the parent thread executing processor is free, forking the child thread to the fork destination processor, then setting the forked bit and resetting the fork active bit; and (e) finishing the processing of a thread in the processor in which the forked bit is set and a value of a program counter is coincident with the fork destination address stored in the register.

In the preferred construction, the multi-thread executing method may comprise a step of finishing the processing of a thread in the processor, according to a term instruction corresponding to a fork instruction having forked an effective child thread, of the term instructions inserted just before the fork destination addresses within a parallel program correspondingly to the respective fork instructions, instead of the above step of finishing the processing of a thread in the processor in which the forked bit is set and the value of the program counter is coincident with the fork destination address stored in the register.

According to another aspect of the invention, a multi-thread executing method in a parallel processing system including a plurality of processors for fetching, decoding, and executing instructions of threads simultaneously according to a program counter, and provided with a function of starting the execution of a child thread starting from a fork destination address specified by a fork instruction within a parent thread executed by one of the processors, in a fork destination processor concerned with the parent thread executing processor, by making the child thread inherit at least a value of a register necessary for the child thread, of a register file of the parent thread, the method comprising the following steps of:

(a) starting the execution of the parent thread in the processor, with a forked bit provided in the processor reset;

(b) at a time of every fork instruction within the parent thread, when the forked bit is reset, if the fork destination processor concerned with the parent thread executing processor is free, immediately forking the child thread, while if the fork destination processor is not free, waiting the fork instruction until the same processor turns free, then forking the child thread, setting the forked bit, storing the fork destination address into a register provided in the processor, while when the forked bit is set, making the fork instruction invalid;

(c) finishing the processing of a thread in the processor in which the forked bit is set and a value of a program counter is coincident with the fork destination address stored in the register.

In the preferred construction, the multi-thread executing method may comprise a step of finishing the processing of a thread in the processor, according to a term instruction corresponding to a fork instruction having forked an effective child thread, of the term instructions inserted just before the fork destination addresses within a parallel program correspondingly to the respective fork instructions, instead of the above step of finishing the processing of a thread in the processor in which the forked bit is set and the value of the program counter is coincident with the fork destination address stored in the register.

According to another aspect of the invention, a multi-thread executing method in a parallel processing system including a plurality of processors for fetching, decoding, and executing instructions of threads simultaneously according to a program counter, and provided with a function of starting the execution of a child thread starting from a fork destination address specified by a fork instruction within a parent thread executed by one of the processors, in a fork destination processor concerned with the parent thread executing processor, by making the child thread inherit at least a value of a register necessary for the child thread, of a register file of the parent thread, the method comprising the following steps of:

(a) starting the execution of the parent thread in the processor, with a forked bit provided in the processor reset;

(b) at a time of every fork instruction within the parent thread, when the forked bit is reset, if the fork destination processor concerned with the parent thread executing processor is free, immediately forking the child thread to a neighboring processor based on content of the register file and then setting the forked bit, while if the fork destination processor is busy, saving the content of the register file into a save buffer provided in the processor, and holding a fork of the child thread until the fork destination processor turns free, while when the forked bit is set, making the fork instruction invalid;

(c) finishing the processing of a thread in the processor in which the forked bit is set and a value of a program counter is coincident with the fork destination address stored in the register.

In the preferred construction, the multi-thread executing method may comprise a step of finishing the processing of a thread in the processor, according to a term instruction corresponding to a fork instruction having forked an effective child thread, of the term instructions inserted just before the fork destination addresses within a parallel program correspondingly to the respective fork instructions, instead of the above step of finishing the processing of a thread in the processor in which the forked bit is set and the value of the program counter is coincident with the fork destination address stored in the register.

According to a further aspect of the invention, a parallel processing system of dividing a single program into a plurality of threads and executing the program by a plurality of processors in parallel, wherein each of the processors comprises means of assuring Fork-Once limitation at a time of program execution, by selecting one fork instruction for creating an effective child thread from a plurality of fork instructions existing within a parent thread, during execution of the parent thread; and means of finishing processing of a thread by executing an instruction up to an address just before a starting address of the effective child, especially in a case of the processor having generated the effective child thread.

In the preferred construction, when there already exists a child thread generated from the parent thread for every fork instruction of the parent thread, the child thread is cancelled.

In another preferred construction, a processor having started execution of the parent thread makes invalid all the fork instructions other than the first fork instruction having succeeded in forking a child thread.

In another preferred construction, the processor finishes the processing of a thread according to a term instruction corresponding to a fork instruction having forked the effective child thread, of the term instructions inserted just before fork destination addresses within a parallel program correspondingly to the respective fork instructions.

In another preferred construction, the processor finishes the processing of a thread on condition that a value of a program counter is coincident with the starting address of the effective child thread.

In another preferred construction, after execution of the parent thread starts in one processor, when there exists no other processor capable of starting execution of a child thread at a time of a fork instruction, the execution of the fork instruction is waited until the other processor capable of starting the execution of the child thread appears.

In another preferred construction, after execution of the parent thread starts in one processor, when there exists no other processor capable of starting execution of a child thread at a time of a fork instruction, content of a register file of the parent thread is saved and when the other processor capable of starting the execution of the child thread appears, a fork of the child thread is performed based on the above saved information.

In another preferred construction, after execution of the parent thread starts in one processor, such a fork instruction is made invalid, that has no other processor capable of starting execution of a child thread at a time of every fork instruction.

In the above-mentioned construction, after execution of the parent thread starts in one processor, such a fork instruction is made invalid, that has no other processor capable of starting execution of a child thread at a time of every fork instruction and before a register file of the parent thread is updated.

In the above-mentioned construction, after execution of the parent thread starts in one processor, such a fork instruction is made invalid, that has no other processor capable of starting execution of a child thread at a time of every fork instruction and before a register to be inherited by a child thread, of the registers of a register file of the parent thread, is updated.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIGS. 1(a)–1(g) are views for use in describing a function of the present invention;

FIGS. 8(a)–(d) are views showing an example of an execution sequence of a multi-thread executing method according to the first embodiment of the first invention in the present invention;

FIGS. 9(a)–9(c) are views showing another example of the execution sequence of a multi-thread executing method according to the first embodiment of the first invention in the present invention;

DESCRIPTION OF THE PREFERRED EMBODIMENT

Figure 2:
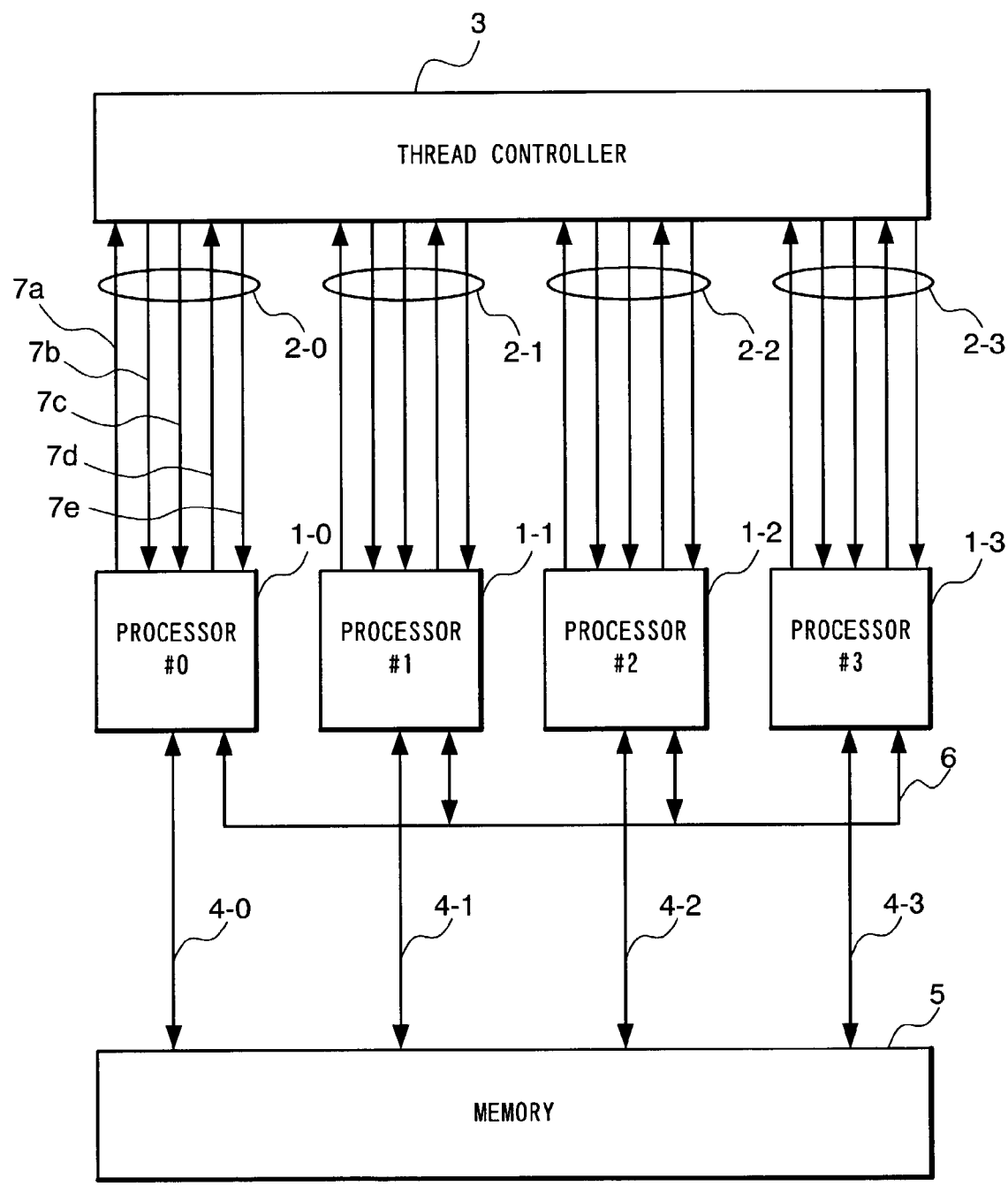
FIG. 2 is a block diagram showing an example of a parallel processing system of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the present invention, when there already exists a child thread generated from a parent thread for every fork instruction of the parent thread, each processor cancels the child thread, and a processor starting execution of the parent thread makes invalid all the fork instructions other than the fork instruction first having succeeded in forking a child thread. Then, a fork instruction for creating an effective child thread is selected from a plurality of fork instructions existing within the parent thread during execution of the parent thread. Therefore, even a parallel program without assurance of the Fork-Once limitation can assure the Fork-Once limitation at a run time of the program. Then, the processor having generated the effective child thread finishes the processing of a thread by having finished the execution of the instructions just before the start address of the effective child thread. Thus, the processing of a program can be performed without any problem.

This time, a function of the present invention will be described based on an example of a program simplified for its easy understanding. FIG. 1(a) shows an example of a serial processing program, and FIG. 1(b) shows an example of a parallel program generated from this serial processing program. Within the parallel program of this example, fork thi shows a fork instruction instructing a fork of the instruction of the address thi and the later as a child thread, and term thi shows a term instruction corresponding to fork thi. The parallel program of FIG. 1(b) is described as doing a plurality of forks from one thread, and the Fork-Once limitation is not assured.

FIG. 1(c) shows a sequence of running the parallel program of FIG. 1(b) according to the first invention. The processor PE1 forks a child thread in the processor PE2 according to the fork instruction fork th1 and the processor PE2 starts the execution of the child thread according to the instruction 3. The processor PE1 continues to execute the instruction 0, and since the fork instruction fork th2 appears again, the processor PE1 forks a child thread in the processor PE2. At this time, the currently executing thread on the processor PE2 is canceled, and the processor PE2 starts the execution of a new child thread from the instruction 2. The processor PE1 continues to execute the instruction 1, and since the next instruction is the term instruction term th2 corresponding to the fork instruction fork th2 which has forked the effective child thread, it finishes the processing of the thread.

On the other hand, since the processor PE2 doesn't fork an effective child thread from the currently executing thread yet, it makes invalid the term instruction term th1 next to the instruction 2 and advances the execution of the instruction 3 and the instruction 4. Since the effective thread is forked only once from the thread executed by the processor PE1, the Fork-Once limitation is assured at a program run time. Finally, the instruction 0 and the instruction 1 are executed by the processor PE1 in this order and the instruction 2, the instruction 3, and the instruction 4 are respectively executed by the processor PE2 in this order. Therefore, the processing of the program can be executed without any problem.

FIG. 1(d) shows a sequence of running the parallel program of FIG. 1(b) according to a second invention. The processor PE1 forks a child thread in the processor PE2 according to the fork instruction fork th1, and the processor PE2 starts the execution of the thread from the instruction 3. The processor PE1 continues to execute the instruction 0, and although the fork instruction fork th2 appears again, the processor PE1 makes the same instruction invalid since the child thread has been already forked once, and executes the next instruction 1.

Further, the processor PE1 makes the term instruction term th2 invalid, because it is not a term instruction corresponding to the fork instruction fork th1 which has forked the effective child thread, continues to execute the instruction 2, and finishes the processing of the thread at a time of executing the term instruction term th1 corresponding to the fork instruction fork th1 which has forked the effective child thread.

Since one effective thread at most is forked from the thread executed by the processor PE1, the Fork-Once limitation is assured at a program run time. Finally, the instruction 0, the instruction 1, and the instruction 2 are executed by the processor PE1 in this order, and the instruction 3 and the instruction 4 are respectively executed by the processor PE2 in this order. Therefore, the processing of the program can be performed without any problem.

FIG. 1(e) shows the parallel program resulting from excluding a term instruction from the parallel program of FIG. 1(b), FIG. 1(f) shows a sequence of running the parallel program of FIG. 1(e) according to the first invention, and FIG. 1(g) shows a sequence of running the parallel program of FIG. 1(e) according to the second invention. In the case of no use of a term instruction, each processor finishes the processing of a thread when the value of its program counter is coincident with the start address of the effective child thread.

In FIG. 1(f), the effective child thread is a thread forked according to the fork instruction fork th2, and since the start address is the instruction 2, the processor PE1 finishes the execution when the value of the program counter is coincident with the address of the instruction 2. In FIG. 1(g), the effective child thread is a thread forked according to the fork instruction fork th1, and since the start address is the instruction 3, the processor PE1 finishes the execution when the value of the program counter is coincident with the address of the instruction 3.

Although the function of the present invention has been described by using an example of a program with deeply nested forks in FIG. 1, the present invention can assure the Fork-Once limitation also even in a program without nested forks at its execution time and properly perform the processing of a program without any problem.

In the present invention, it is enough to perform the register-value inheritance from a parent thread to a child thread at a fork time, at least, only about a register necessary for the child thread, of the register file of the parent thread at a fork instruction time. As the concrete register-value inheritance mechanism, it may be that one of copying all the contents of the register file of the parent thread into a register file of the child thread at a thread generation time, as described in the article 2 and the article 3, or that one of individually transferring only the values of a necessary register by the unit of register according to an instruction, in order to reduce the transfer amount of the register.

(First Embodiment of the First Invention)

Referring to FIG. 2, an example of the parallel processing system of the present invention is a four-thread parallel executable processor, four processors 1-i (i=0 to 3) are connected to a thread controller 3 through signal lines 2-i, and they are also connected to a shared memory 5 through signal lines 4-i. The processors 1-i are respectively connected with each other through a communication bus 6-i. In this example, although the four-thread parallel executable processor is taken as an example, the present invention is generally applicable to n($\geq$2)-thread parallel executable processor, such as 8-thread and 16-thread parallel executable processors. All the processors 1-i, the memory 5, and the thread controller 3 operate in synchronous with a clock. Preferably, all the processors 1-i are integrated on one semiconductor chip together with the memory 5 and the thread controller 3.

Each processor 1-i has a program counter (hereinafter, referred to as PC) and a register file individually, and it is provided with a function of fetching, interpreting, and executing thread instructions within the memory 5. Each processor 1-i has a temporary buffer so as to cancel the thread execution. Each processor 1-i starts the execution of a thread using the temporary buffer in a temporary execution state when receiving a thread starting request 7c accompanied by a target PC value from the thread controller 3 through each signal line 2-i. At this point, the corresponding processor 1-i is managed as being in a busy state. The processor 1-i finishing the execution of a thread sends a thread finishing notice 7d to the thread controller 3 through the corresponding signal line 2-i. When this thread finishing notice 7d is accepted by the thread controller 3, the corresponding processor 1-i is managed as free and a thread finish permission 7e is returned to the corresponding processor 1-i. When receiving the thread finish permission 7e, the processor 1-i releases the temporary execution, reflects the content of the temporary buffer on the shared memory 5 and a cache memory not illustrated, and finishes the execution of the thread.

Each processor 1-i can fork a child thread in one neighboring processor 1-j (i≠j) according to a fork instruction included in the currently executing parent thread. In this embodiment, as described in the articles 1 to 3, the processor in which the processor 1-i can fork a child thread is restricted to one neighboring processor of the processor 1-i for the sake of convenience in thread management (the processor 1-0 can fork it in the processor 1-1; the processor 1-1, in the processor 1-2; the processor 1-2, in the processor 1-3; and the processor 1-3, in the processor 1-0). This model is referred to as a ring fork model.

When forking a child thread, each processor 1-i sends a fork request 7a accompanied by the fork destination address (start PC value) of a child thread and a signal indicating whether it has already generated a child thread or not (a child thread-generated signal), to the thread controller 3 through the corresponding signal line 2-i. Upon receipt of the fork request 7a, the thread controller 3 determines whether the fork toward the other neighboring processor 1-j is possible or not, based on the state of the neighboring processor and the child thread-generated signal accompanying the fork request 7a; if it is possible, the thread controller 3 sends the thread starting request 7c accompanied by the fork destination address to the above processor 1-j, while it returns a fork reply 7b to the processor 1-i of the fork request source. At this point, it is considered that a fork has been really performed, and the processor 1-i receiving the fork reply 7b performs the register-value inheritance, by copying all the contents of the register file of the parent thread or only the values of a register necessary for the child thread, into a register file of the processor 1-j of the fork destination, through the communication bus 6.

On the other hand, the thread controller 3 abandons this fork request 7a if a fork to the neighboring processor 1-j is impossible at a fork request time from the processor 1-i. Thus, the fork instruction is made invalid.

Figure 3:
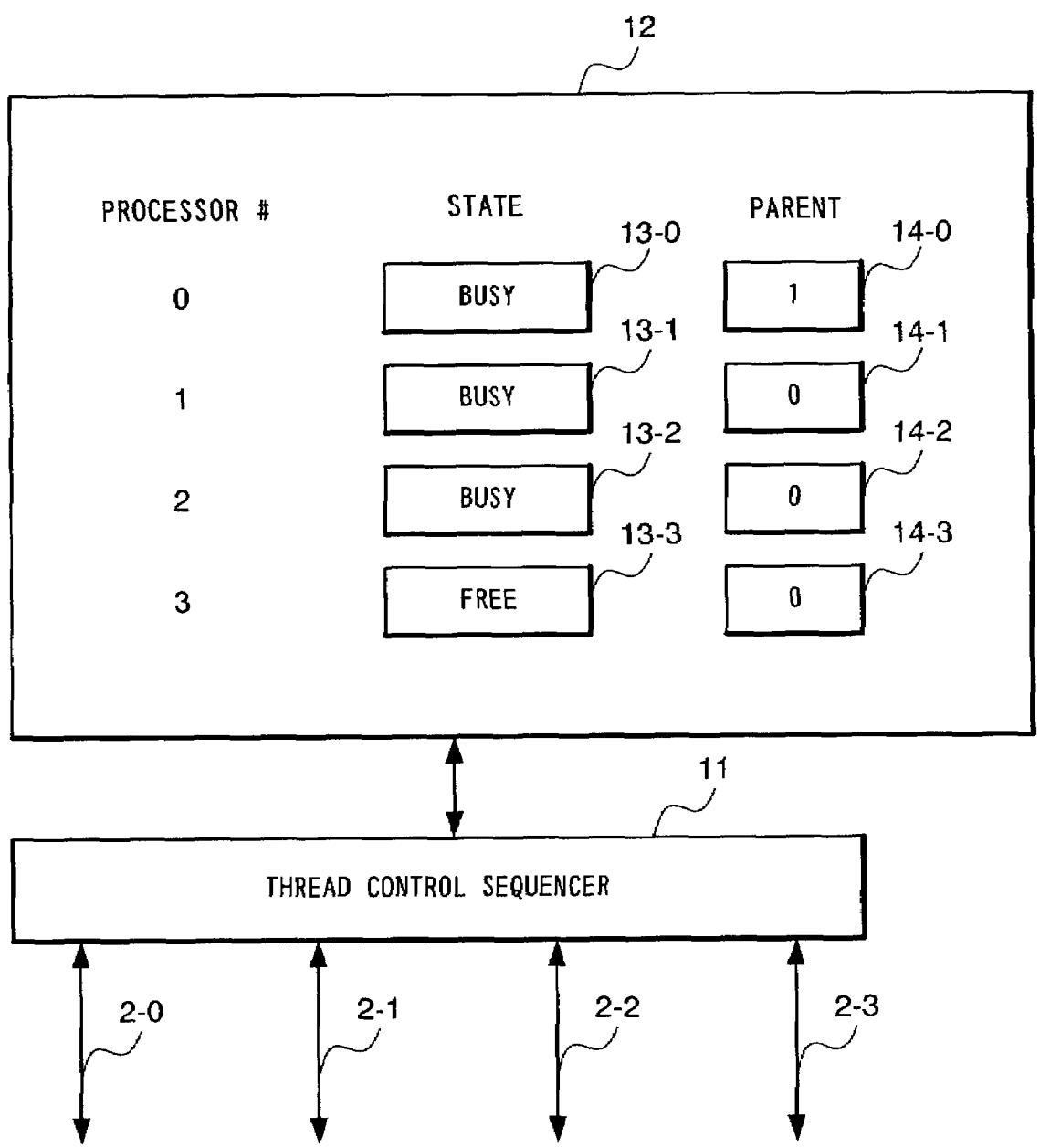
FIG. 3 is a block diagram showing an example of the structure of a thread controller in the parallel processing system of the present invention.

With reference to FIG. 3, one example of the thread controller 3 comprises a thread control sequencer 11 and a processor-state table 12. The processor-state table 12 has state entries 13-i and the oldest parent bits 14-i in one-to-one correspondence with the processors 1-i. The respective state entries 13-i are used to record the states of the respective processors 1-i, busy or free. The value 1 is set in the oldest parent bit 14-i when the thread being executed by the corresponding processor 1-i is the thread of the oldest parent of all the threads being executed by all the processors, and otherwise, the value 0 is set there. At a starting point of the parallel program, the value 1 is initially set only in the oldest parent bit corresponding to the processor executing the first thread, and thereafter, the oldest parent bit 14-i is properly updated depending on the finish and generation of a thread of the program. The thread control sequencer 11 controls thread generation and thread finish in the respective processors 1-i by using the processor-state table 12. An example of the processing of the thread control sequencer 11 when receiving a fork request 7a and a thread finishing notice 7d from the processor 1-i will be shown in FIG. 4 and FIG. 5.

Figure 4:
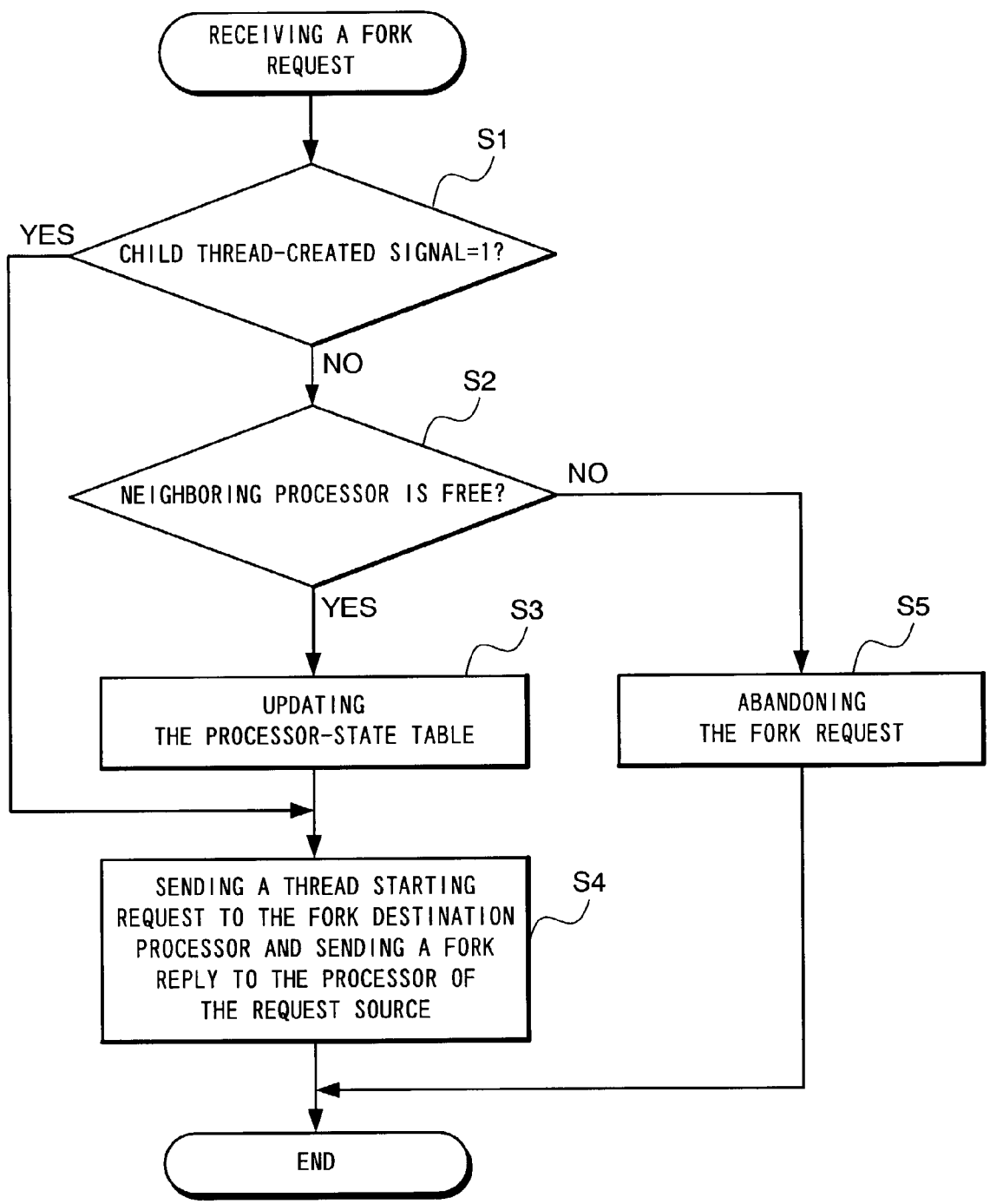
FIG. 4 is a flow chart showing the processing example when a thread control sequencer of the thread controller in the parallel processing system of the present invention receives a fork request from a processor.

With reference to FIG. 4, upon receipt of the fork request 7a from one of the processors 1-i at a timing of some clock, the thread control sequencer 11 first checks the child thread-generated signal accompanying the fork request 7a (Step S1). When the child thread-generated signal is not the value 1 indicating that a child thread has been already generated (NO in Step S1), the thread control sequencer 11 checks the state of the neighboring processor 1-j by the processor-state table 12. When the same processor 1-j is free (YES in Step S2), it is possible to fork, and the above sequencer 11 updates the entry 13-j corresponding to the same processor 1-j in the processor-state table 12 from the free state to the busy state (Step S3). It sends the thread starting request 7c with the fork destination address accompanying the fork request 7a attached thereon, to the fork destination processor 1-j, and returns the fork reply 7b to the processor 1-i of the request source (Step S4). When the neighboring processor 1-j is busy (NO in Step S2), the processor 1-j is executing the thread other than the child thread forked from the currently executing thread of the processor 1-i and it is impossible to fork. Therefore, the thread control sequencer 11 abandons the fork request 7a (Step S5).

On the other hand, when the child thread-generated signal accompanying the fork request 7a is the value 1 indicating that a child thread has been already generated (YES in Step S1), it proves that the neighboring processor 1-j is executing the child thread forked from the currently executing thread of the processor 1-i, and a fork is enabled by canceling it. Therefore, it advances to Step S4, where the thread control sequencer 11 sends the thread starting request 7c with the fork destination address accompanying the fork request 7a attached there to the fork destination processor 1-j and returns the fork reply 7b to the processor 1-i of the request source. The currently executing child thread of the fork destination processor 1-j is cancelled according to the thread starting request 7c as described below.

Figure 5:
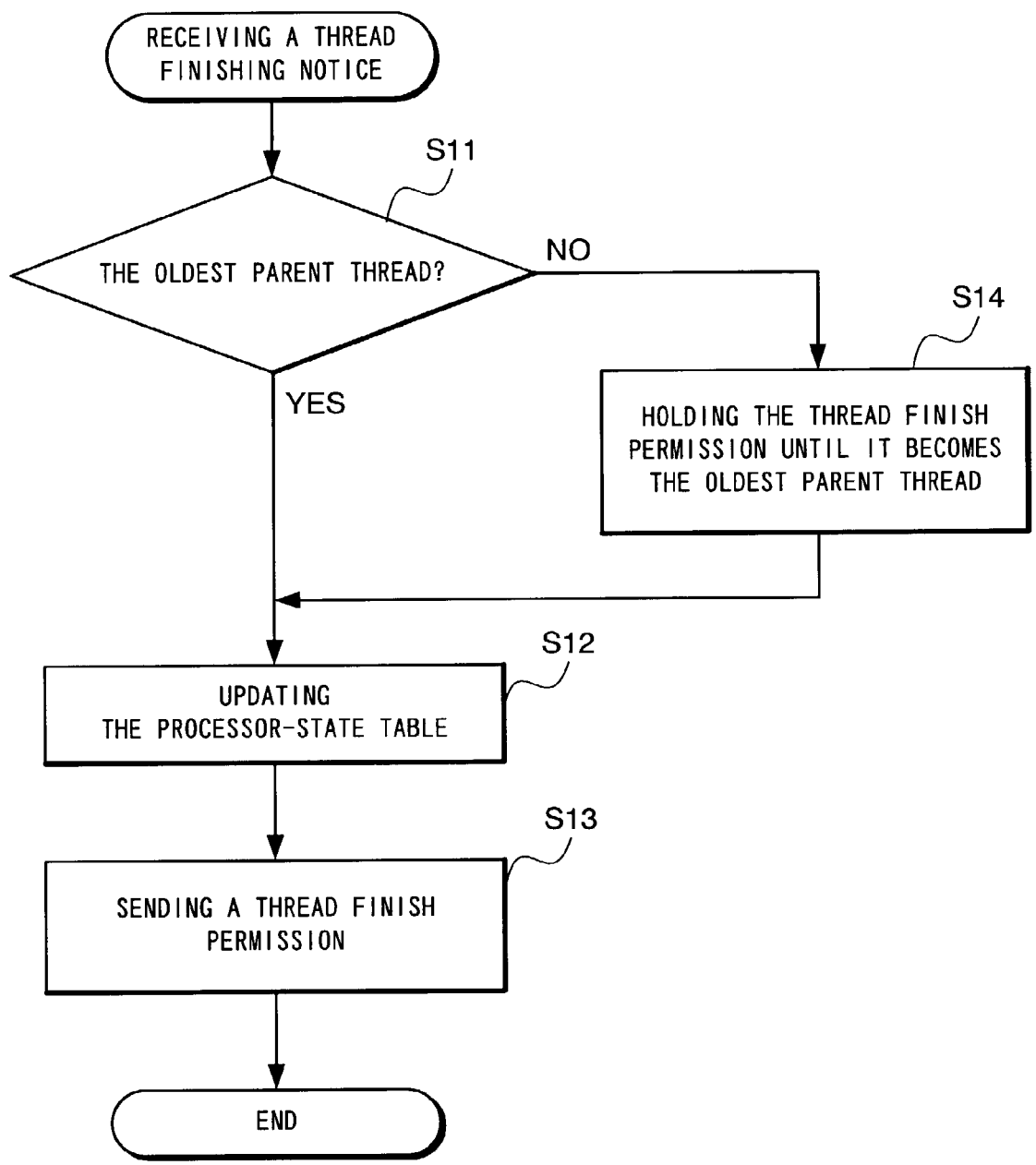
FIG. 5 is a flow chart showing the processing example when the thread control sequencer of the thread controller in the parallel processing system of the present invention receives a thread finishing notice from a processor.

With reference to FIG. 5, upon receipt of the thread finishing notice 7d from one of the processors 1-i, the thread control sequencer 11 checks whether the currently executing thread of the processor 1-i is the oldest parent thread or not (Step S11), referring to the oldest parent bit 14-i corresponding to the processor 1-i in the processor-state table 12. When it is the oldest parent thread, the thread control sequencer 11 updates the corresponding state entry 13-i from the busy state to the free state and updates the oldest parent thread (Step S12) by rewriting the corresponding oldest parent bit 14-i from 1 to 0 and rewriting the oldest parent bit 14-j of the neighboring processor 14-j from 0 to 1. Then, it sends the thread finish permission 7e to the processor 1-i having issued the thread finishing notice 7d (Step S13). On the other hand, when the currently executing thread of the processor 1-i having issued the thread finishing notice 7d is not the oldest parent thread (NO in Step S11), the thread control sequencer 11 reserves the thread finish permission (Step S14) until the currently executing thread of the processor 1-i becomes the oldest parent thread.

Figure 6:
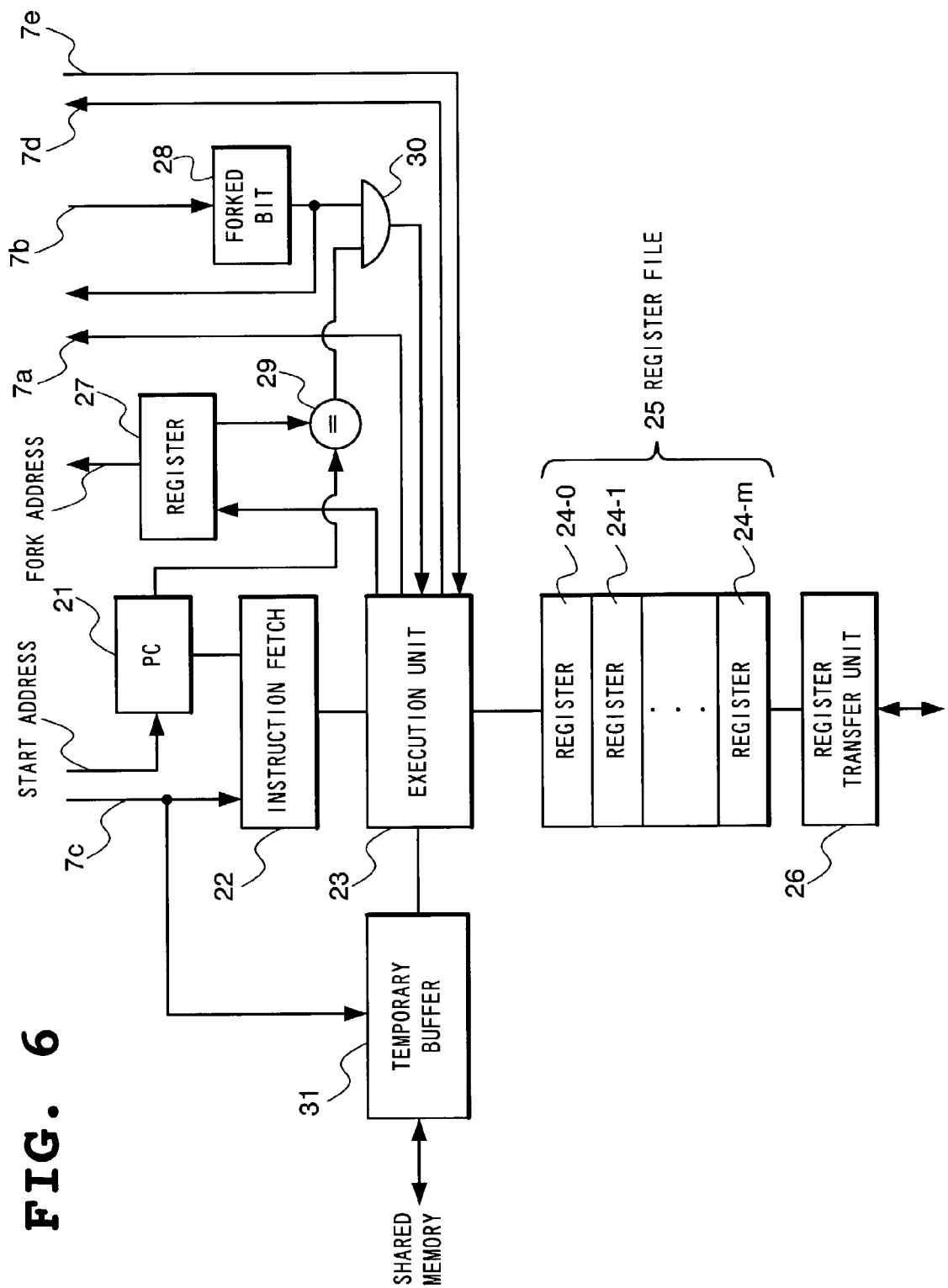
FIG. 6 is a block diagram showing an example of the structure of a processor in the parallel processing system according to a first embodiment of a first invention in the present invention.

With reference to FIG. 6, each processor 1-i comprises a PC 21 which is properly updated after the start address value accompanying the thread starting request 7c sent from the thread controller 3 is set, an instruction fetch unit 22 for fetching a thread instruction from the memory 5 according to the PC 21, an execution unit 23 for decoding and executing the fetched instruction, a register file 25 that is a collection of general registers 24-0 to 24-m, a register transfer unit 26 for transferring the content of the register file 25 to the fork destination processor through the communication bus 6, a register 27 for storing the fork destination address accompanying the fork request 7a which is sent from the executing unit 23 to the thread controller 3 at a fork instruction execution time, a forked bit 28 set by the fork reply 7b corresponding to the fork request 7a, a coincidence circuit 29 for checking whether the value of the PC 21 is coincident with the fork destination address stored in the register 27, an AND gate 30 for supplying an AND signal of the output of the forked bit 28 and the coincidence circuit 29 to the executing unit 23, and a temporary buffer 31. The output of the forked bit 28 is used as the child thread-generated signal accompanying the fork request 7a.

According to the thread starting request 7c, each processor 1-i starts the execution of a thread from the start address accompanying the above request. If it is executing a thread, the thread is canceled, to start the execution of a new thread. The execution unit 23 performs a temporary execution within a range capable of canceling the execution on the hardware until the temporary executing state of the thread is released. Namely, writing into the shared memory 5 and the cache memory not illustrated is restrained and writing into the temporary buffer 31 is performed. The temporarily executing state of a thread is released when receiving the thread finish permission 7e in reply to the thread finishing notice 7d, in this embodiment. When the temporary executing state of the thread is released, the execution unit 23 reflects the content of the temporary buffer 31 on the shared memory 5 and the cache memory not illustrated. Thus, each processor 1-i comes into an ordinal state without using the temporary buffer 31.

In the conventional multi-thread executing method, in order to cancel the execution of a child thread, it is necessary to execute a thread abort instruction (abort) in a parent thread. In the processor 1-i of this embodiment, however, the thread starting request 7c is provided in the temporary buffer 31 as a cancel signal, and if activating a new child thread, the currently executing child thread is automatically cancelled. Therefore, in this embodiment, it is not necessary to execute a thread abort instruction in a parent thread. Further, since the temporary execution state is to be released when receiving the thread finish permission 7e, in this embodiment, it is not necessary to notify a child thread of speculation success, differently from the conventional multi-thread executing method.

The execution unit 23 sends the thread finishing notice 7d to the thread controller 3 in order to finish the processing of a thread, when the value of the PC 21 is coincident with the fork destination address stored in the register 27 while the forked bit 28 is being set and the output of the AND gate 30 becomes logic "1". Even if the value of the PC 21 is coincident with the fork destination address stored in the register 27, if the forked bit 28 is not set, the output of the AND gate 30 doesn't become logic "1" and therefore the execution unit 23 continues to execute the instruction according to the PC 21.

The register transfer unit 26 starts the register transfer toward the fork destination processor at the timing at which the forked bit 28 is set. The register transfer unit 26 sends the register number (register address) and the value of a register of the register file 25 to the register file of the fork destination processor, for example, for every number of registers that can be transferred at once depending on the bus width of the communication bus 6, and in the register file 25 on the receiving side, the corresponding registers are rewritten.

Figure 7:
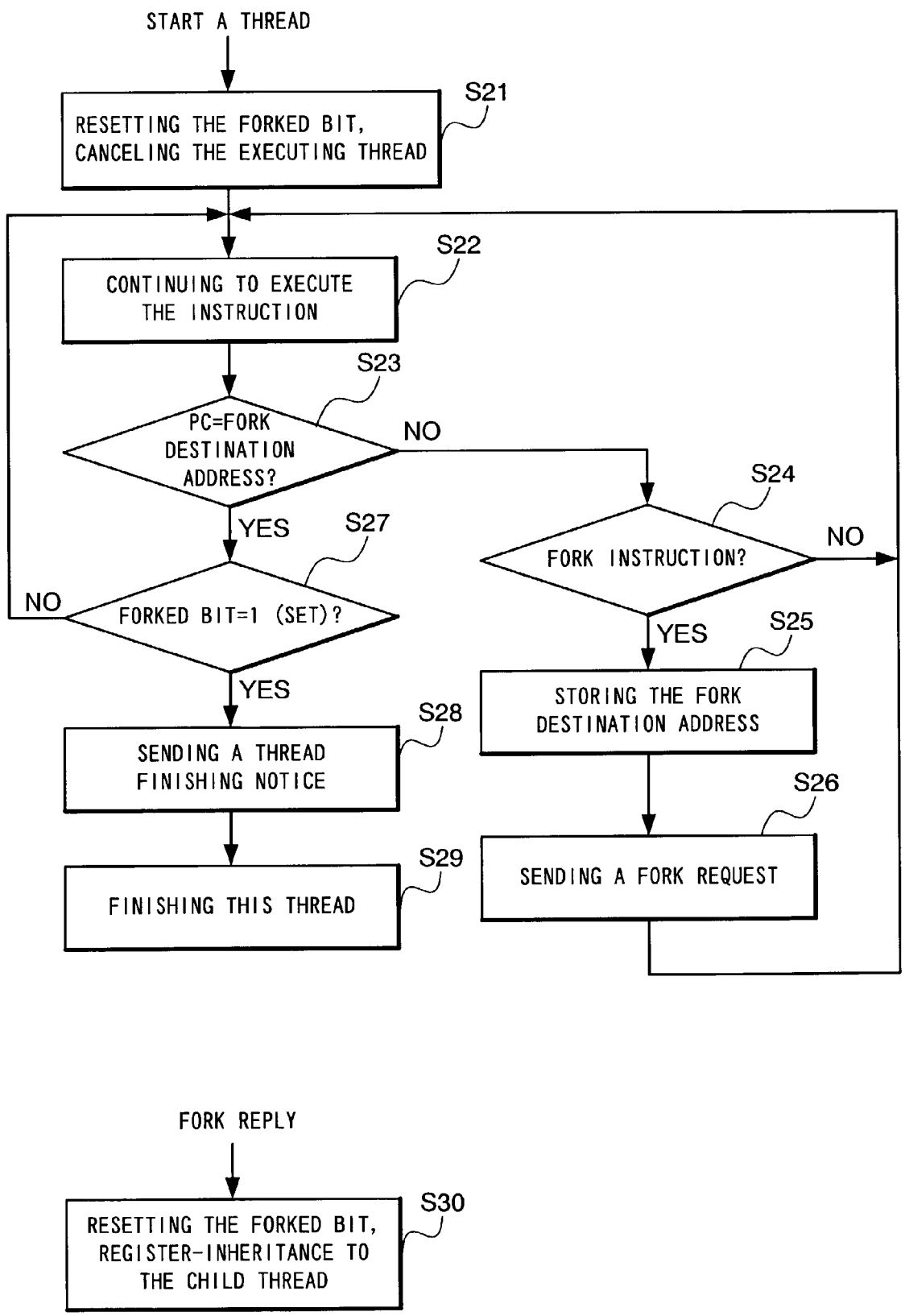
FIG. 7 is a flow chart showing an example of the processing of a processor from start to finish of a thread in the parallel processing system according to the first embodiment of the first invention in the present invention.

The outline of the processing by the processor 1-i from start to finish of a thread is illustrated in FIG. 7. Based on the thread starting request 7c from the thread controller 3, when the processor 1-i starts the execution of one thread, the forked bit 28 of the same processor 1-i is reset and if it is executing a thread, the thread is cancelled (Step S21). Hereinafter, fetch, decode, execution of a thread instruction will be continuously executed (Step S22).

When the instruction decoded by the execution unit 23 is a fork instruction (YES in Step S24), the execution unit 23 stores (overwrites) the fork destination address into the register 27 (Step S25), and sends the fork request 7a accompanied by the fork destination address stored in this register 27 and the value of the forked bit 28, to the thread controller 3 (Step S26). The thread controller 3 determines that a fork is possible when the value of the forked bit 28 is 1 or even if 0, when the neighboring processor 1-j is free, returns the fork reply 7b to the processor 1-i of the request source, and sends the thread starting request 7c to the neighboring processor 1-j. The processor 1-i receiving the fork reply 7b sets the forked bit 28 at 1, and performs the register-value inheritance to transfer the content of the register file 25 of the parent thread to the register file of the fork destination processor 1-j through the communication bus 6 by the register transfer unit 26 (Step S30). The processing of Step S21 and later in FIG. 7 will be executed in the fork destination processor 1-j.

On the other hand, the thread controller 3 determines that a fork is impossible when the value of the forked bit 28 is 0 and the neighboring processor 1-j is busy, and abandons the fork request 7a sent from the processor 1-i. Accordingly, this fork instruction executed by the processor 1-i is made invalid, and the fork of a child thread according to the above fork instruction is abandoned.

When the execution of an instruction advances in the processor 1-i until the value of the PC 21 is coincident with the fork destination address stored in the register 27 (YES in Step S23), if the forked bit 28 is set (YES in Step S27), the output of the AND gate 30 becomes logic "1" and the execution unit 23 is interrupted. The above processor 1-i sends the thread finishing notice 7d to the thread controller 3 (Step S28), and finishes the processing of the thread (Step S29) when receiving the thread finish permission 7e from the thread controller 3. If the forked bit 28 is not set, the processor 1-i continues to execute the instruction according to the PC 21 (Step S22).

One example of the execution sequence of the multi-thread executing method of this embodiment is shown in FIG. 8(a). This execution sequence indicates a sequence in the case of speculation failure in the control dependency speculation processing as illustrated in FIG. 8(b), the control dependency-speculative child thread forked from the processor #0 to the processor #1 is cancelled at a fork time of the next child thread. On the other hand, FIGS. 8(c) and (d) show the execution sequence and the control dependency speculation processing when executing the same control dependency speculation in the conventional multi-thread executing method. Here the control dependency-speculative child thread forked from the processor #0 to the processor #1 is cancelled according to the thread abort instruction (abort), and then the next child thread is forked. In this embodiment, since the existing child thread is cancelled at the second fork, it is not necessary to insert the thread abort instruction into the parallel program. Further, it is not necessary to insert the term instruction (term) just before the starting point of the child thread.

Another example of the execution sequence of the multi-thread executing method of this embodiment is shown in FIG. 9(a). FIG. 9(a) assumes the case where the fork destination processor #1 is busy at a time of the first fork instruction A executed by the processor #0. In this embodiment, in this case, the fork according to the fork instruction A is promptly abandoned. Even if abandoning the fork by the fork instruction A, the processing of the program will be properly performed. This will be described as below, by way of example of the parallel program shown in FIG. 1(e). Since the fork instruction fork th1 corresponds to the fork instruction A and the fork instruction fork th2 corresponds to the fork instruction B in FIG. 1(e), the fork instruction A is made invalid, and the execution sequence in the case of forking the fork instruction B is as shown in FIG. 9(b). The instruction 0 and the instruction 1 are executed by the processor #0 in this order, and the instruction 2, the instruction 3, and the instruction 4 are executed by the processor #1 in this order. Therefore, the processing of the program can be performed without any problem.

Similarly, in FIG. 9(a), when the fork destination processor #1 is busy at a time of the fork instruction B, the fork instruction B is made invalid. In the case of the parallel program of FIG. 1(e), the execution sequence is as shown in FIG. 9(c), and the instruction 0, the instruction 1, the instruction 2, the instruction 3, and the instruction 4 are sequentially executed by the processor #0 in this order.

This time, a method of creating a parallel program executed by the multi-thread executing method of this embodiment will be described.

Figure 10:
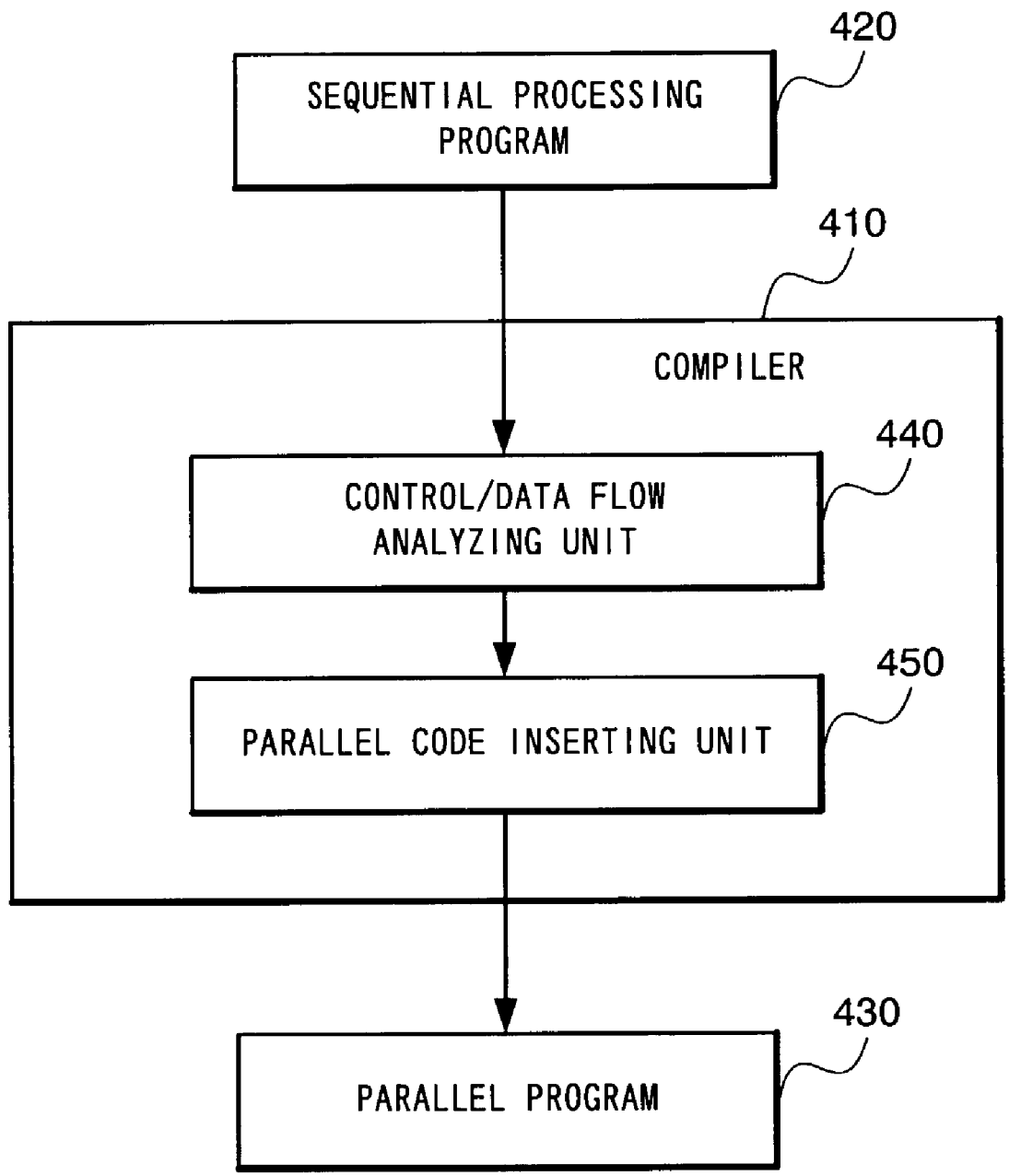
FIG. 10 is a block diagram showing an example of the structure of a compiler for creating a parallel program for the multi-thread executing method of the present invention.

With reference to FIG. 10, a compiler 410 enters a serial processing program 420, analyzes a control flow and a data flow of the serial processing program 420 in a control/data flow analyzing unit 440, divides a basic block or a plurality of basic blocks by the unit of parallelism, that is, a thread, and inserts a code for parallelizing in a parallel code inserting unit 450, thereby creating and supplying the parallel program 430 divided into a plurality of threads.

As a general parallel code, there are a fork instruction, a term instruction, and the like. In this embodiment, at a time of creating a parallel program, a fork instruction is inserted into a fork point. However, a term instruction that has been hitherto inserted just before the starting point of a child thread is not inserted. Similarly to the fork instruction A of FIG. 9(a), in this embodiment, since the fork instruction is made invalid if a fork is impossible, the compiler 410 generates a parallel program 430 in which normal operation of the serial processing program 420 is assured even if the fork instruction becomes invalid. Generally, if the control flow in the state in which all the fork instructions (and also the term instructions if there are some term instructions corresponding to the fork instructions) are removed from the parallel program 430 is equal to the control flow of the serial processing program 420, it turns out that the parallel program 430 can assure the operation of the serial processing program 420.

As mentioned above, even if a parallel program without assurance of the Fork-Once limitation, this embodiment can assure the Fork-Once limitation at its execution time. Further, like the fourth embodiment described later, when a neighboring processor is busy at a time of the first fork instruction of a parent thread, if the fork instruction is waited, the processing is interrupted. This embodiment, however, can advance the processing of a program without any interruption even in such a case. Further, in the structure in which, when a fork is impossible, the content of a register file is once saved in a save buffer and thereafter the fork is enabled, like the fifth embodiment described later, the hardware amount is increased by the amount of the save buffer and the process switching overhead is increased because the save buffer becomes an object to be saved and restored at a process switching time of the operating system. This embodiment, however, can solve the problem. Further, in the embodiment, it is not necessary to describe a term instruction within the parallel program, like the sixth embodiment described later, and the capacity of an instruction memory can be reduced because the program becomes compact in size.

(Second Embodiment of First Invention)

In the first embodiment, although the fork is abandoned if a fork is impossible at a fork time of a parent thread, in this embodiment, the fork will be performed when a fork destination processor turns free before the register file of a parent thread is updated. Hereinafter, a description of this embodiment will be described mainly about a difference between the first embodiment and this embodiment.

Figure 11:
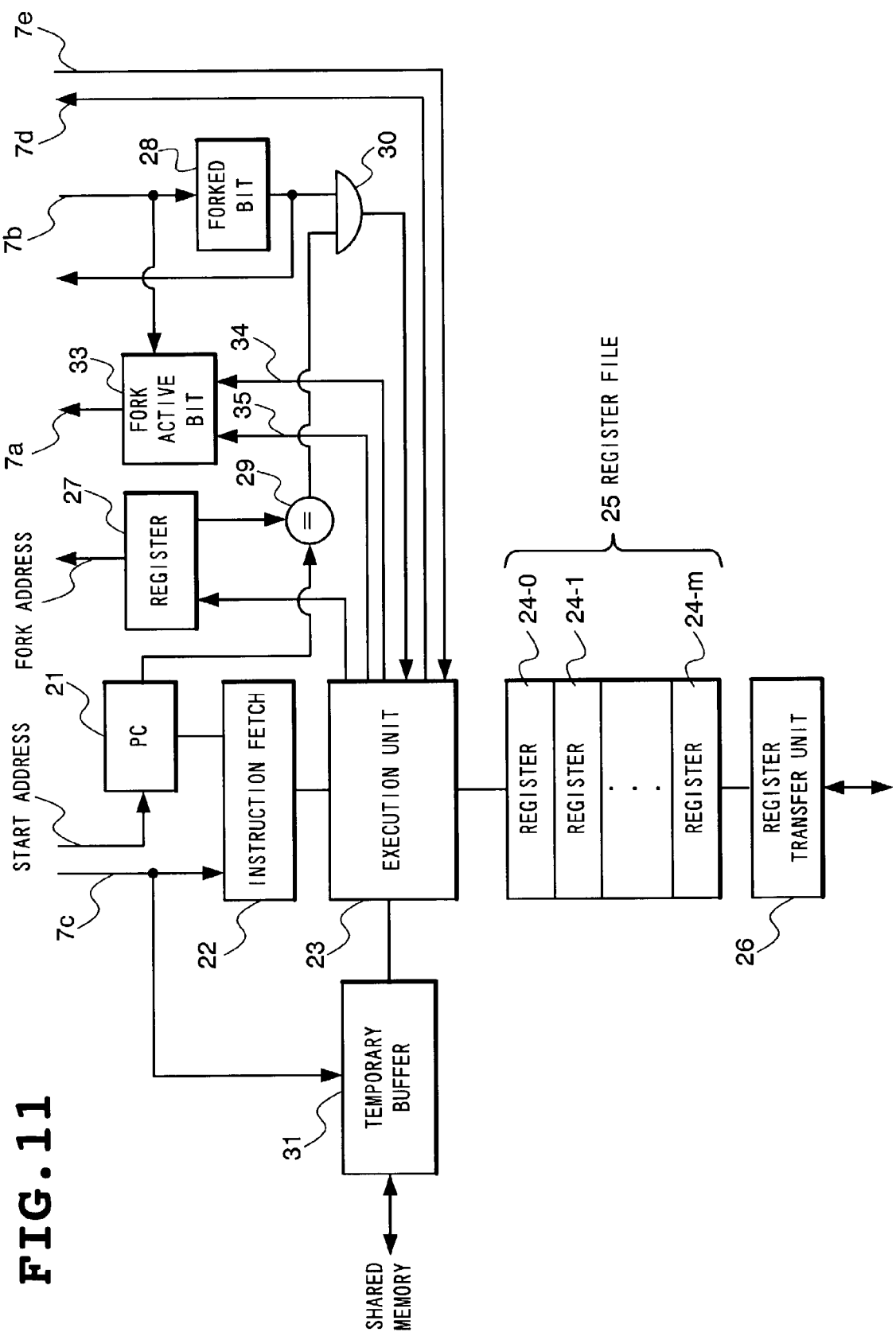
FIG. 11 is a block diagram showing an example of the structure of a processor in a parallel processing system according to a second embodiment of the first invention in the present invention.

With reference to FIG. 11, each processor 1-i of the parallel processing system according to this embodiment further comprises a fork active bit 33, in addition to the structure shown in FIG. 6. The fork active bit 33 is set by a fork signal 34 supplied when the execution unit 23 executes a fork instruction, and it is reset by the fork reply 7b received from the thread controller 3 and a register update signal 35 supplied when the execution unit 23 updates one of the registers of the resister file 25 of the parent thread. The output of the fork active bit 33 becomes the fork request 7a toward the thread controller 3, and the fork request 7a is continuously supplied while the fork active bit 33 is being set.

With reference to the above-mentioned FIG. 4, upon receipt of a fork request 7a from the processor 1-i at a timing of some clock, the thread control sequencer 11 of the thread controller 3 abandons the fork request 7a when the child thread-generated signal is 0 and the neighboring processor 1-j is busy (NO in Step S2). In this embodiment, however, since the processor 1-i continues to supply the fork request 7a while the fork active bit 33 is set, the thread controller 3 receives the fork request 7a again from the processor 1-i at a timing of the next clock, and the processing of FIG. 4 is repeated. Namely, when a fork is impossible at a fork point, the fork instruction is held and when the fork becomes possible, it will be executed.

Figure 12:
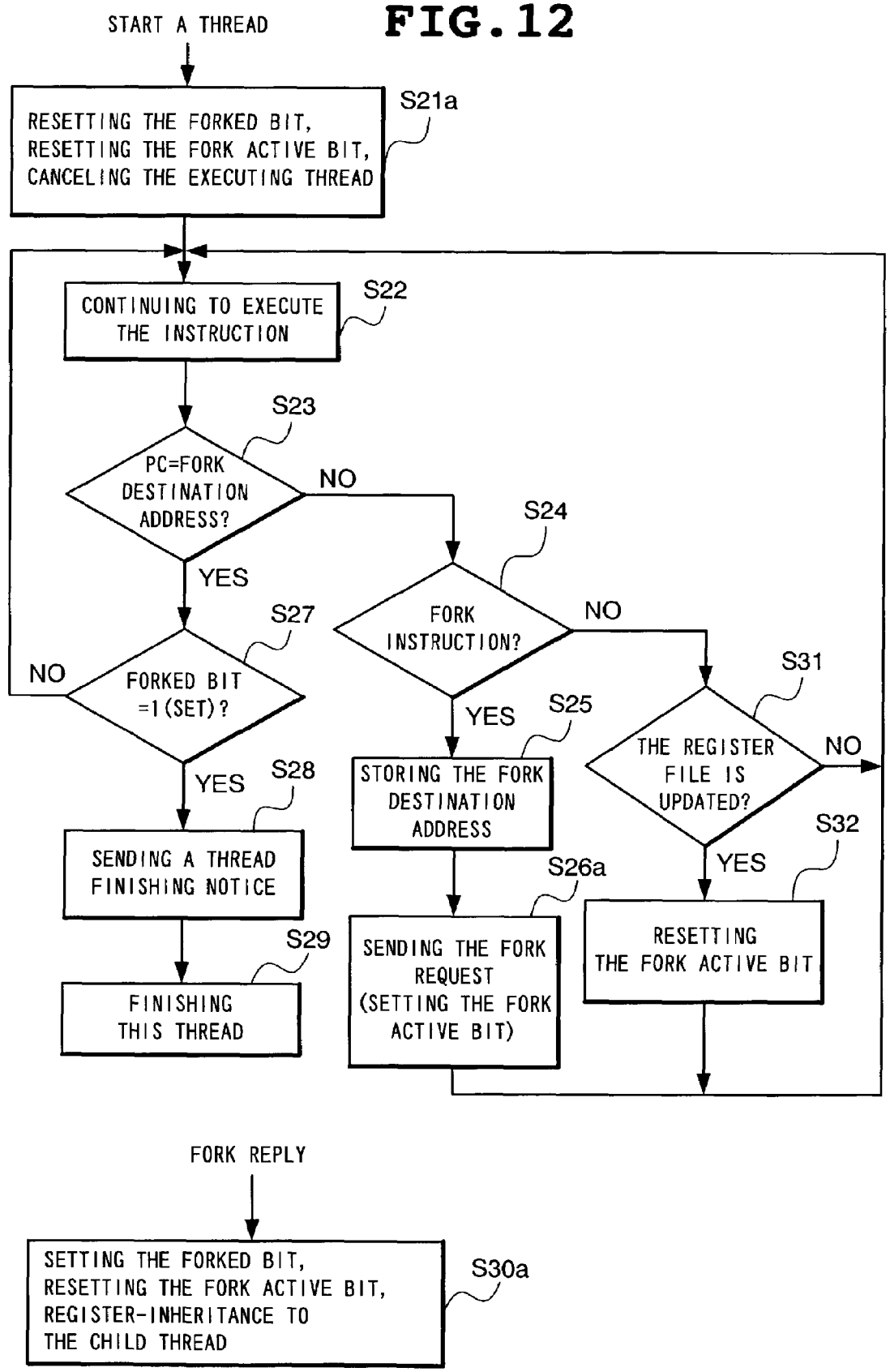
FIG. 12 is a flow chart showing an example of the processing of the processor from start to finish of a thread in the parallel processing system according to the second embodiment of the first invention in the present invention.

The outline of the processing of the processor 1-i from start to finish of a thread is shown in FIG. 12. Based on the thread starting request 7c from the thread controller 3, the forked bit 28 and the fork active bit 33 of the processor 1-i are reset when the same processor 1-i starts the execution of one thread and if it is executing a thread, the thread is cancelled (Step S21a). Hereafter, fetch, decode, and execution of a thread instruction will be continuously performed (Step S22).

When the instruction decoded by the execution unit 23 is a fork instruction (YES in Step S24), the execution unit 23 stores the fork destination address into the register 27 (Step S25), and sends the fork request 7a accompanied by the fork destination address and the value of the forked bit 28 to the thread controller 3 by setting the fork active bit 33 according to the fork signal 34 (Step S26a). When the execution unit 23 updates one of the registers of the register file 25 (YES in Step S31), it supplies the register update signal 35 to reset the fork active bit 33 (Step S32). Accordingly, the fork request 7a is continuously supplied to the thread controller 3 from the processor 1-i, during the period from a fork instruction execution to the first update of the register file 25.

The thread controller 3 sends the fork reply 7b to the processor 1-i when the fork toward the neighboring processor 1-j becomes possible while the fork request 7a is being supplied from the processor 1-i, and simultaneously forks a child thread (Step S4) by supplying the thread starting request 7c to the other processor 1-j. According to the fork reply 7b supplied to the processor 1-i, the forked bit 28 is set and the fork active bit 33 is reset. Further, the content of the register file 25 is transferred to the fork destination processor 1-j by the register transfer unit 26 (Step S30a). During the transfer of the register file 25 by the register transfer unit 26, writing into the register file 25 from the execution unit 23 is waited.

The operation when the execution of the instruction advances in the processor 1-i and the value of the PC 21 is coincident with the fork destination address stored in the register 27 is the same as that of the first embodiment.

Figure 13:
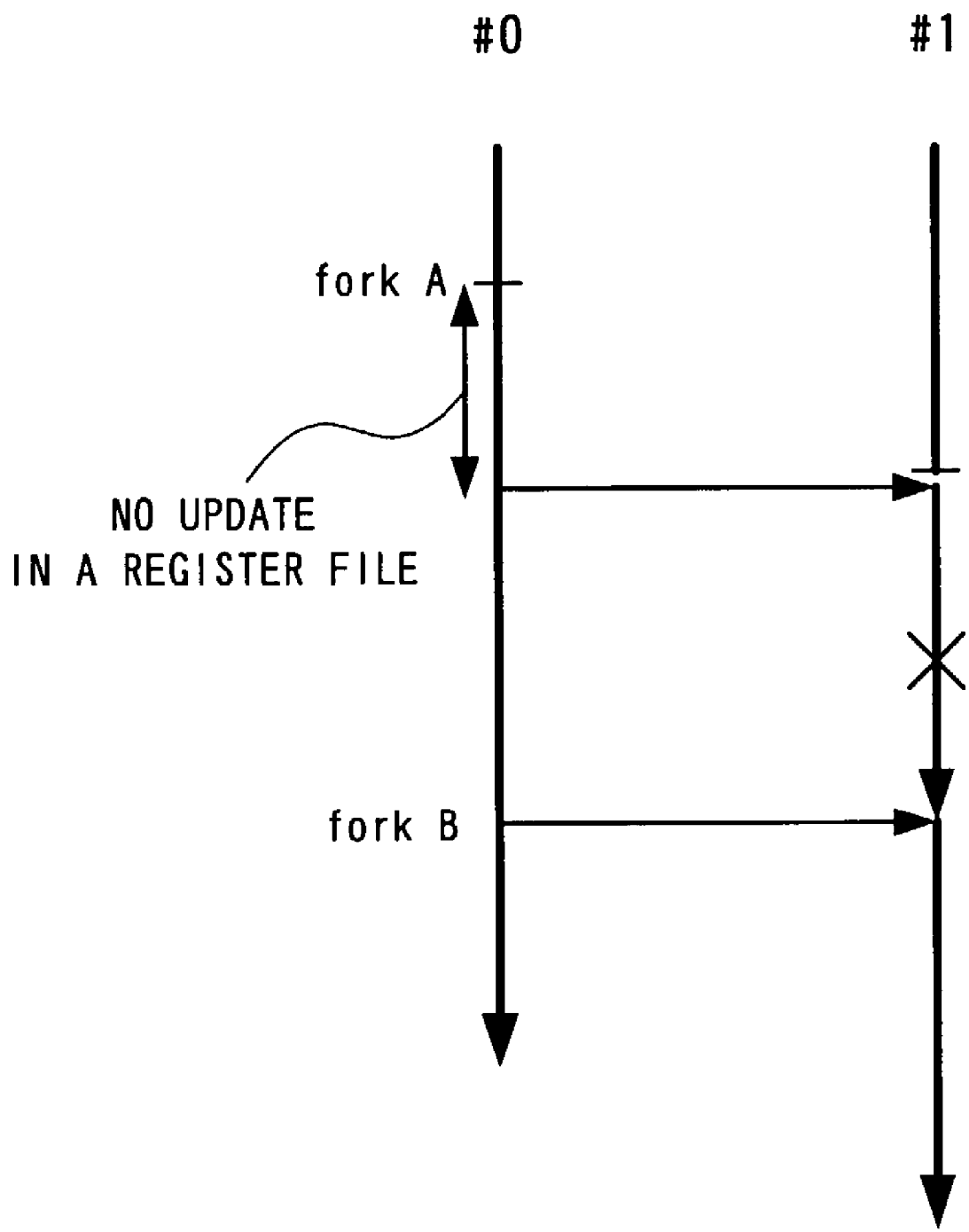
FIG. 13 is a view showing an example of an execution sequence of the multi-thread executing method according to the second embodiment of the first invention in the present invention.

An example of the execution sequence of the multi-thread executing method of this embodiment is shown in FIG. 13. An arrow extending from the fork instruction A to the bottom shows the period where the register file 25 is not updated at all in the processor #0. FIG. 13 assumes the case where although the fork destination processor #1 is busy at a time of the first fork instruction A as for the thread executed by the processor #0, the fork destination processor #1 becomes free during the above period where the register file 25 of the processor #0 is not updated at all. In this embodiment, a fork is performed according to the fork instruction A in such a case.

As mentioned above, this embodiment can obtain the same effect as that of the first embodiment, and since a fork is performed when the fork destination processor turns free before the register file is updated, even if a parent thread fails to fork a child thread at a time of a fork instruction after the parent thread starts, a possibility of fork is much more increased than in the first embodiment, thereby improving the parallelism of thread execution.

(Third Embodiment of First Invention)

In the second embodiment, if a fork is impossible at a fork point of a parent thread, the fork is once held, and when there appears no other processor that can start the execution of a child thread before the register file of the parent thread is updated, the same fork is abandoned. In this embodiment, however, even if the register file of the parent thread is updated, if this update is not related with a register to be inherited by a child thread, the fork is performed. Hereafter, a description of this embodiment will be described below, mainly about a difference between the second embodiment and this embodiment.

Figure 14:
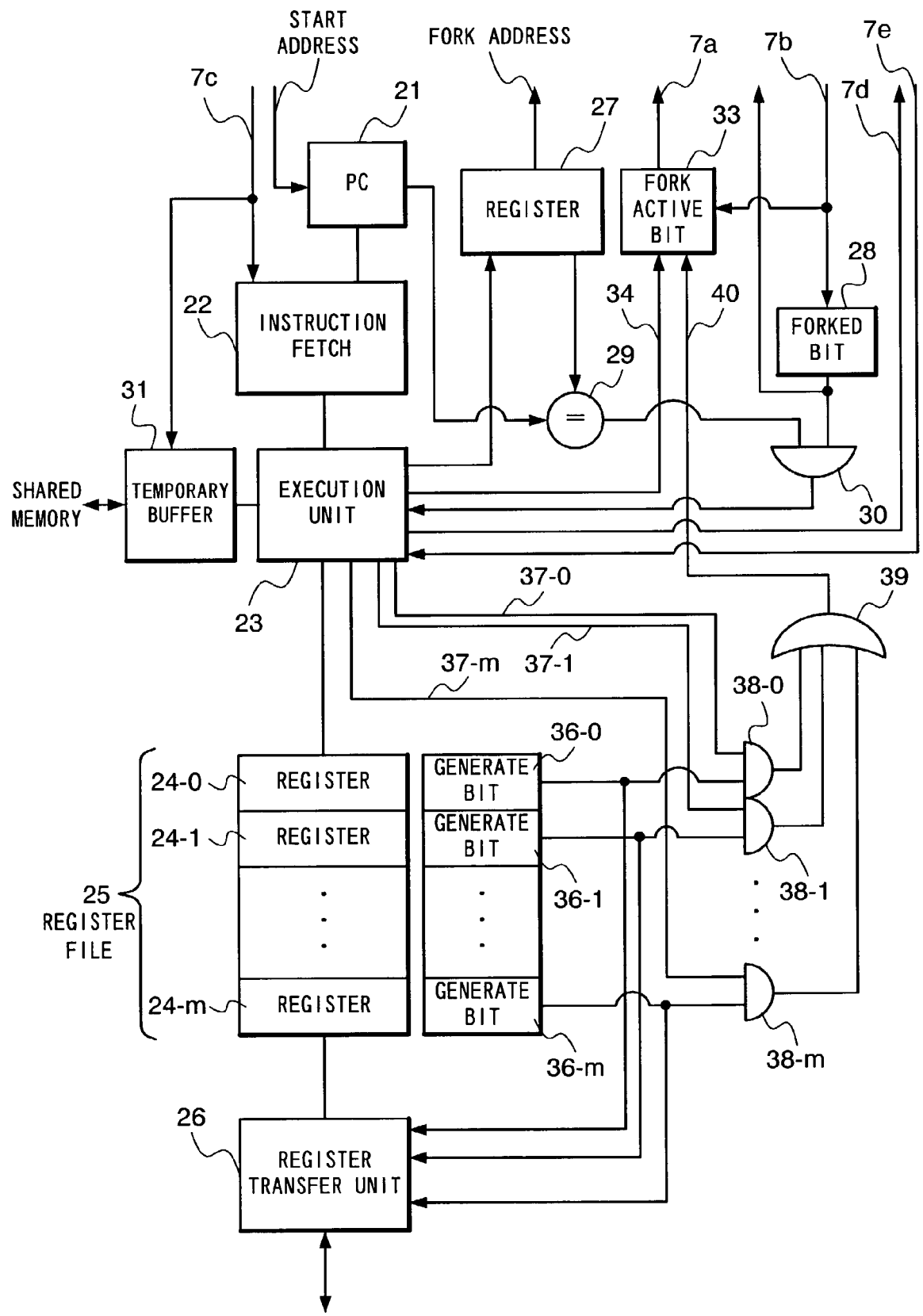
FIG. 14 is a block diagram showing an example of the structure of a processor in a parallel processing system according to a third embodiment of the first invention in the present invention.

With reference to FIG. 14, in addition to the structure shown in FIG. 11, each processor 1-i of the parallel processing system of this embodiment comprises generate bits 36-k, corresponding to respective registers 24-k (k=0 to m) of the register file 25 in one-to-one relation, which are set only when the corresponding register 24-k is a register to be inherited by the child thread of the register file 25, AND gates 38-k, corresponding to the respective registers 24-k in one-to-one relation, for receiving the output of the respective generate bits 36-k of the respective registers 24-k and respective register update signals 37-k supplied when the execution unit 23 updates the respective registers 24-k, and an OR gate 39 for supplying a fork invalid signal 40 that is a logical OR signal of the output of the AND gates 38-k. Instead of the register update signal 35 of FIG. 11, the fork invalid signal 40 is supplied to the fork active bit 33 as a reset signal. The values of each generate bit 36-k are supplied to the register transfer unit 26. The register transfer unit 26 is designed to transfer only a register with the corresponding generate bit 36-k set there, of the registers 24-k of the register file 25, to the register file of the fork destination processor.

Figure 15:
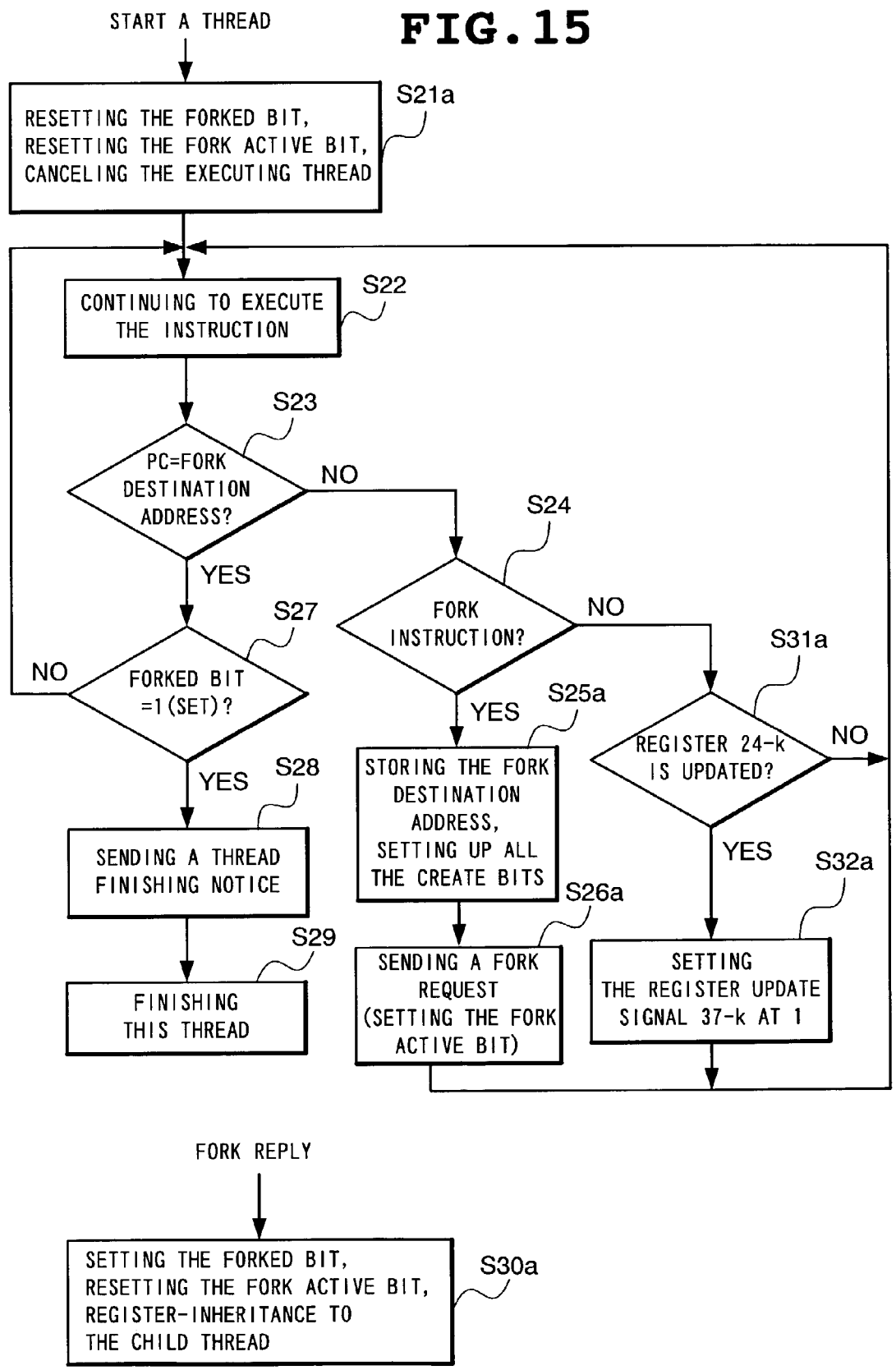
FIG. 15 is a flow chart showing an example of the processing of a processor from start to finish of a thread in a parallel processing system according to a third embodiment of the first invention in the present invention.

The outline of the processing of the processor 1-i from start to finish of a thread is shown in FIG. 15. Based on the thread starting request 7c from the thread controller 3, when the processor 1-i starts the execution of a thread, the forked bit 28 and the fork active bit 33 of the same processor 1-i are reset, and if it is executing a thread, the same thread is cancelled (Step S21a). Hereinafter, fetch, decode, and execution of a thread instruction are continuously performed (Step S22).

When the instruction decoded by the execution unit 23 is a fork instruction (YES in Step S24), the execution unit 23 stores the fork destination address into the register 27 and sets up all the generate bits 36-k (Step S25a). Namely, of all the registers 24-k of the register file 25, the generate bit 36-k corresponding to a register which should be inherited by a child thread is set, and the generate bit 36-k corresponding to a register which doesn't need to be inherited is kept reset. By setting the fork active bit 33 according to the fork signal 34 (Step S26a), the execution unit 23 sends the fork request 7a accompanied by the fork destination address and the value of the forked bit 28 to the thread controller 3. Further, when the execution unit 23 updates the register 24-k of the register file 25 (YES in Step S31a), it sets the register update signal 37-k corresponding to the updated register 24-k at logic "1". Thus, when the updated register 24-k is a register which should be inherited by a child thread, the output of the AND gate 38-k corresponding to the register 24-k becomes logic "1", and the fork invalid signal 40 is supplied from the OR gate 39, hence to reset the fork active bit 33 (Step S32a). Namely, the processor 1-i continues to supply the fork request 7a to the thread controller 3 during a period from a fork instruction execution to first update in one of the inherited registers by a child thread, of the register file 25.

The thread controller 3 sends the fork reply 7b to the processor 1-i when a fork toward the neighboring processor 1-j becomes possible while the processor 1-i is supplying the fork request 7a, and forks a child thread (Step S4) by sending the thread starting request 7c to the other processor 1-j. According to the fork reply 7b supplied to the processor 1-i, the forked bit 28 is set and the fork active bit 33 is reset. The register transfer unit 26 transfers at least a register to be inherited by a child thread, of the registers of the register file 25, to the fork destination processor 1-j (Step S30a).

The operation when the execution of an instruction advances in the processor 1-i and the value of the PC 21 is coincident with the fork destination address stored in the register 27, is the same as that of the second embodiment.

In the multi-thread executing method of this embodiment, an arrow extending from the fork instruction A to the bottom in FIG. 13 shows the period where the register to be inherited by a child thread, of the registers of the register file 25, is not updated at all by the processor #0. Accordingly, a possibility of a fork can be much more increased than in the second embodiment, not to mention the first embodiment.

In this embodiment, it is necessary to clear the register to be inherited by a child thread at a fork point of a parent thread. Therefore, the control/data flow analyzing unit 440 in the compiler 410 shown in FIG. 10 examines a register to be inherited by a child thread from a parent thread, for every child thread being forked, and based on the examination result, the parallel code inserting unit 450 inserts a description specifying the register to be inherited by a child thread, into the parallel program 430. This specification of the register to be inherited by a child thread can be done by a fork instruction, an exclusive instruction other than the fork instruction, and the like.

The register transfer unit 26 in this embodiment, although only the register to be inherited by a child thread, of the register file 25 of a parent thread, is transferred to the register file of the fork destination processor, by referring to the generate bits 36-k, as another embodiment, a sequence for transferring the registers sequentially from the head register of the register file 25 in a predetermined order may be started and stopped at a time of finishing the transfer of all the registers with the generate bits 36-k set. In this method, there is a case of transferring even a register that doesn't need to be inherited by a child thread, but it is effective in simplifying the transfer sequence. Needless to say, as another embodiment, the register transfer unit 26 may be designed so as to always transfer all the registers without referring to the generate bits 36-k. Further, even if a register to be inherited by a child thread, when the value of this register of the fork destination processor already becomes equal to the value of that on the side of a parent thread at a fork point, paying attention to that it doesn't dare to transfer the above, a register whose value becomes different from that on the side of a parent thread is detected, of the registers to be inherited by a child thread, and only this detected register may be transferred to the fork destination processor from the register transfer unit 26.

As mentioned above, this embodiment can obtain the same effect as that of the second embodiment. Even if the register file of a parent thread is updated, when this update is not performed on a register to be inherited by a child thread, a fork is possible. Therefore, this embodiment can increase a possibility of a fork compared with the second embodiment, hence to improve the parallelism of thread execution.

(Fourth Embodiment of First Invention)

This embodiment is different from the first to the third embodiments in that the execution of a fork instruction is waited until the neighboring processor comes into a free state, when the neighboring processor is busy at a time of the fork instruction, after the execution of a parent thread starts. This embodiment will be, hereafter, described mainly about a difference point between the second embodiment and this embodiment.

Figure 16:
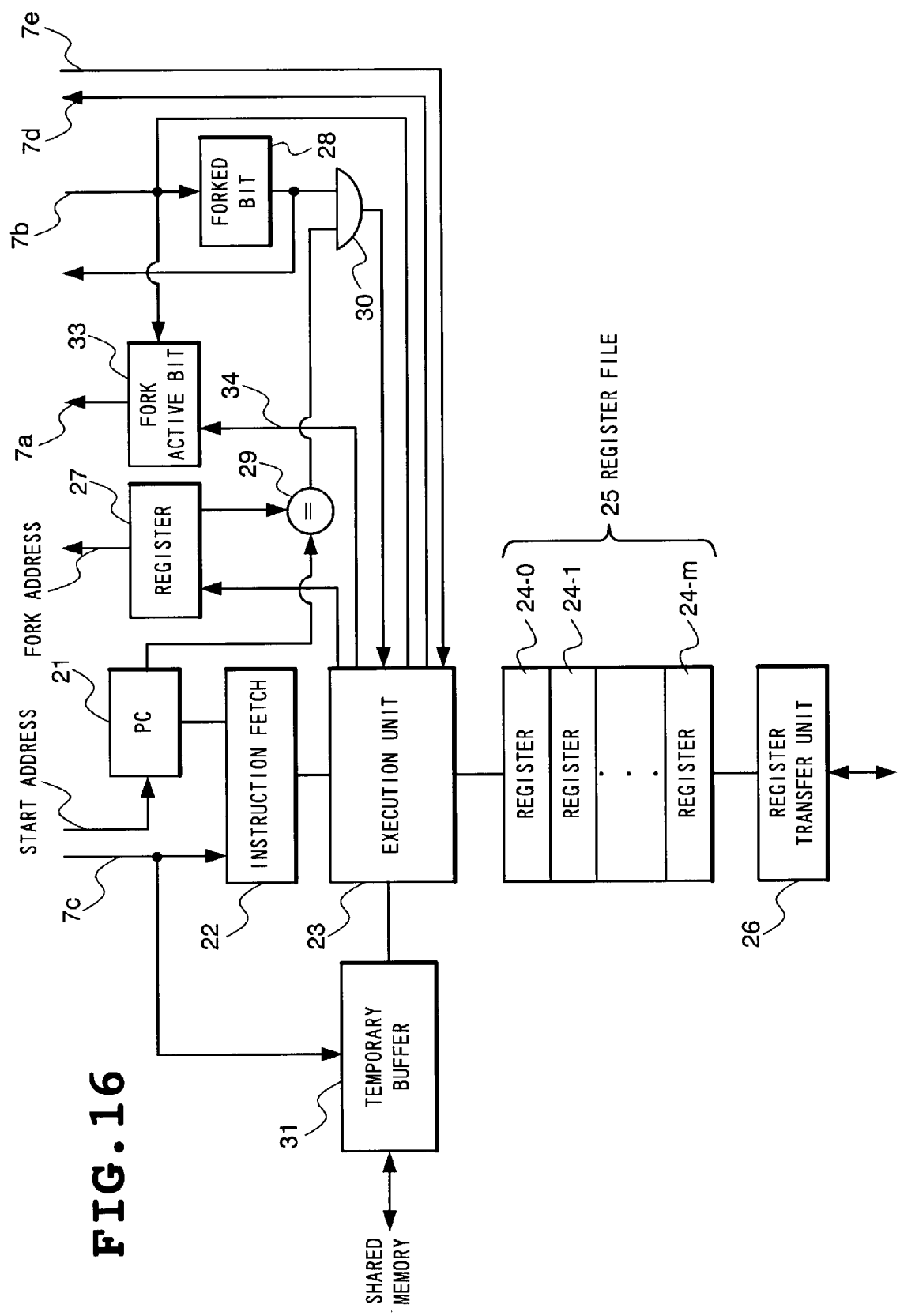
FIG. 16 is a block diagram showing an example of the structure of a processor in a parallel processing system according to a fourth embodiment of the first invention in the present invention.

With reference to FIG. 16, each processor 1-i of the parallel processing system in this embodiment has the substantially same structure as that shown in FIG. 11. It is different from the above in that the fork reply 7b sent from the thread controller 3 is also supplied to the execution unit 23 and that the execution unit 23 waits for the execution of a fork instruction until the fork reply 7b is returned, at a time of the fork instruction execution. Further, there exists no register update signal 35 for resetting the fork active bit 33 by the execution unit 23.

Figure 17:
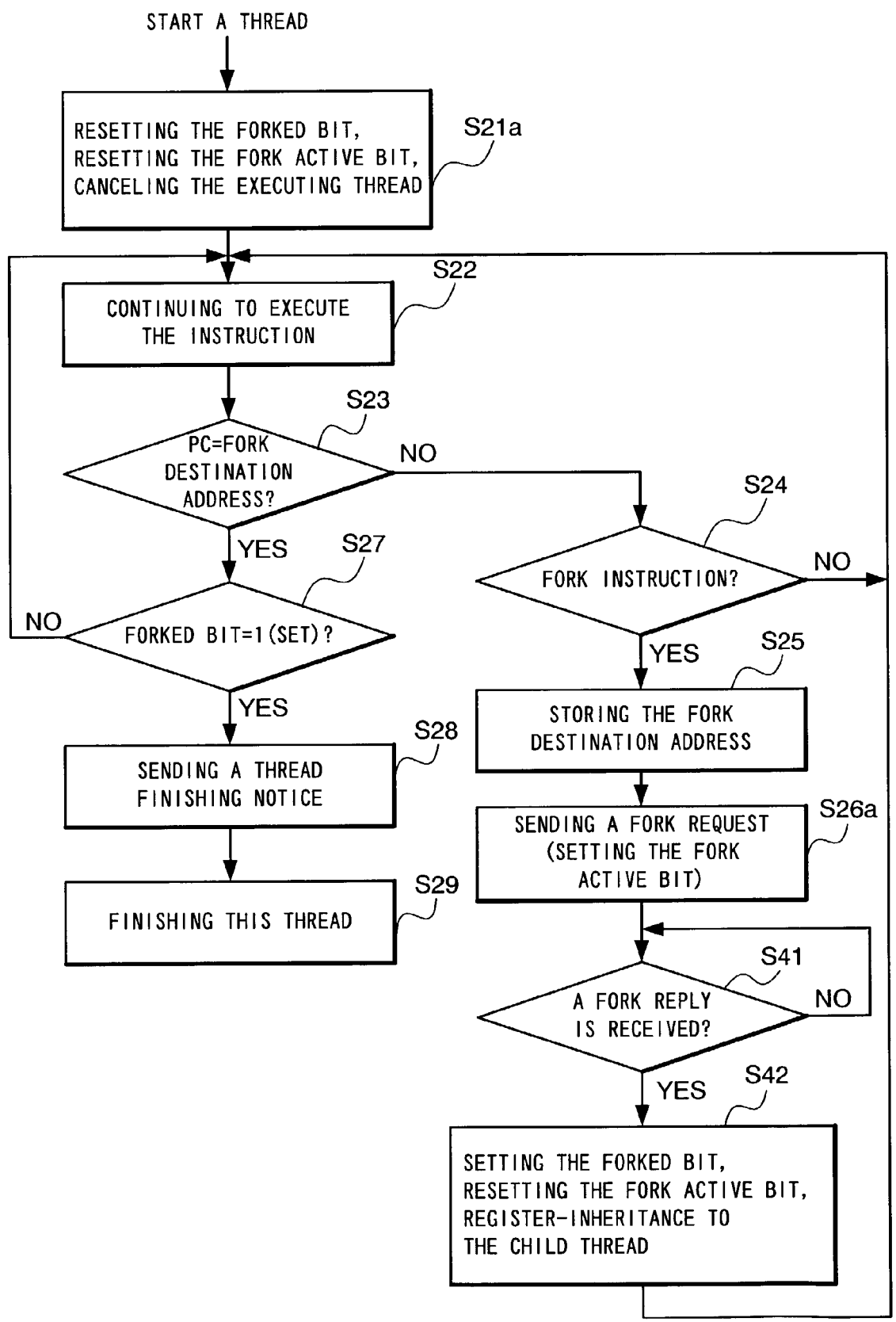
FIG. 17 is a flow chart showing an example of the processing of the processor from start to finish of a thread in the parallel processing system according to the fourth embodiment of the first invention in the present invention.

The outline of the processing of the processor 1-i from start to finish of a thread is shown in FIG. 17. When the processor 1-i starts the execution of a thread, based on the thread starting request 7c from the thread controller 3, the forked bit 28 and the fork active bit 33 of the above processor 1-i are reset, and if it is executing a thread, the thread is cancelled (Step S21a). Hereafter, fetch, decode, and execution of a thread instruction are continuously performed (Step S22).

When the instruction decoded by the execution unit 23 is a fork instruction (YES in Step S24), the execution unit 23 stores the fork destination address into the register 27 (Step S25), and sends the fork request 7a accompanied by the fork destination address and the value of the forked bit 28 to the thread controller 3, by setting the fork active bit 33 according to the fork signal 34 (Step S26a). Then, it waits for the fork reply 7b to be returned from the thread controller 3 (Step S41).

The thread controller 3 sends the fork reply 7b to the processor 1-i when the fork toward the neighboring processor 1-j becomes possible, while the fork request 7a is supplied from the processor 1-i, and forks a child thread (Step S4) by supplying the thread starting request 7c to the other processor 1-j. The processor 1-i, upon receipt of the fork reply 7b from the thread controller 3, sets the forked bit 28 and resets the fork active bit 33, and transfers the content of the register file 25 to the fork destination processor 1-j by the register transfer unit 26 (Step S42).

The operation when the execution of an instruction advances in the processor 1-i and the value of the PC 21 is coincident with the fork destination address stored in the register 27, is the same as that of the second embodiment.

(Fifth Embodiment of First Invention)

This embodiment is different from the first to the fourth embodiments in that the content of the register file is saved when the neighboring processor is busy at a time of a fork instruction, after the execution of a parent thread starts, and that when the neighboring processor comes into a free state, the child thread is forked based on the saved information. Hereafter, this embodiment will be described, mainly about a difference between the fourth embodiment and this embodiment.

Figure 18:
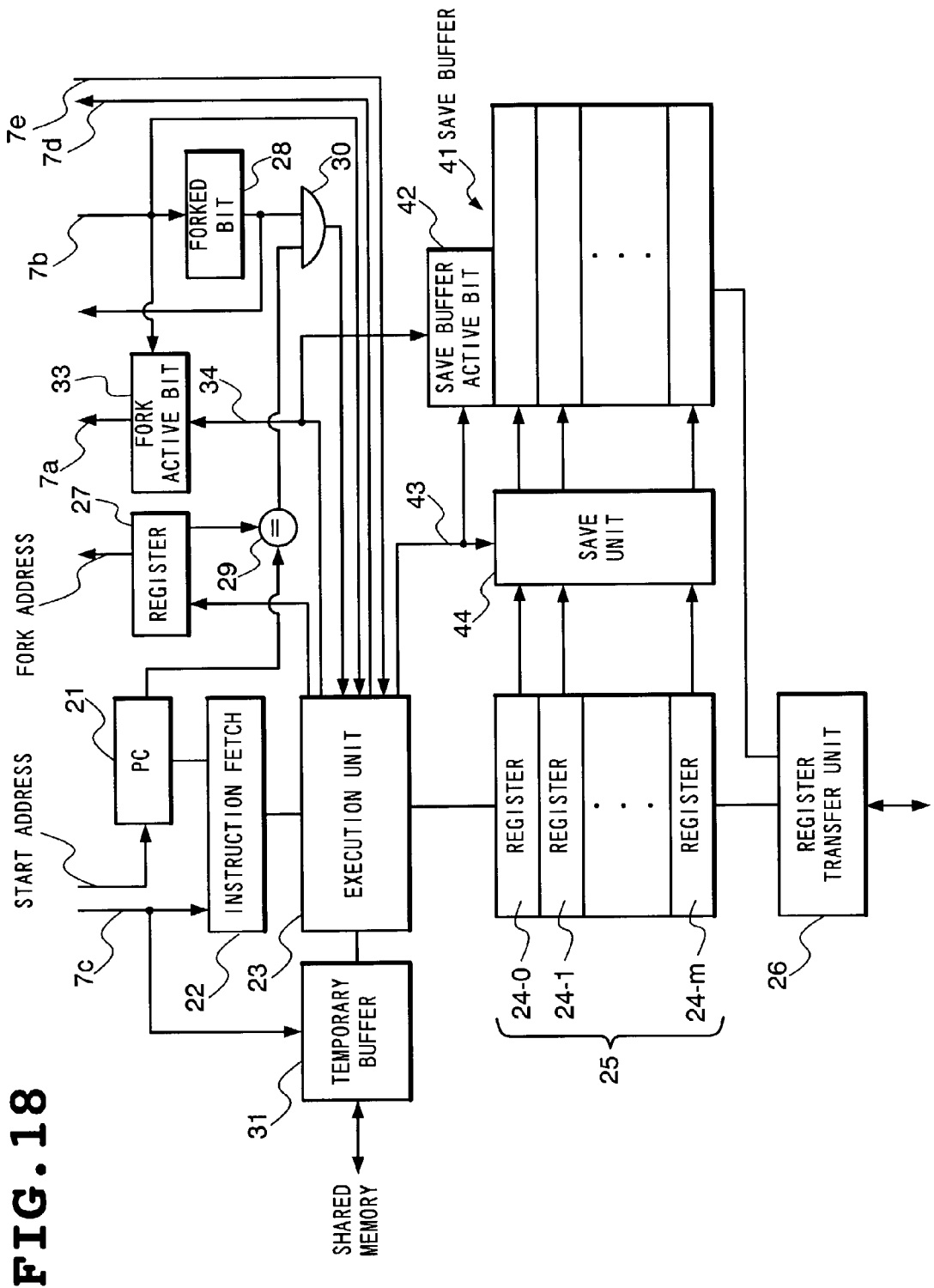
FIG. 18 is a block diagram showing an example of the structure of a processor in a parallel processing system in a fifth embodiment of the first invention in the present invention.

With reference to FIG. 18, each processor 1-i of the parallel processing system in this embodiment comprises a save buffer 41, a save buffer active bit 42, and a save unit 44 for saving the content of the register file 25 into the save buffer 41 upon activation according to the save signal 43 supplied from the execution unit 23, in addition to the structure shown in FIG. 16, and the register transfer unit 26 is connected to the register file 25 and the save buffer 42. The save buffer active bit 42 is reset according to the fork signal 34 supplied from the execution unit 23 and set according to the save signal 43, and reset when a fork based on the save buffer 41 is performed.

Figure 19:
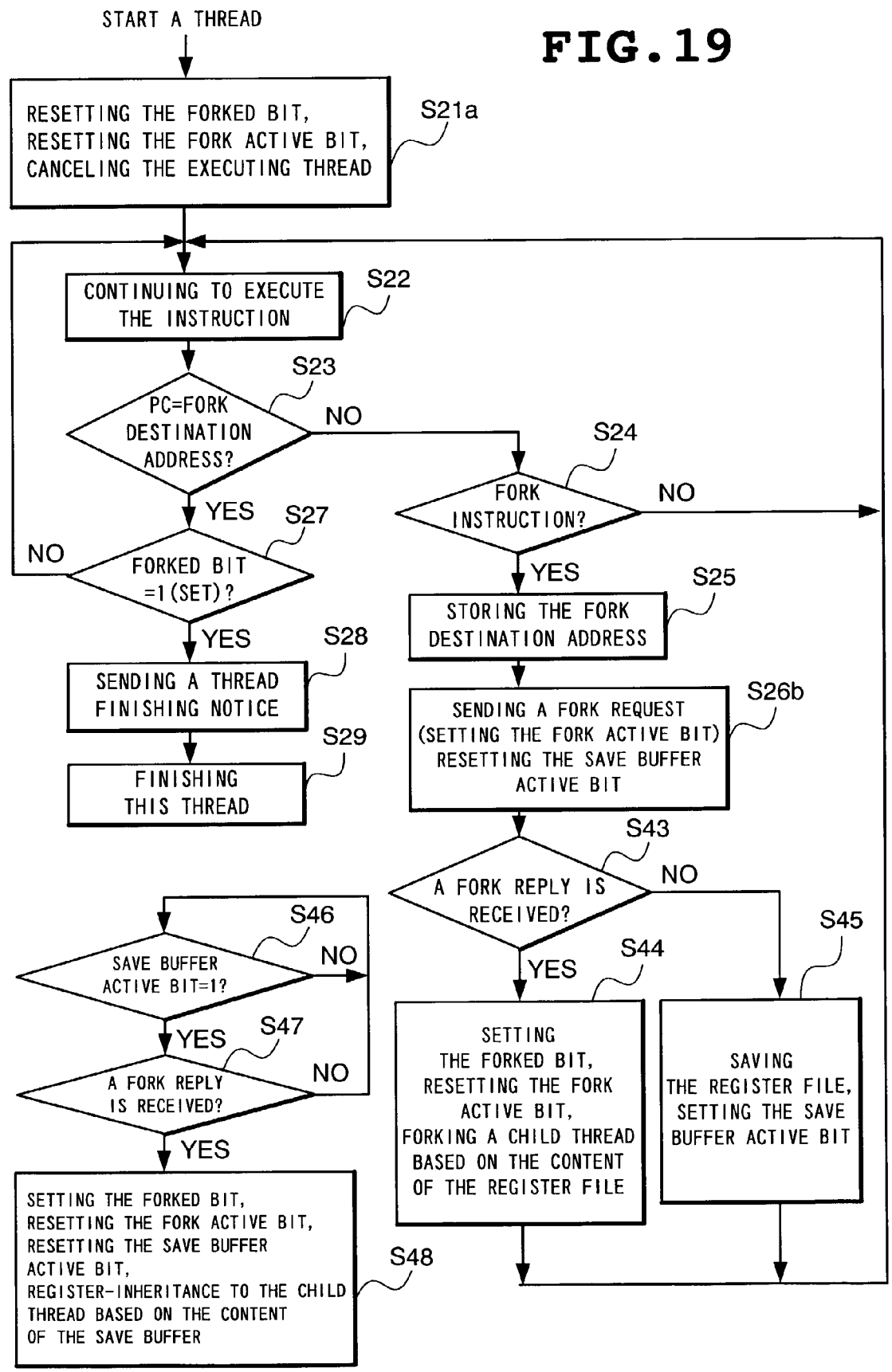
FIG. 19 is a flow chart showing an example of the processing of the processor from start to finish of a thread in the parallel processing system according to the fifth embodiment of the first invention in the present invention.

The outline of the processing of the processor 1-i from start to finish of a thread is shown in FIG. 19. When the processor 1-i starts the execution of a thread, based on the thread starting request 7c from the thread controller 3, the forked bit 28 and the fork active bit 33 of the above processor 1-i are reset, and if the processor 1-i is executing a thread, the thread is cancelled (Step S21a). Hereafter, fetch, decode, and execution of a thread instruction are continuously performed (Step S22).

When the instruction decoded by the execution unit 23 is a fork instruction (YES in Step S24), the execution unit 23 stores the fork destination address into the register 27 (Step S25), and sends the fork request 7a accompanied by the fork destination address and the value of the forked bit 28 to the thread controller 3 (Step S26a), by setting the fork active bit 33 according to the fork signal 34. At this time, the save buffer active bit 42 is reset. When the fork reply 7b is returned from the thread controller 3 within a predetermined hour (YES in Step S43), the execution unit 23 sets the forked bit 28 and resets the fork active bit 33, and transfers the content of the register file 25 to the fork destination processor 1-j by the register transfer unit 26 (Step S44).

On the other hand, when the fork reply 7b is not returned from the thread controller 3 within a predetermined hour (NO in Step S43), the execution unit 23 saves the content of the register file 25 into the save buffer 41 by activating the save unit 44 according to the save signal 43 and sets the save buffer active bit 42 (Step S45). When receiving the fork reply 7b from the thread controller 3 while the save buffer active bit 42 is being set (YES in Steps S46 and S47), the execution unit 23 transfers the content of the register file 25 saved in the save buffer 41 to the fork destination processor 1-j by the register transfer unit 26 (Step S48). At this time, the forked bit 28 is set and the fork active bit 33 and the save buffer active bit 42 are reset. When the fork reply 7b to the last fork instruction is not returned from the thread controller 3 before the execution of the next fork instruction, since the save buffer active bit 42 is reset by the execution of this fork instruction (Step S26), the last fork instruction results in an invalid instruction.

The operation when the execution of an instruction advances in the processor 1-i and the value of the PC 21 is coincident with the fork destination address stored in the register 27, is the same as that of the fourth embodiment.

(Sixth Embodiment of First Invention)

Although each processor 1-i finishes the processing of a thread when the value of its program counter is coincident with the start address of the effective child thread, in the first to the fifth embodiments, each processor finishes the processing of a thread according to a term instruction corresponding to a fork instruction forking the effective child thread, of the term instructions inserted just before the fork destination addresses of the parallel program correspondingly to the respective fork instructions, in this embodiment. Hereafter, this embodiment will be described, mainly about a difference between the first embodiment and this embodiment.

Figure 20:
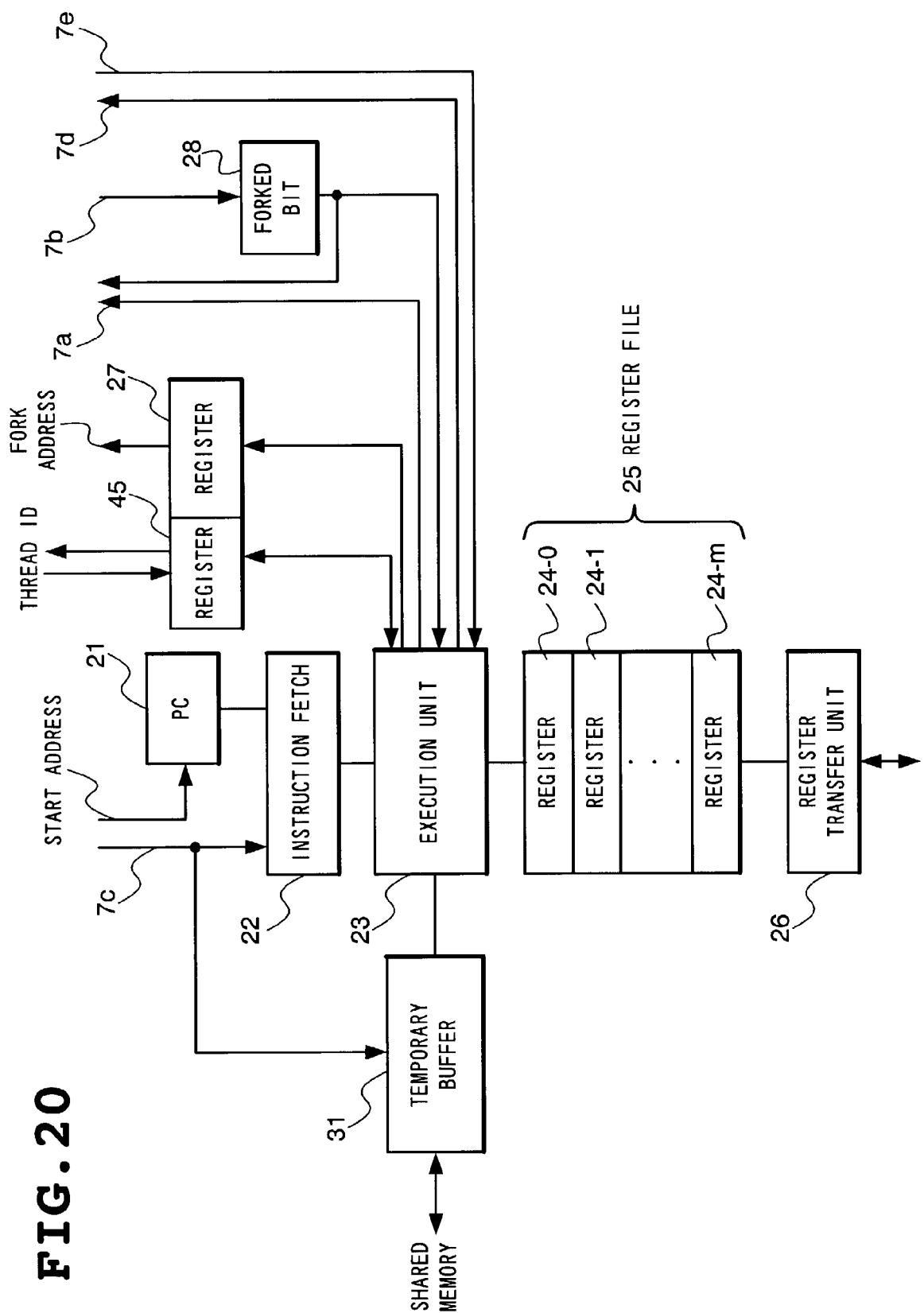
FIG. 20 is a block diagram showing an example of the structure of a processor in a parallel processing system according to a sixth embodiment of the first invention in the present invention.

With reference to FIG. 20, each processor 1-i of the parallel processing system in this embodiment excludes the coincidence circuit 29 and the AND gate 30 from the processor shown in FIG. 6, the output of the forked bit 28 is supplied to the execution unit 23, and a register 45 for holding a thread ID is provided in this embodiment. In this register 45, a thread ID accompanying the thread starting request 7c from the thread controller 3 is initially set, and every time the processor 1-i executes a fork instruction, the thread ID specified by the fork instruction is set. Further, the fork request 7a toward the thread controller 3 includes the fork destination address stored in the register 27 and the thread ID stored in the register 45 and the value of the forked bit 28.

When sending the thread starting request 7c to the fork destination processor 1-j in Step S4 in FIG. 4, the thread controller 3 also sends the fork destination address and the thread ID accompanying the fork request 7a from the processor 1-i there.

Figure 21:
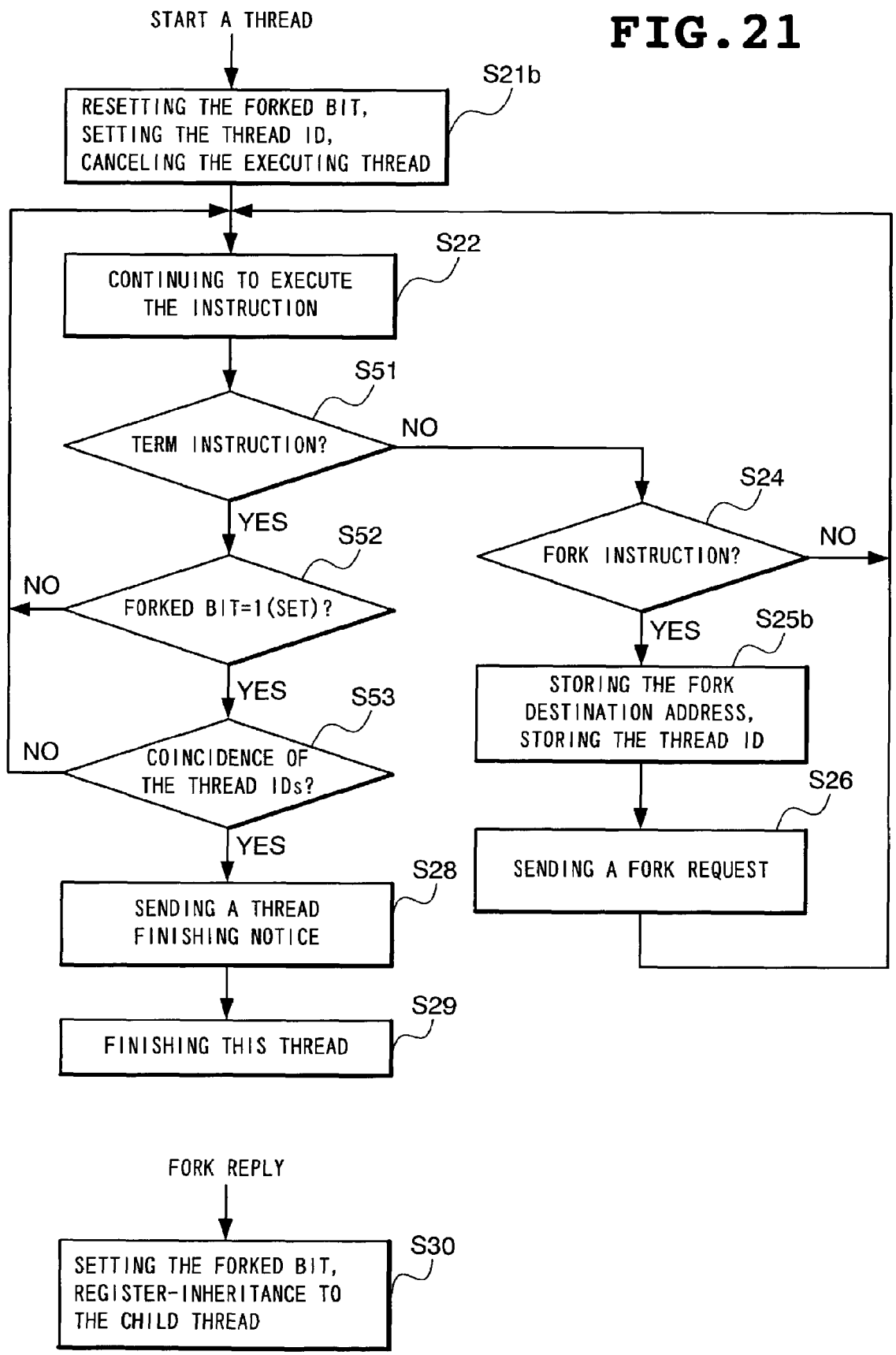
FIG. 21 is a flow chart showing an example of the processing of the processor from start to finish of a thread in the parallel processing system according to the sixth embodiment of the first invention in the present invention.

The outline of the processing of the processor 1-i from start to finish of a thread is shown in FIG. 21. When the processor 1-i starts the execution of a thread, based on the thread starting request 7c from the thread controller 3, the forked bit 28 of the above processor 1-i is reset, thread ID accompanying the thread start request 7c is set in the register 45, and if the processor 1-i is executing a thread, the thread is cancelled (Step S21b). Hereafter, fetch, decode, and execution of a thread instruction are continuously performed (Step S22).

When the instruction decoded by the execution unit 23 is a fork instruction (YES in Step S24), the execution unit 23 stores the fork destination address into the register 27 and stores (overwrites) the thread ID specified by the fork instruction into the register 45 (Step S25b), and sends the fork request 7a accompanied by the fork destination address stored in the register 27, the thread ID stored in the register 45, and the value of the forked bit 28, to the thread controller 3 (Step S26). The thread controller 3 returns the fork reply 7b to the processor 1-i of the request source if a fork toward the neighboring processor 1-j is possible, and sends the thread starting request 7c with the fork destination address and the thread ID attached, to the neighboring processor 1-j. The processor 1-i receiving the fork reply 7b sets the forked bit 28 at 1, and performs the register-value inheritance to transfer the content of the register file 25 of the parent thread to the register file of the fork destination processor 1-j through the communication bus 6 by the register transfer unit 26 (Step S30). The processing of Step S21 and later in FIG. 21 will be executed in the fork destination processor 1-j.

On the other hand, the thread controller 3 abandons the fork request 7a sent from the processor 1-i if a fork toward the neighboring processor 1-j is impossible. Accordingly, this fork instruction executed by the processor 1-i is made invalid, and the fork of a child thread according to the above fork instruction is abandoned.

When the instruction decoded by the execution unit 23 is a term instruction (YES in Step S51), the execution unit 23 sends the thread finishing notice 7d to the thread controller 3 (Step S28), by executing the term instruction, when the forked bit 28 is set at 1 and the thread ID specified by the term instruction is coincident with the thread ID stored in the register 45 (YES in Steps S52 and S53), and finishes the processing of the thread when receiving the thread finish permission 7e from the thread controller 3 (Step S29). When the forked bit 28 is not set at 1 or the thread ID specified by the term instruction is not coincident with the thread ID stored in the register 45, the execution unit 23 makes the above term instruction invalid and continues to execute the instruction according to the PC 21 (Step S22).

In this embodiment, since each processor finishes the processing of a thread according to the term instruction, the parallel code inserting unit 450 in the compiler 410 of FIG.

10 inserts a term instruction having the same thread ID as the thread ID attached to the fork instruction to fork a child thread, just before the starting point of the child thread.

Similarly to this embodiment, the second and the fifth embodiments can be modified so that each processor can finish the processing of a thread according to a term instruction corresponding to a fork instruction having forked the effective child thread, of the term instructions inserted just before the fork destination addresses within the parallel program correspondingly to the respective fork instructions.

As mentioned above, the first invention can achieve the multi-thread execution by the Fork-Once Parallel Execution model even if in a parallel program without any assurance of the Fork-Once limitation and obtain the following effects.

(1) When there already exists a child thread generated from a parent thread for every fork instruction of the parent thread, the child thread is cancelled, thereby assuring the Fork-Once limitation at a time of program execution. Therefore, the operation is decisive and the control is easy.

(2) The size of the grains of a thread becomes smaller than that of the second invention described later, thereby making the grain size uniform easily.

(3) The control dependency speculation processing becomes possible without a thread abort instruction.

This time, preferred embodiments of the second invention will be described in detail with reference to the drawings.

(First Embodiment of Second Invention)

A parallel processing system according to this embodiment has the same structure as the parallel processing system shown in FIG. 2. However, each processor 1-i is not necessarily provided with a function of canceling the execution of a thread by a temporary buffer. When each processor 1-i sends the fork request 7a to the thread controller 3 through the signal line 2-i, the fork destination address of a child thread (start PC value) is attached to the fork request 7a, but the child thread-generated signal is not attached there.

Figure 22:
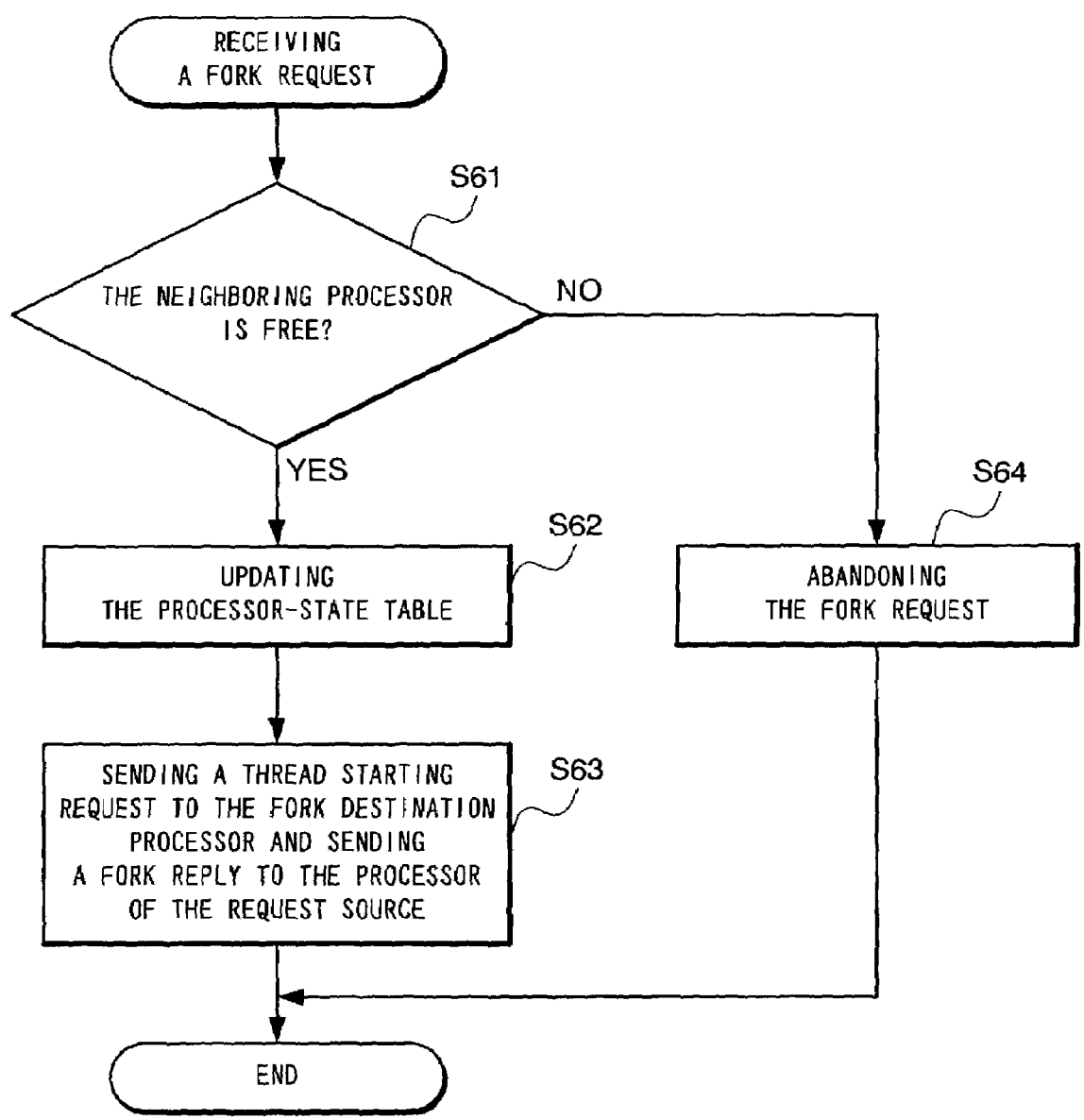
FIG. 22 is a flow chart showing another embodiment when the thread control sequencer of the thread controller in the parallel processing system of the present invention receives a fork request from a processor.

With reference to FIG. 22, in the case of this embodiment, upon receipt of the fork request 7a from one of the processors 1-i at a timing of some clock, the thread control sequencer 11 of the thread controller 3 checks the state of the neighboring processor 1-j in the processor state table 12. When it is free (YES in Step S61), since a fork is possible, the entry 13-j corresponding to the processor 1-j in the processor state table 12 is updated from a free state to a busy state (Step S62). Then, the thread control sequencer 11 sends the thread starting request 7c with the fork destination address accompanying the fork request 7a attached there, to the fork destination processor 1-j and returns the fork reply 7b to the processor 1-i of request source (Step S63). When the neighboring processor 1-j is busy (NO in Step S61), since a fork is impossible, the thread control sequencer 11 abandons the fork request 7a (Step S64). The processing when the thread control sequencer 11 receives the thread finishing notice 7d from some processor 1-i is the same as that of FIG. 5.

Figure 23:
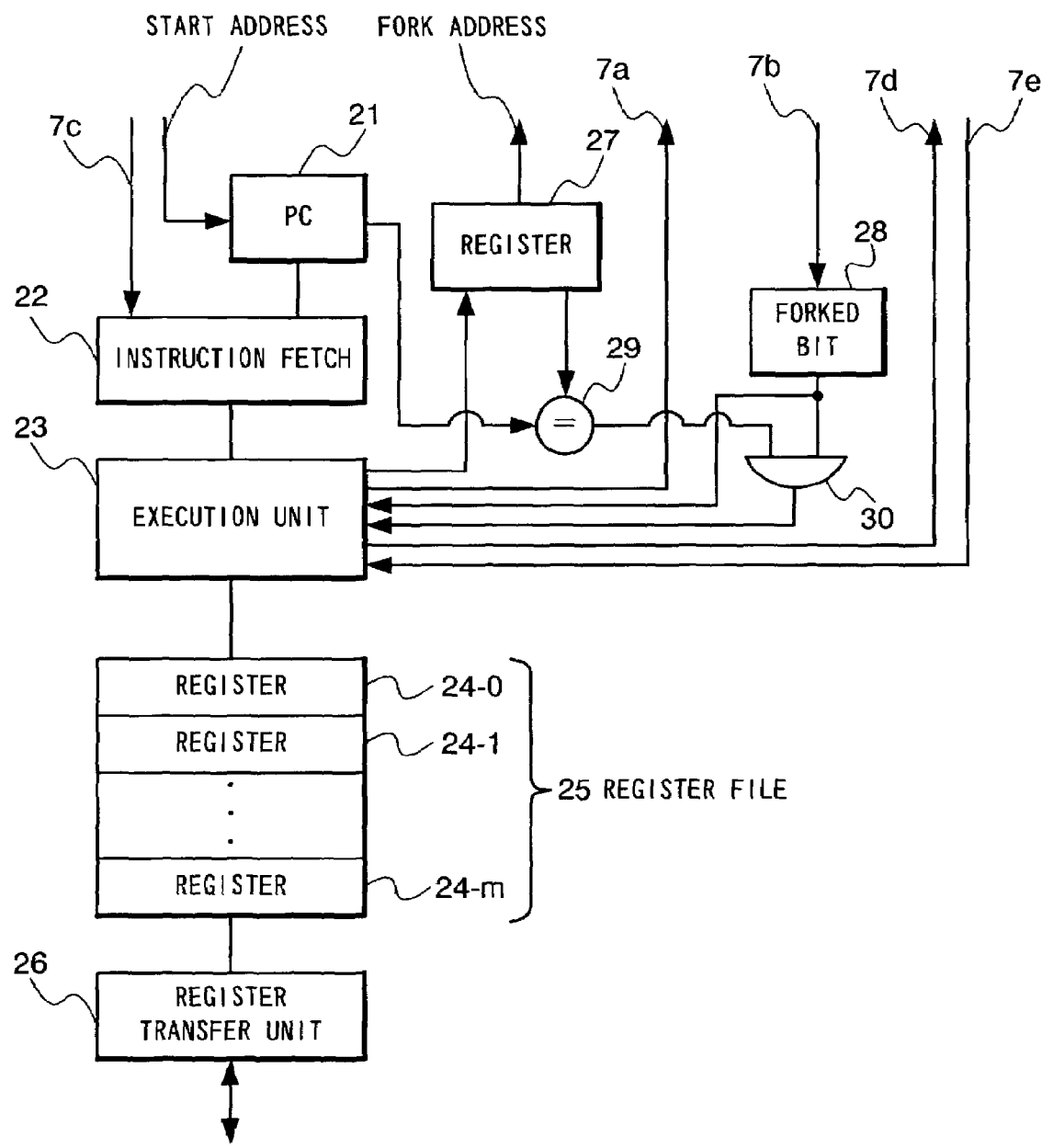
FIG. 23 is a block diagram showing an example of the structure of a processor in a parallel processing system according to a first embodiment of a second invention in the present invention.

With reference to FIG. 23, each processor 1-i comprises a PC 21 which is properly updated after the start address value accompanying the thread starting request 7c sent from the thread controller 3 is set, an instruction fetch unit 22 for fetching a thread instruction from the memory 5 according to the PC 21, an execution unit 23 for decoding and executing the fetched instruction, a register file 25 that is a collection of general registers 24-0 to 24-m, a register transfer unit 26 for transferring the content of the register file to the fork destination processor through the communication bus 6, a register 27 for storing the fork destination address accompanying the fork request 7a which is sent from the executing unit 23 to the thread controller 3 at a fork instruction execution time, a forked bit 28 set by the fork reply 7b corresponding to the fork request 7a, a coincidence circuit 29 for checking whether the value of the PC 21 is coincident with the fork destination address stored in the register 27, and an AND gate 30 for supplying an AND signal of the output of the forked bit 28 and the coincidence circuit 29 to the executing unit 23, and the value of the forked bit 28 is also supplied to the execution unit 23.

According to the thread starting request 7c, each processor 1-i starts the execution of a thread from the start address accompanying the above request. The execution unit 23 checks whether the forked bit 28 is set or not at a time of decoding the fork instruction: if it is not set, the execution unit 23 executes the fork instruction, while if it is set, it makes the fork instruction invalid. Further, the execution unit 23 sends the thread finishing notice 7d to the thread controller 3 in order to finish the processing of a thread, when the value of the PC 21 is coincident with the fork destination address stored in the register 27 while the forked bit 28 is being set and the output of the AND gate 30 becomes logic "1". Even if the value of the PC 21 is coincident with the fork destination address stored in the register 27, if the forked bit 28 is not set, the output of the AND gate 30 doesn't become logic "1" and therefore the execution unit 23 continues to execute the instruction according to the PC 21.

The register transfer unit 26 starts the register transfer toward the fork destination processor at the timing at which the forked bit 28 is set. The register transfer unit 26 sends the register number (register address) and the value of a register of the register file 25 to the register file of the fork destination processor, for example, for every number of registers that can be transferred at once depending on the bus width of the communication bus 6, and in the register file 25 on the receiving side, the corresponding registers are rewritten.

Figure 24:
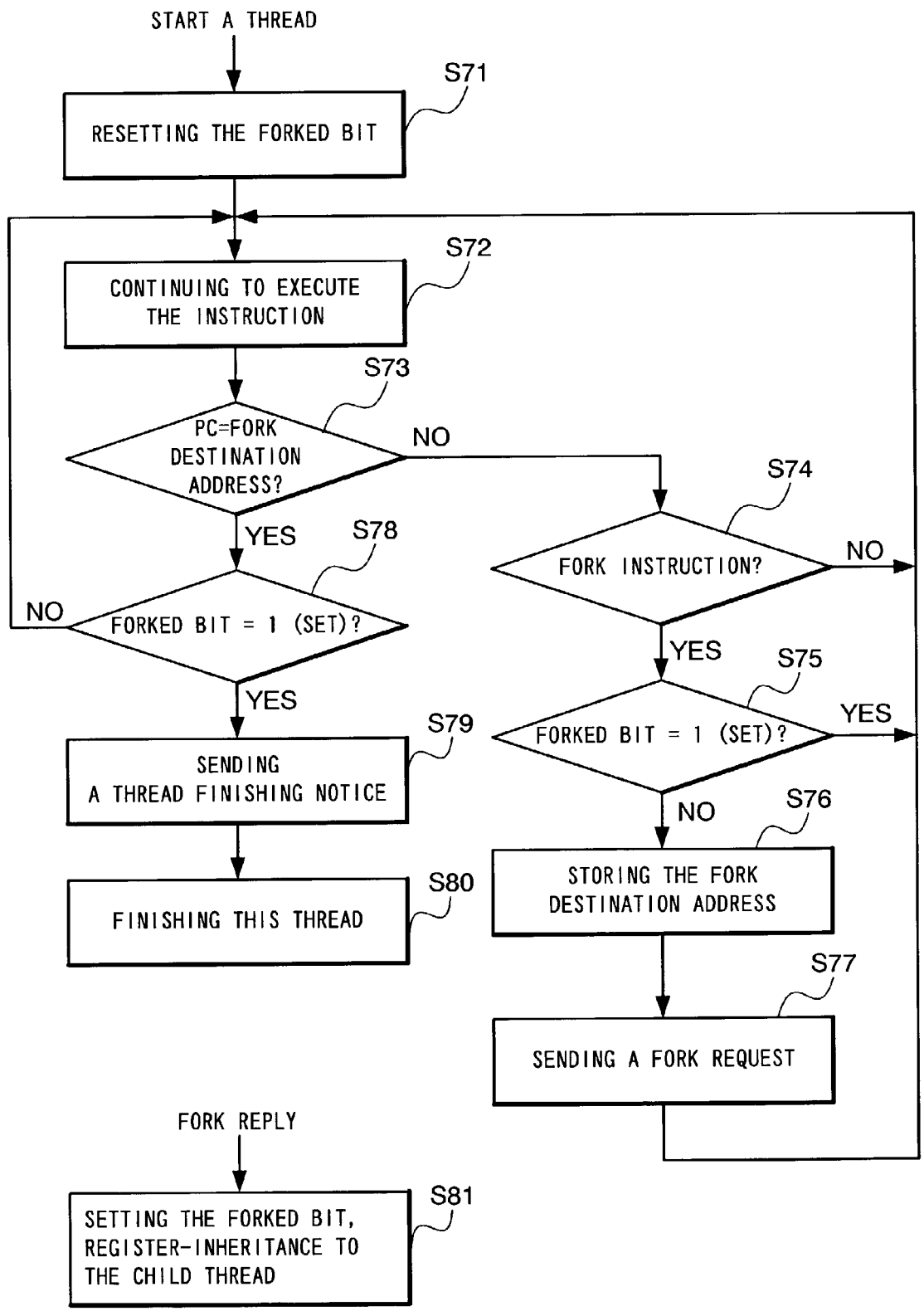
FIG. 24 is a flow chart showing an example of the processing of the processor from start to finish of a thread in the parallel processing system according to the first embodiment of the second invention in the present invention.

The outline of the processing by the processor 1-i from start to finish of a thread is illustrated in FIG. 24. Based on the thread starting request 7c from the thread controller 3, when the processor 1-i starts the execution of one thread, the forked bit 28 of the same processor 1-i is reset (Step S71). Hereinafter, fetch, decode, execution of a thread instruction will be continuously executed (Step S72).

In the case where the instruction decoded by the execution unit 23 is a fork instruction (YES in Step S74), the execution unit 23 makes this fork instruction invalid and executes the next instruction when the forked bit 28 is set at 1 (YES in Step S75), namely if one fork has been performed. While, when the forked bit 28 is set at 0 (NO in Step S75), namely if no fork has been performed after the execution of a parent thread, the execution unit 23 stores the fork destination address into the register 27 (Step S76) and sends the fork request 7a accompanied by the fork destination address stored in this register 27 to the thread controller 3 (Step S77).

The thread controller 3 returns the fork reply 7b to the processor 1-i of the request source when a fork toward the neighboring processor 1-j is possible, as mentioned above referring to FIG. 22, and sends the thread starting request 7c to the neighboring processor 1-j. The processor 1-i receiving the fork reply 7b sets the forked bit 28 at 1, and performs the register-value inheritance to transfer the content of the register file 25 of the parent thread to the register file of the fork destination processor 1-j through the communication bus 6 by the register transfer unit 26 (Step S81). The processing of Step S71 and later in FIG. 24 will be executed in the fork destination processor 1-j.

On the other hand, the thread controller 3 abandons the fork request 7a sent from the processor 1-i (Step S64) when a fork toward the neighboring processor 1-j is impossible. Accordingly, this fork instruction executed by the processor 1-i is made invalid, and the fork of a child thread according to the above fork instruction is abandoned.

When the execution of an instruction advances in the processor 1-i until the value of the PC 21 is coincident with the fork destination address stored in the register 27 (YES in Step S73), if the forked bit 28 is set (YES in Step S78), the output of the AND gate 30 becomes logic "1" and the execution unit 23 is interrupted. The above processor 1-i sends the thread finishing notice 7d to the thread controller 3 (Step S79), and finishes the processing of the thread (Step S80) when receiving the thread finish permission 7e from the thread controller 3. If the forked bit 28 is not set, the processor 1-i continues to execute the instruction according to the PC 21 (Step S72).

Figure 25:
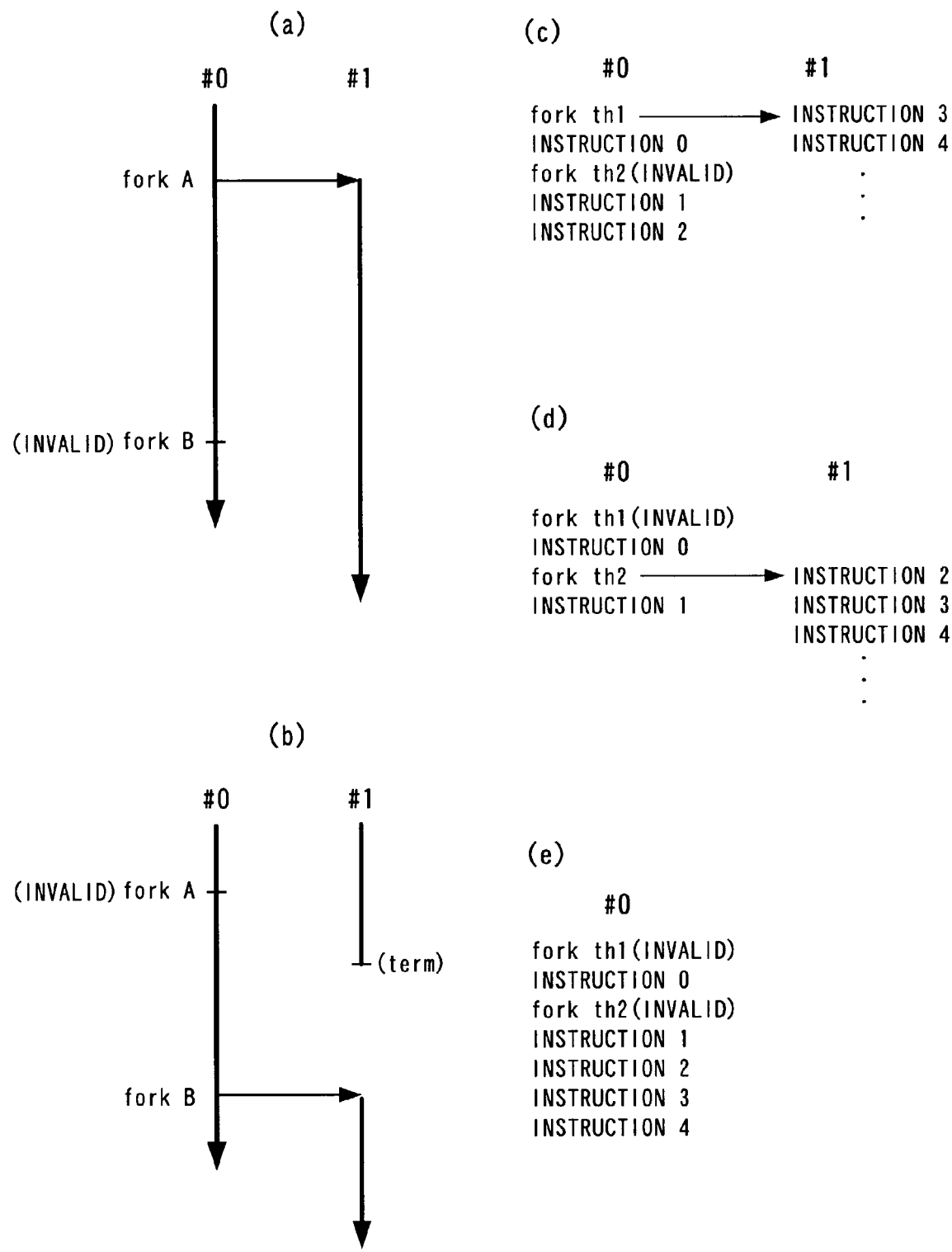
FIGS. 25(a)–25(e) are views showing an example of an execution sequence of a multi-thread executing method according to the first embodiment of the second invention in the present invention.

One example of the execution sequence of the multi-thread executing method of this embodiment is shown in FIG. 25(a). This example assumes the case where the fork destination processor #1 is free at a time of the first fork instruction A of a parent thread executed by the processor #0. In this case, all the fork instructions, such as the fork instruction B, other than the fork instruction A within the parent thread are made invalid.

Another example of the execution sequence of the multi-thread executing method of this embodiment is shown in FIG. 25(b). This example assumes the case where the fork destination processor #1 is busy at a time of the first fork instruction A executed by the processor #0 and the fork instruction A is made invalid, and since the fork destination processor #1 is free at a time of the next fork instruction B, a fork is performed. In this case, the fork instruction B and all the later fork instructions within the parent thread are made invalid.

If adopting the execution sequence of FIG. 25(a) to the parallel program shown in FIG. 1(e), the fork instruction fork th1 of FIG. 1(e) corresponds to the fork instruction A, and the fork instruction fork th2 corresponds to the fork instruction B. Accordingly, the execution sequence when the fork instruction A is executed and the fork instruction B is made invalid, turns out as shown in FIG. 25(c). The instruction 0, the instruction 1, and the instruction 2 are executed in the processor #0 in this order, and the instruction 3 and the instruction 4 are executed in the processor #1 in this order, hence to perform the processing of the program without any problem.

If adopting the execution sequence of FIG. 25(b) to the parallel program shown in FIG. 1(e), it turns out as shown in FIG. 25(d). The instruction 0 and the instruction 1 are executed in the processor #0 in this order, and the instruction 2, the instruction 3, and the instruction 4 are executed in the processor #1 in this order, hence to perform the processing of the program without any problem.

If the fork instructions A and B are made invalid, the execution sequence turns out as shown in FIG. 25(e), and the instruction 0, the instruction 1, the instruction 2, the instruction 3, and the instruction 4 are sequentially executed in the processor #0 in this order.

The method of creating a parallel program executed by the multi-thread executing method of this embodiment is the same as that of the first embodiment of the first invention.

As mentioned above, even if in a parallel program without assurance of the Fork-Once limitation, the embodiment can assure the Fork-Once limitation at its execution time. Further, like the fourth embodiment described later, when neighboring processor is busy at a time of the first fork instruction of a parent thread, if the fork instruction is waited, the processing is interrupted. This embodiment, however, can advance the processing of a program without any interruption in even such a case. Further, in the structure in which, when a fork is impossible, the content of a register file is once saved in a save buffer and thereafter the fork is enabled, like the fifth embodiment described later, the hardware amount is increased by the amount of the save buffer and the process switching overhead is increased because the save buffer becomes an object to be saved and restored at a time of switching process of the operating system. This embodiment, however, can solve the problem. Further, in the embodiment, it is not necessary to describe a term instruction within the parallel program like the sixth embodiment described later, and the capacity of an instruction memory can be reduced because the program becomes compact in size.

(Second Embodiment of Second Invention)

In the first embodiment, although the fork is abandoned if a fork is impossible at a fork time of a parent thread, in this embodiment, the fork will be performed when a fork destination processor turns free before the register file of the parent thread is updated. Hereinafter, a description of this embodiment will be described mainly about a difference between the first embodiment and this embodiment.

Figure 26:
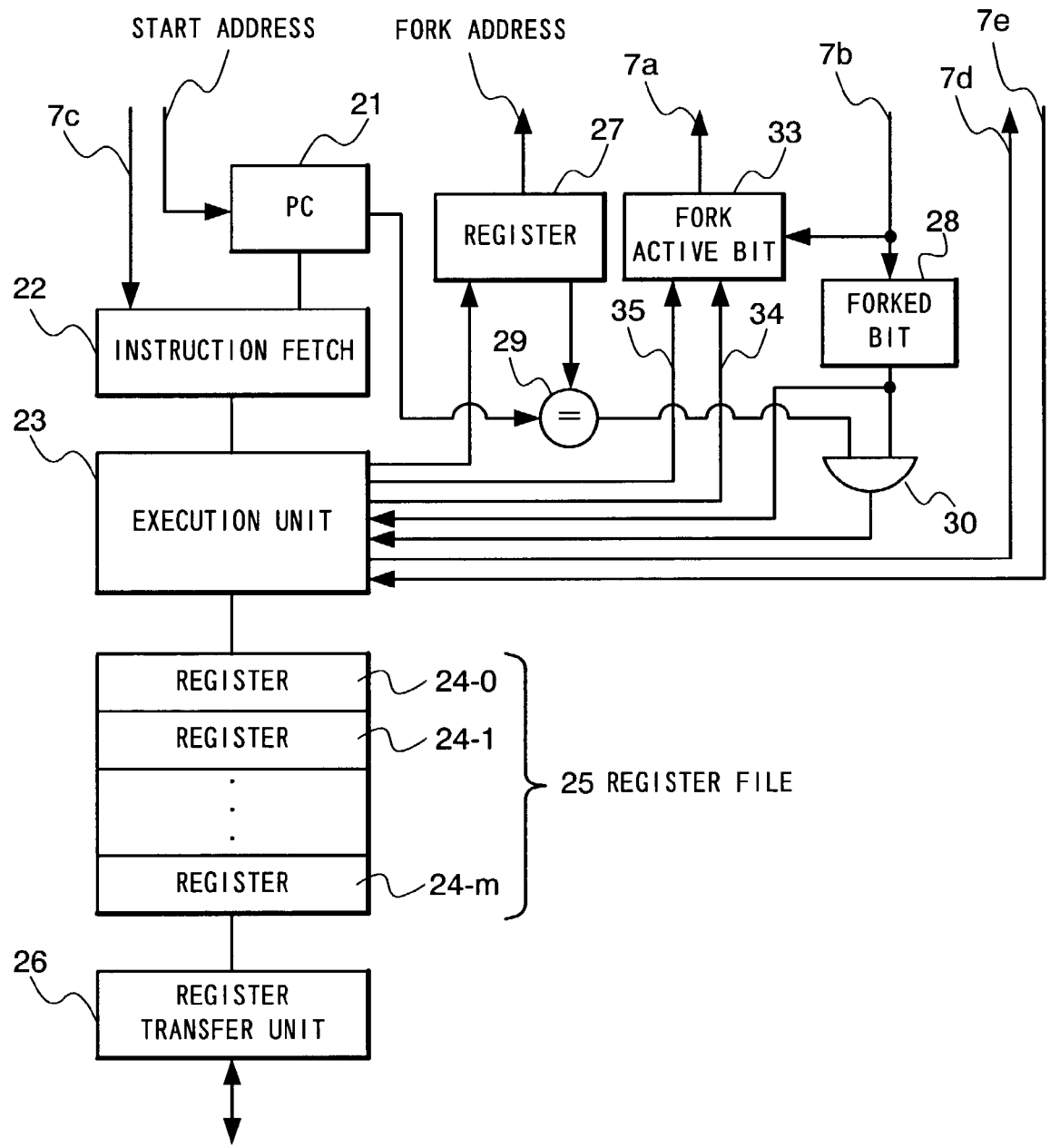
FIG. 26 is a block diagram showing an example of the structure of a processor in a parallel processing system according to a second embodiment of the second invention in the present invention.

With reference to FIG. 26, each processor 1-i of the parallel processing system according to this embodiment further comprises a fork active bit 33, in addition to the structure shown in FIG. 23. The fork active bit 33 is set by a fork signal 34 supplied when the execution unit 23 executes a fork instruction, and it is reset by the fork reply 7b received from the thread controller 3 and a register update signal 35 supplied when the execution unit 23 updates one of the registers of the resister file 25 of the parent thread. The output of the fork active bit 33 becomes the fork request 7a toward the thread controller 3, and the fork request 7a is continuously supplied while the fork active bit 33 is being set.

With reference to the above-mentioned FIG. 22, upon receipt of a fork request 7a from the processor 1-i at a timing of some clock, the thread control sequencer 11 of the thread controller 3 abandons the fork request 7a (Step S64) when the neighboring processor 1-j is busy. In this embodiment, however, since the processor 1-i continues to supply the fork request 7a while the fork active bit 33 is set, the thread controller 3 receives the fork request 7a again from the processor 1-i at a timing of the next clock, and the processing of FIG. 22 is repeated. Namely, when a fork is impossible at a fork point, the fork instruction is once held and when the fork becomes possible, it will be executed.

Figure 27:
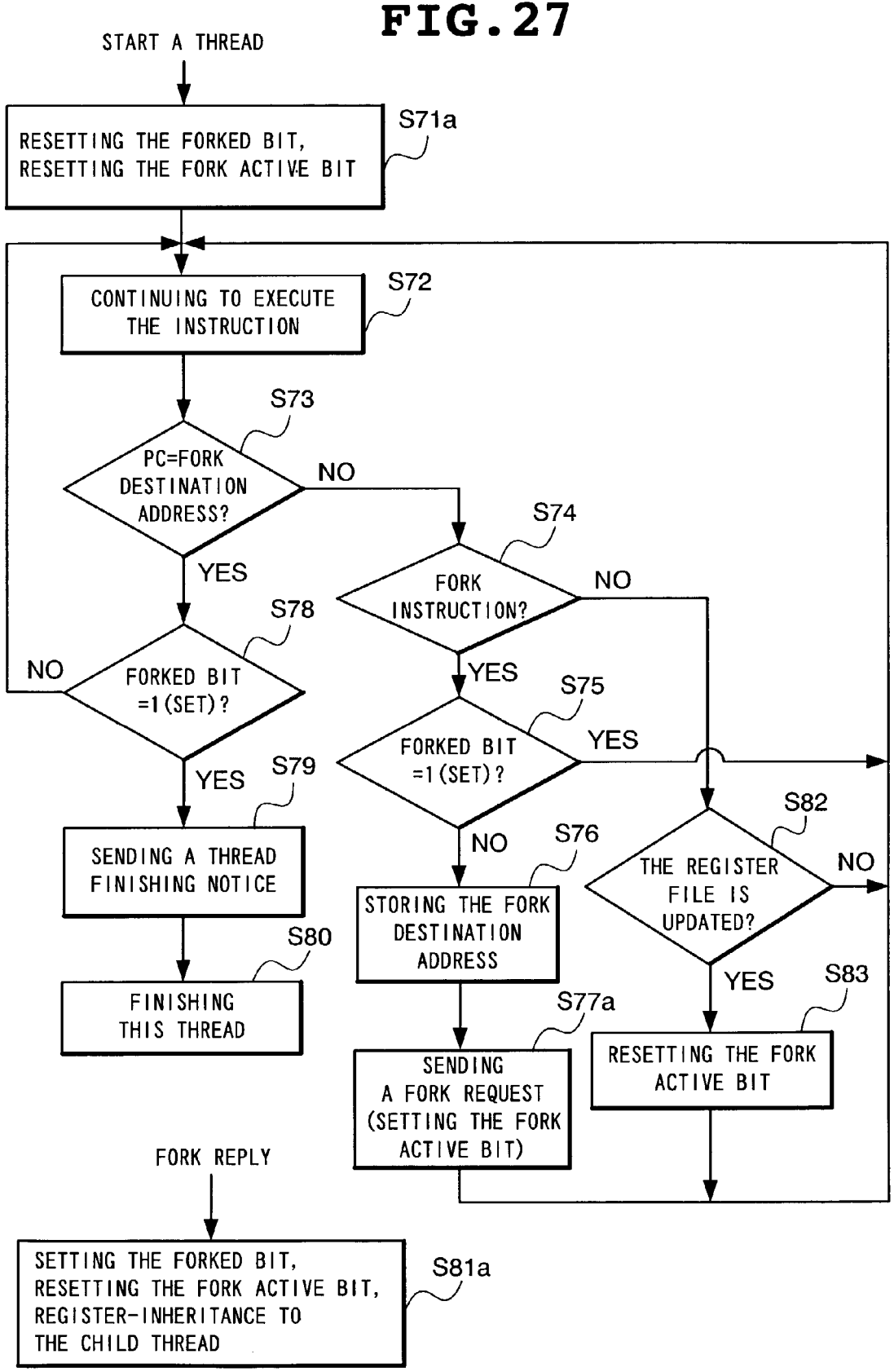
FIG. 27 is a flow chart showing an example of the processing of the processor from start to finish of a thread in the parallel processing system according to the second embodiment of the second invention in the present invention.

The outline of the processing of the processor 1-i from start to finish of a thread is shown in FIG. 27. Based on the thread starting request 7c from the thread controller 3, the forked bit 28 and the fork active bit 33 of the processor 1-i are reset (Step S71a) when the same processor 1-i starts the execution of one thread. Hereafter, fetch, decode, and execution of a thread instruction will be continuously performed (Step S72).

When the instruction decoded by the execution unit 23 is a fork instruction (YES in Step S74), the execution unit 23 makes this fork instruction invalid if the forked bit 28 is set at 1 (YES in Step S75), and executes the next instruction (Step S72). While, if the forked bit 28 is set at 0 (NO in Step S75), the execution unit 23 stores the fork destination address into the register 27 (Step S76), and sends the fork request 7a accompanied by the fork destination address stored in the register 27 to the thread controller 3 (Step S77a), by setting the fork active bit 33. When the execution unit 23 updates one of the registers of the register file 25 (YES in Step S82), it supplies the register update signal 35 to reset the fork active bit 33 (Step S83). Accordingly, the fork request 7a is continuously supplied to the thread controller 3 from the processor 1-i, during the period from a fork instruction execution to the first update of the register file 25.

The thread controller 3 sends the fork reply 7b to the processor 1-i when the fork toward the neighboring processor 1-j becomes possible while the fork request 7a is being supplied from the processor 1-i, and simultaneously forks a child thread (Step S63) by supplying the thread starting request 7c to the other processor 1-j. According to the fork reply 7b supplied to the processor 1-i, the forked bit 28 is set and the fork active bit 33 is reset. Further, the content of the register file 25 is transferred to the fork destination processor 1-j by the register transfer unit 26 (Step S81a). During the transfer of the register file 25 by the register transfer unit 26, writing into the register file 26 from the execution unit 23 is waited.

The operation when the execution of the instruction advances in the processor 1-i and the value of the PC 21 is coincident with the fork destination address stored in the register 27 is the same as that of the first embodiment.

Figure 28:
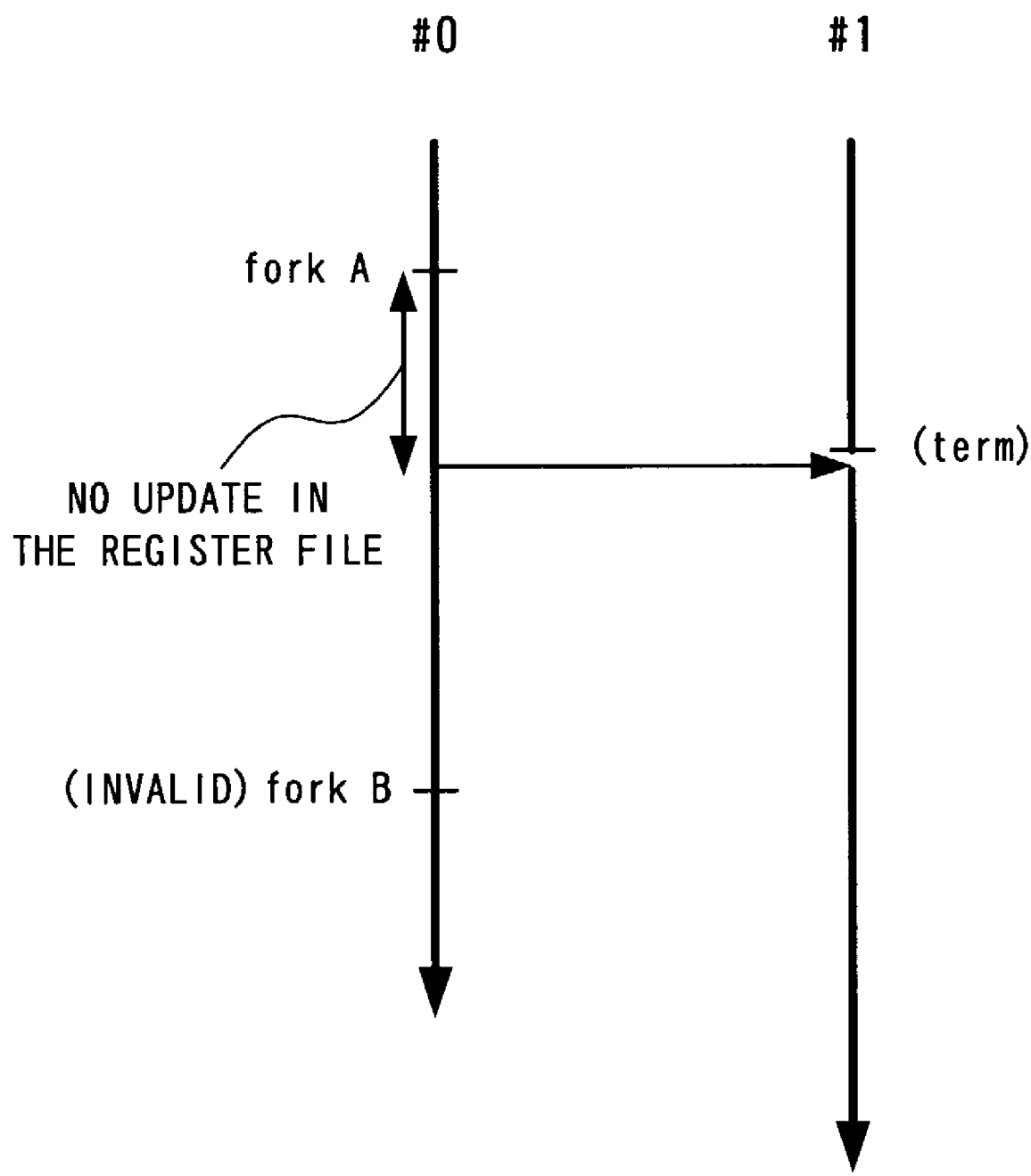
FIG. 28 is a view showing an example of an execution sequence of a multi-thread executing method according to the second embodiment of the second invention in the present invention.

An example of the execution sequence of the multi-thread executing method of this embodiment is shown in FIG. 28. An arrow extending from the fork instruction A to the bottom shows the period where the register file 25 is not updated at all in the processor #0. FIG. 28 assumes the case where although the fork destination processor #1 is busy at a time of the first fork instruction A as for the thread executed by the processor #0, the fork destination processor #1 becomes free during the above period where the register file 25 of the processor #0 is not updated at all. In this embodiment, a fork is performed according to the fork instruction A in such a case.

As mentioned above, this embodiment can obtain the same effect as that of the first embodiment, and since a fork is performed when the neighboring processor turns free before the register file is updated, even if a parent thread fails to fork a child thread at a time of a fork instruction after the parent thread starts, a possibility of fork is much more increased than in the first embodiment, thereby improving the parallelism of thread execution.

(Third Embodiment of Second Invention)

In the second embodiment, if a fork is impossible at a fork point of a parent thread, the fork is once held, and when there appears no other processor that can start the execution of a child thread before the register file of the parent thread is updated, the same fork is abandoned. In this embodiment, however, even if the register file of the parent thread is updated, if this update is not related with a register to be passed to the child thread, the fork is performed. Hereafter, a description of this embodiment will be described below, mainly about a difference between the second embodiment and this embodiment.

Figure 29:
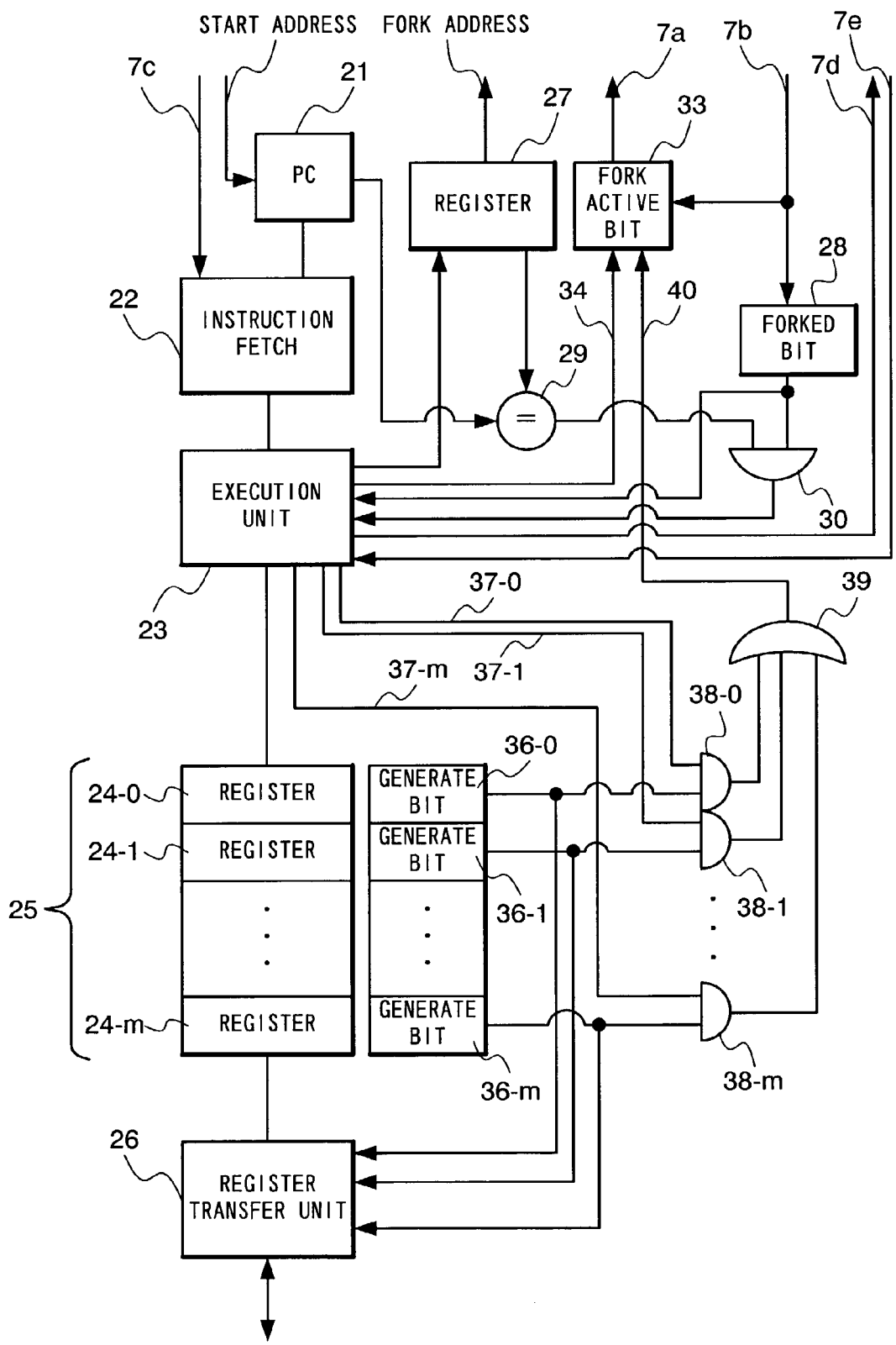
FIG. 29 is a block diagram showing an example of the structure of a processor in a parallel processing system according to a third embodiment of the second invention in the present invention.

With reference to FIG. 29, in addition to the structure shown in FIG. 26, each processor 1-i of the parallel processing system of this embodiment comprises generate bits 36-k, corresponding to respective registers 24-k (k=0 to m) of the register file 25 in one-to-one relation, which are set only when the corresponding register 24-k is a register to be inherited by a child thread of the register file 25, AND gates 38-k, corresponding to the respective registers 24-k in one-to-one relation, for receiving the output of the respective generate bits 36-k of the respective registers 24-k and respective register update signals 37-k supplied when the execution unit 23 updates the respective registers 24-k, and an OR gate 39 for supplying a fork invalid signal 40 that is a logical OR signal of the output of the AND gates 38-k. Instead of the register update signal 35 of FIG. 26, the fork invalid signal 40 is supplied to the fork active bit 33 as a reset signal. The values of each generate bit 36-k are supplied to the register transfer unit 26. The register transfer unit 26 is designed to transfer only a register with the corresponding generate bit 36-k set there, of the registers 24-k of the register file 25, to the register file of the fork destination processor.

Figure 30:
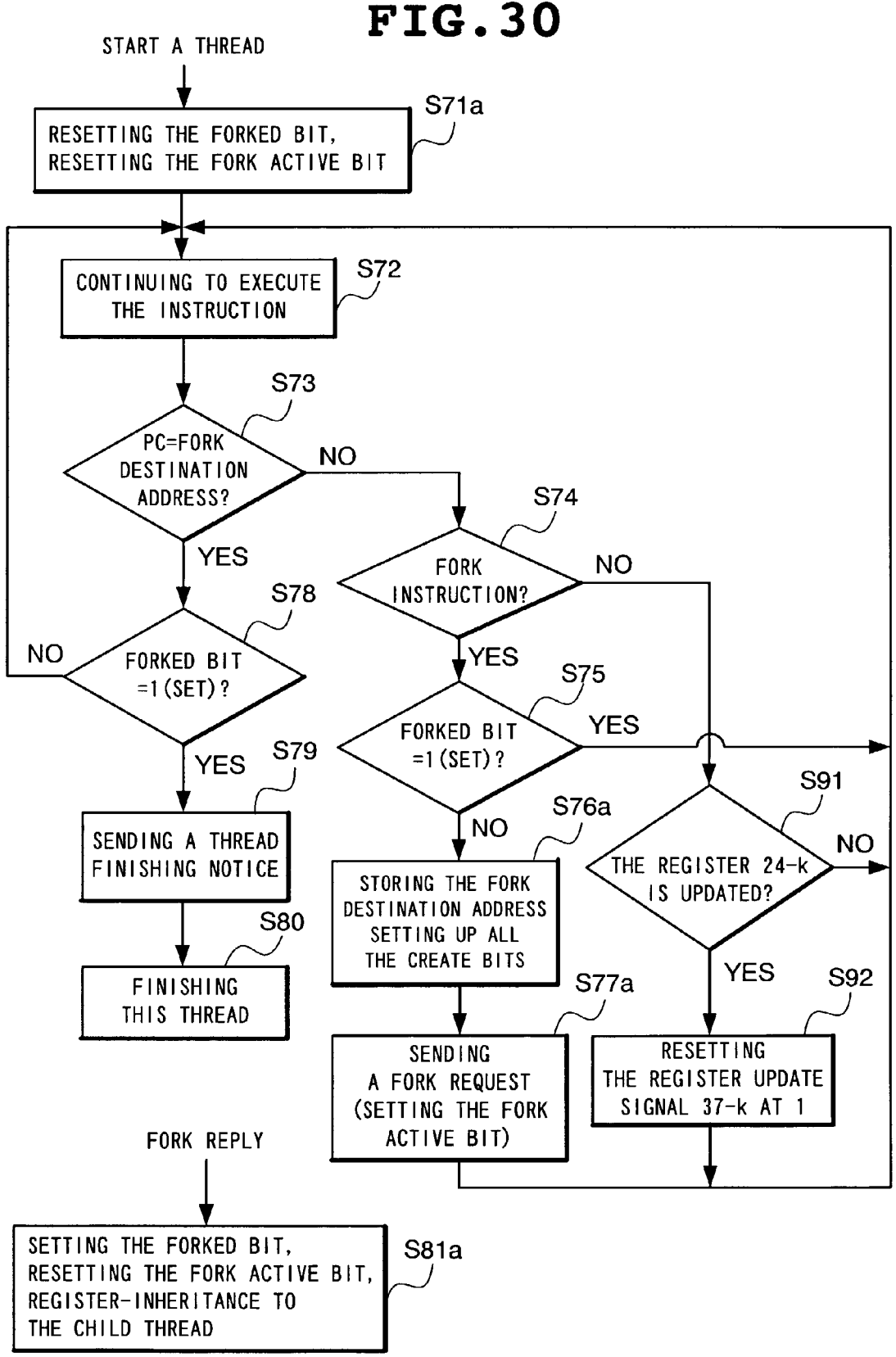
FIG. 30 is a flow chart showing an example of the processing of the processor from start to finish of a thread in the parallel processing system according to the third embodiment of the second invention in the present invention.

The outline of the processing of the processor 1-i from start to finish of a thread is shown in FIG. 30. Based on the thread starting request 7c from the thread controller 3, when the processor 1-i starts the execution of a thread, the forked bit 28 and the fork active bit 33 of the same processor 1-i are reset (Step S71a). Hereinafter, fetch, decode, and execution of a thread instruction are continuously performed (Step S72).

When the instruction decoded by the execution unit 23 is a fork instruction (YES in Step S74), the execution unit 23 makes this fork instruction invalid if the forked bit 28 is set at 1 (YES in Step S75) and executes the next instruction (Step S72). While, if the forked bit 28 is set at 0 (NO in Step S75), the execution unit 23 stores the fork destination address into the register 27 and sets up all the generate bits 36-k (Step S76a). Namely, of all the registers 24-k of the register file 25, the generate bit 36-k corresponding to a register which should be inherited by a child thread is set, and the generate bit 36-k corresponding to a register which doesn't need to be inherited is kept reset. By setting the fork active bit 33 according to the fork signal 34 (Step S77a), the execution unit 23 sends the fork request 7a accompanied by the fork destination address to the thread controller 3. Further, when the execution unit 23 updates the register 24-k of the register file 25 (YES in Step S91), it sets the register update signal 37-k corresponding to the updated register 24-k at logic "1" (Step S92). Thus, when the updated register 24-k is a register which should be inherited by a child thread, the output of the AND gate 38-k corresponding to the register 24-k becomes logic "1", and the fork invalid signal 40 is supplied from the OR gate 39, hence to reset the fork active bit 33. Namely, the processor 1-i continues to supply the fork request 7a to the thread controller 3 during a period from a fork instruction execution to first update in one of the inherited registers by a child thread, of the register file 25.

The thread controller 3 sends the fork reply 7b to the processor 1-i when a fork toward the neighboring processor 1-j becomes possible which the processor 1-i is supplying the fork request 7a, and forks a child thread (Step S63) by sending the thread starting request 7c to the other processor 1-j. According to the fork reply 7b supplied to the processor 1-i, the forked bit 28 is set and the fork active bit 33 is reset. The register transfer unit 26 transfers at least a register to be inherited by a child thread, of the registers of the register file 25, to the fork destination processor 1-j (Step S81a).

The operation when the execution of an instruction advances in the processor 1-i and the value of the PC 21 is coincident with the fork destination address stored in the register 27, is the same as that of the second embodiment.

In the multi-thread executing method of this embodiment, an arrow extending from the fork instruction A to the bottom in FIG. 28 shows the period where the register to be inherited by a child thread, of the registers of the register file 25, is not updated at all by the processor #0. Accordingly, a possibility of a fork can be much more increased than in the second embodiment, not to mention the first embodiment.

In this embodiment, it is necessary to clear a register to be inherited by a child thread at a fork point of a parent thread. Therefore, the control/data flow analyzing unit 440 in the compiler 410 shown in FIG. 10 examines a register to be inherited by a child thread from a parent thread, for every child thread being forked, and based on the examination result, the parallel code inserting unit 450 inserts a description specifying the register to be inherited by a child thread, into the parallel program 430. This specification of the register to be inherited by a child thread can be done by a fork instruction, an exclusive instruction other than the fork instruction, and the like.

The register transfer unit 26 in this embodiment, although only the register to be inherited by a child thread, of the register file 25 of a parent thread, is transferred to the register file of the fork destination processor, by referring to the generate bits 36-k, as another embodiment, a sequence for transferring the registers sequentially from the head register of the register file 25 in a predetermined order may be started and stopped at a time of finishing the transfer of all the registers with the generate bits 36-k set. In this method, there is a case of transferring even a register that doesn't need to be inherited by a child thread, but it is effective in simplifying the transfer sequence. Needless to say, as another embodiment, the register transfer unit 26 may be designed so as to always transfer all the registers without referring to the generate bits 36-k. Further, even if a register to be inherited by a child thread, when the value of this register of the fork destination processor already becomes equal to the value of that on the side of a parent thread at a fork point, paying attention to that it doesn't dare to transfer the above, a register whose value becomes different from that on the side of a parent thread is detected, of the registers to be inherited by a child thread, and only this detected register may be transferred to the fork destination processor from the register transfer unit 26.

As mentioned above, this embodiment can obtain the same effect as that of the second embodiment. Even if the register file of a parent thread is updated, when this update is not performed on a register to be inherited by a child thread, a fork is executed. Therefore, this embodiment can increase a possibility of a fork compared with the second embodiment, hence to improve the parallelism of thread execution.

(Fourth Embodiment of Second Invention)

This embodiment is different from the first to the third embodiments in that the execution of a fork instruction is waited until the neighboring processor comes into a free state, when the neighboring processor is busy at a time of the fork instruction after the execution of a parent thread starts. This embodiment will be, hereafter, described mainly about a difference point between the second embodiment and this embodiment.

Figure 31:
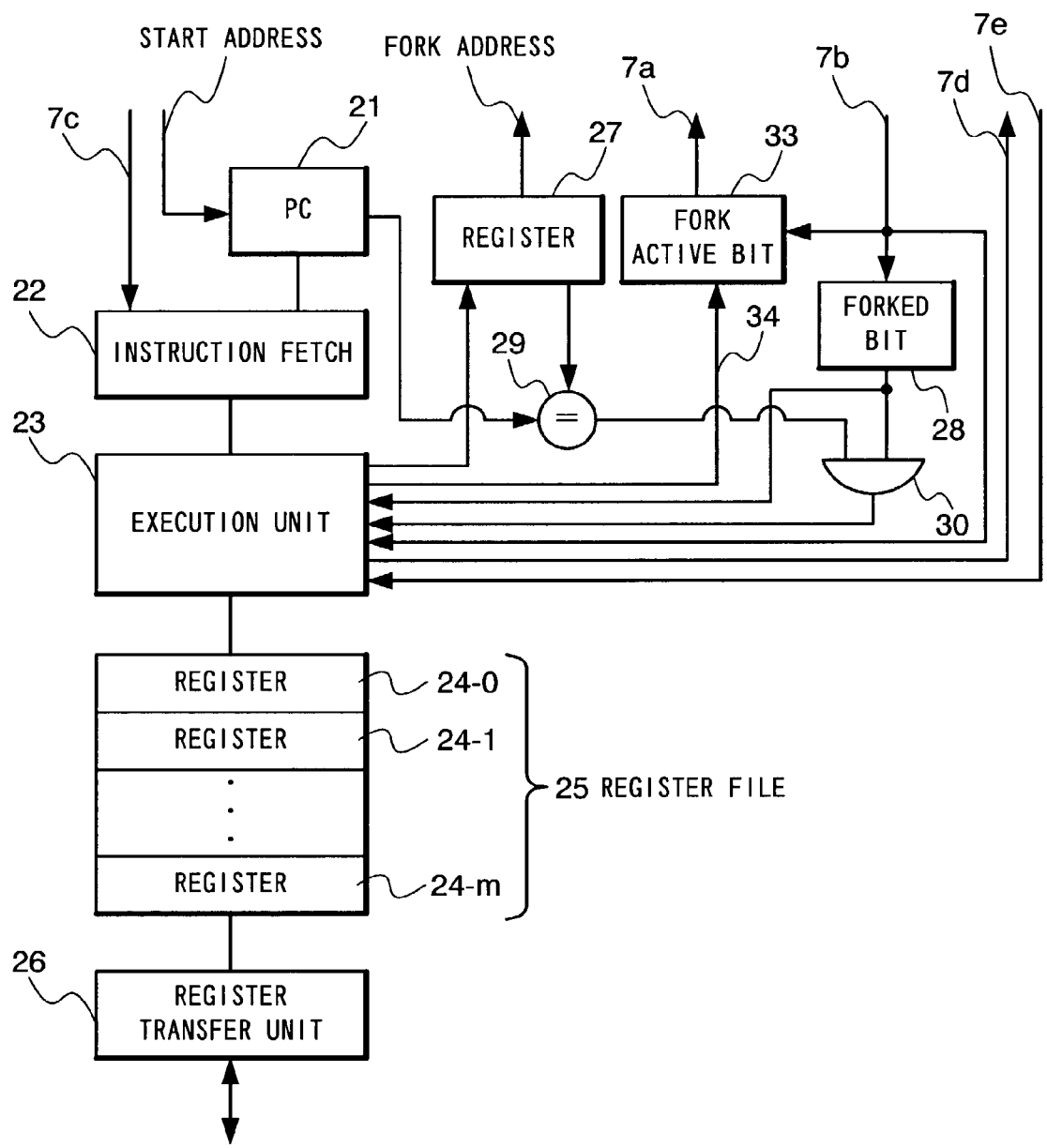
FIG. 31 is a block diagram showing an example of the structure of a processor in a parallel processing system according to a fourth embodiment of the second invention in the present invention.

With reference to FIG. 31, each processor 1-i of the parallel processing system in this embodiment has the substantially same structure as that shown in FIG. 26. It is different from the above in that the fork reply 7b sent from the thread controller 3 is also supplied to the execution unit 23 and that the execution unit 23 waits for the execution of a fork instruction until the fork reply 7b is returned, at a time of the fork instruction execution. Further, there exists no register update signal 35 for resetting the fork active bit 33 by the execution unit 23.

Figure 32:
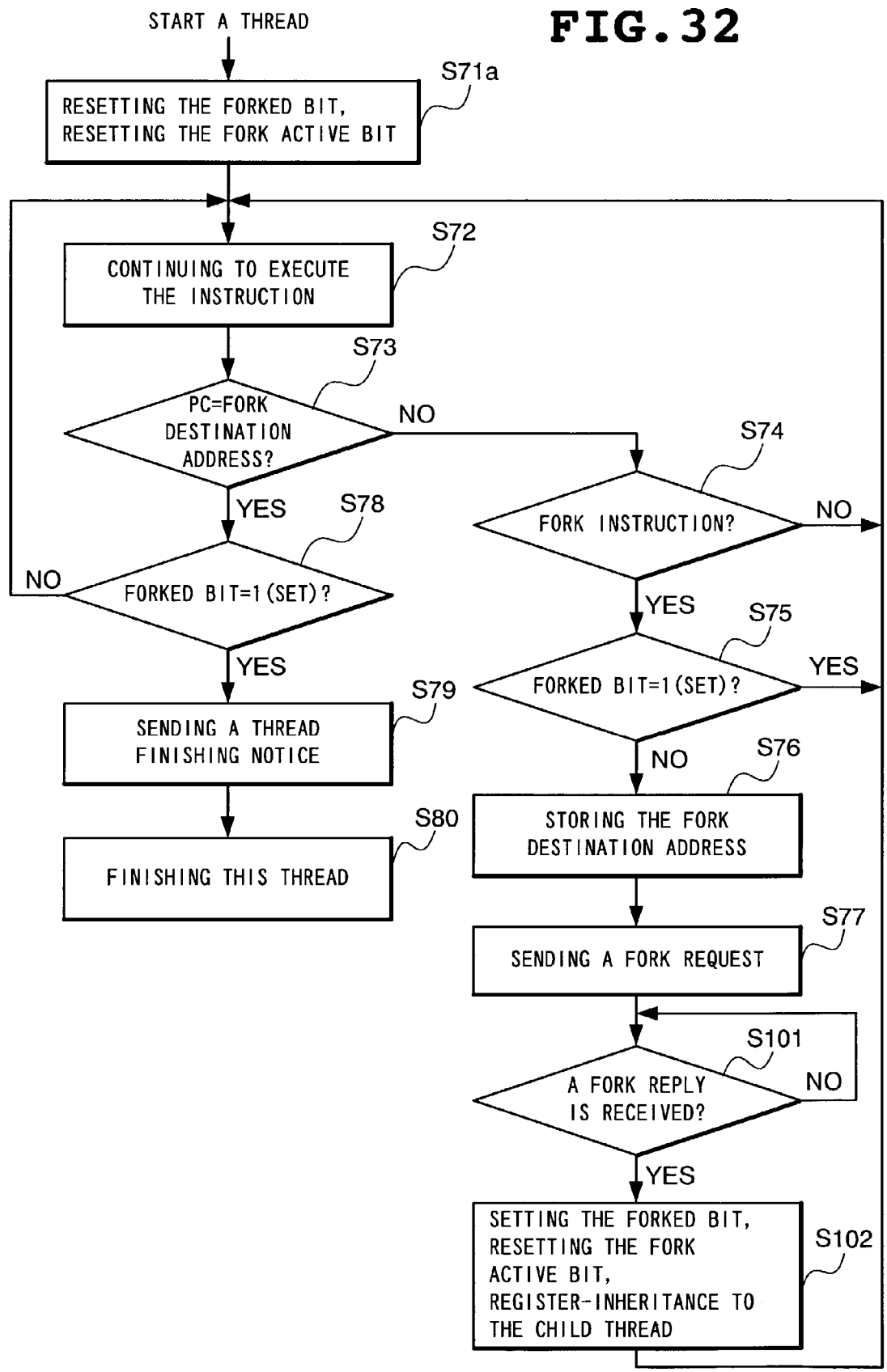
FIG. 32 is a flow chart showing an example of the processing of the processor from start to finish of a thread in the parallel processing system according to the fourth embodiment of the second invention in the present invention.

The outline of the processing of the processor 1-i from start to finish of a thread is shown in FIG. 32. When the processor 1-i starts the execution of a thread, based on the thread starting request 7c from the thread controller 3, the forked bit 28 and the fork active bit 33 of the above processor 1-i are reset (Step S71a). Hereafter, fetch, decode, and execution of a thread instruction are continuously performed (Step S72).

When the instruction decoded by the execution unit 23 is a fork instruction (YES in Step S74), the execution units 23 makes this fork instruction invalid if the forked bit 28 is set at 1 (YES in Step S75), and executes the next instruction (Step S72). While, if the forked bit 28 is set at 0 (NO in Step S75), the execution unit 23 stores the fork destination address into the register 27 (Step S76), and sends the fork request 7a accompanied by the fork destination address stored in the register 27, to the thread controller 3 (Step S77), by setting the fork active bit 33. Then, it waits for the fork reply 7b to be returned from the thread controller 3 (Step S101).

The thread controller 3 sends the fork reply 7b to the processor 1-i when the fork toward the neighboring processor 1-j becomes possible while the fork request 7a is being supplied from the processor 1-i, and forks a child thread (Step S63) by supplying the thread starting request 7c to the other processor 1-j. The processor 1-i, upon receipt of the fork reply 7b from the thread controller 3, sets the forked bit 28 and resets the fork active bit 33, and transfers the content of the register file 25 to the fork destination processor 1-j by the register transfer unit 26 (Step S102).

The operation when the execution of an instruction advances in the processor 1-i and the value of the PC 21 is coincident with the fork destination address stored in the register 27, is the same as that of the second embodiment.

(Fifth Embodiment of Second Invention)

This embodiment is different from the first to the fourth embodiments in that the content of the register file is saved when the neighboring processor is busy at a time of a fork instruction, after the execution of a parent thread starts, and that when the neighboring processor comes into a free state, the child thread is forked based on the saved information. Hereafter, this embodiment will be described, mainly about a difference between the fourth embodiment and this embodiment.

Figure 33:
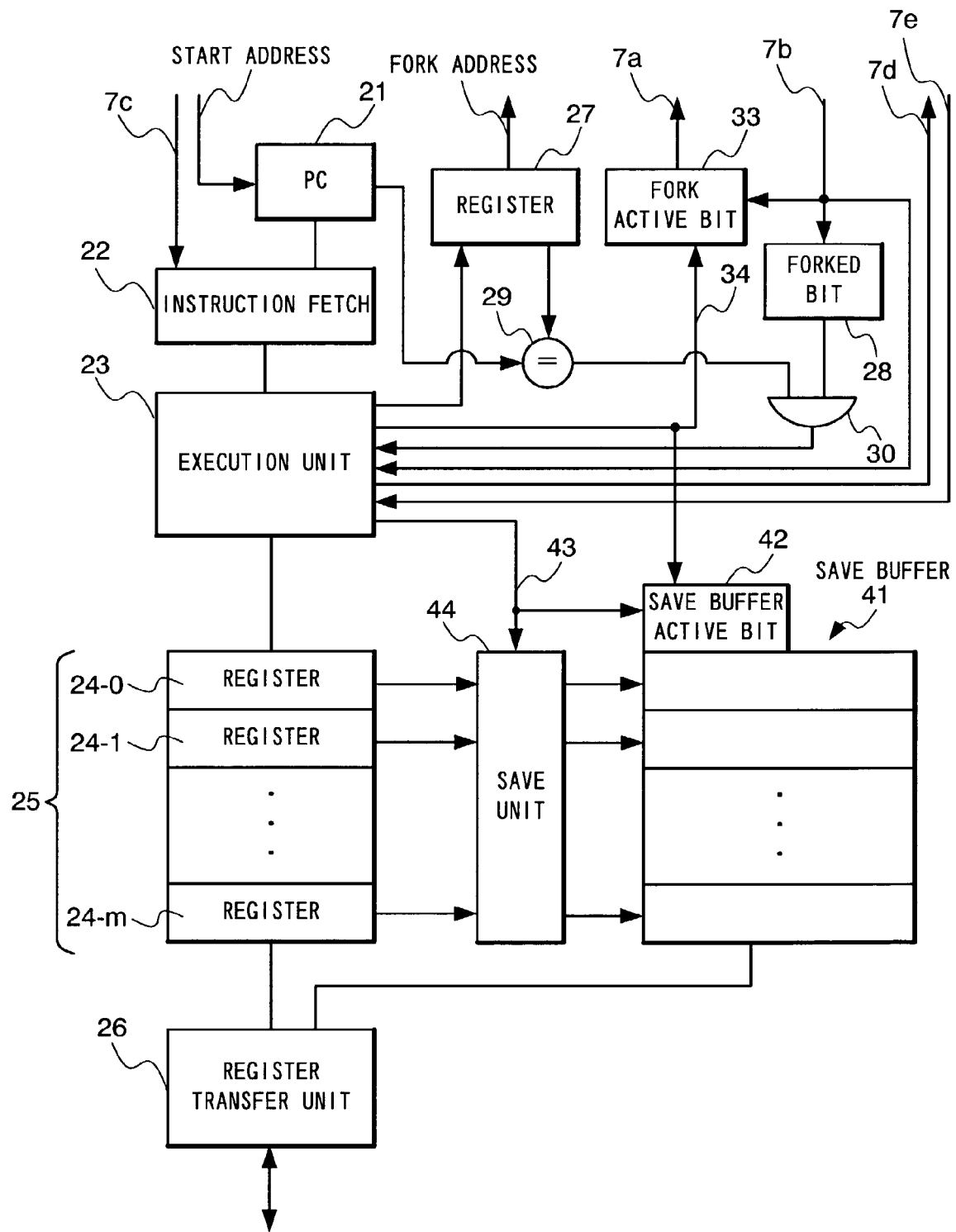
FIG. 33 is a block diagram showing an example of the structure of a processor in a parallel processing system according to a fifth embodiment of the second invention in the present invention.

With reference to FIG. 33, each processor 1-i of the parallel processing system in this embodiment comprises a save buffer 41, a save buffer active bit 42, and a save unit 44 for saving the content of the register file 25 into the save buffer 41 upon activation according to the save signal 43 supplied from the execution unit 23, in addition to the structure shown in FIG. 31, and the register transfer unit 26 is connected to the register file 25 and the save buffer 42. The save buffer active bit 42 is reset according to the fork signal 34 supplied from the execution unit 23 and set according to the save signal 43, and reset when a fork based on the save buffer 41 is performed.

Figure 34:
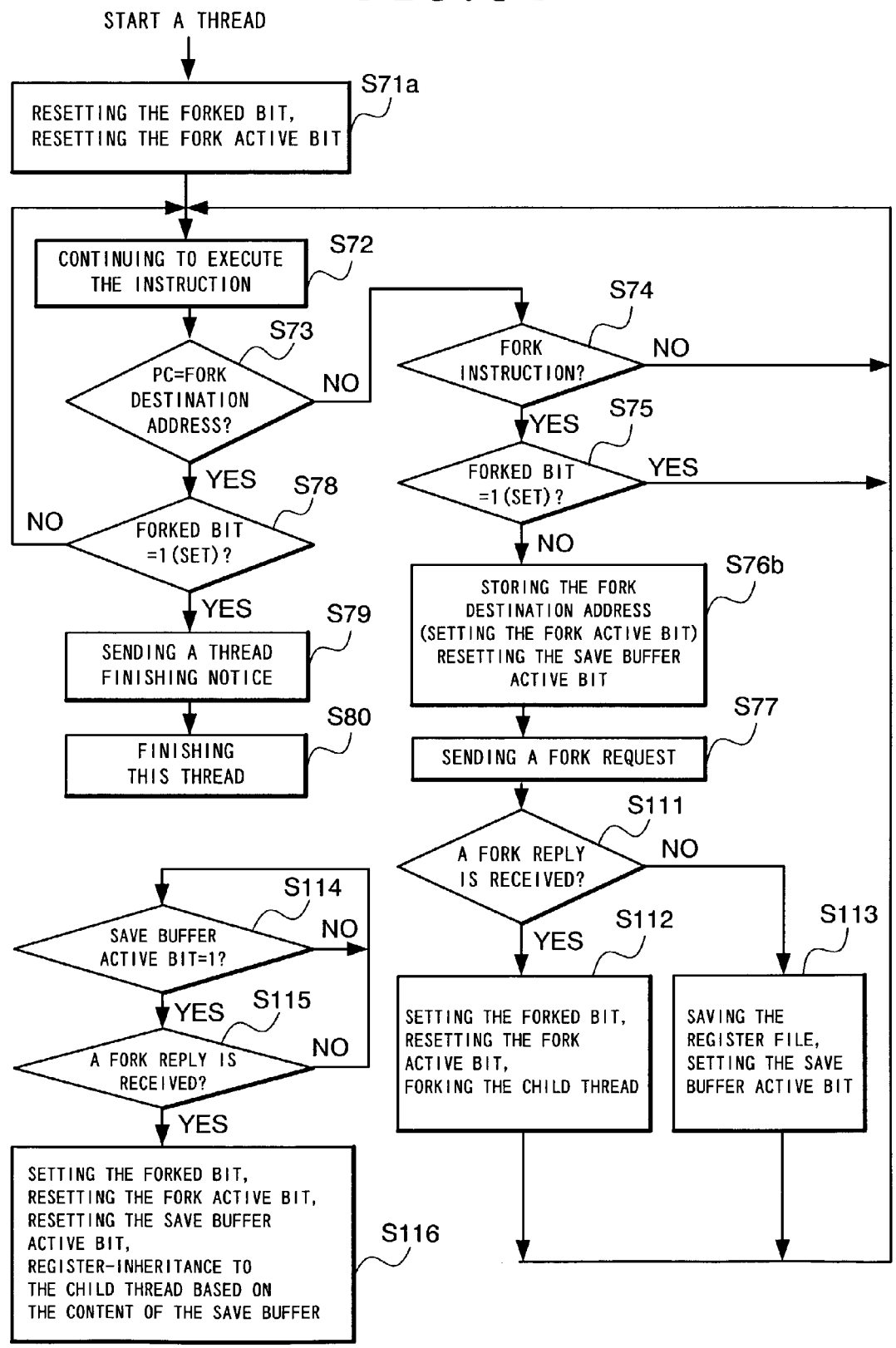
FIG. 34 is a flow chart showing an example of the processing of a processor from start to finish of a thread in the parallel processing system according to the fifth embodiment of the second invention in the present invention.

The outline of the processing of the processor 1-i from start to finish of a thread is shown in FIG. 34. When the processor 1-i starts the execution of a thread, based on the thread starting request 7c from the thread controller 3, the forked bit 28 and the fork active bit 33 of the above processor 1-i are reset (Step S71a). Hereafter, fetch, decode, and execution of a thread instruction are continuously performed (Step S72).

When the instruction decoded by the execution unit 23 is a fork instruction (YES in Step S74), the execution unit 23 makes this fork instruction invalid if the forked bit 28 is set at 1 (YES in Step S75), and executes the next instruction (Step S72). While, if the forked bit 28 is set at 0 (NO in Step S75), the execution unit 23 stores the fork destination address into the register 27 (Step S76b), and sends the fork request 7a accompanied by the fork destination address stored in the register 27, to the thread controller 3 (Step S77), by setting the fork active bit 33. At this time, the save buffer active bit 42 is reset. When the fork reply 7b is returned from the thread controller 3 within a predetermined hour (YES in Step S111), the execution unit 23 sets the forked bit 28 and resets the fork active bit 33, and transfers the content of the register file 25 to the fork destination processor 1-j by the register transfer unit 26 (Step S112).

On the other hand, when the fork reply 7b is not returned from the thread controller 3 within a predetermined hour (NO in Step S111), the execution unit 23 saves the content of the register file 25 into the save buffer 41 by activating the save unit 44 according to the save signal 43 and sets the save buffer active bit 42 (Step S113). When receiving the fork reply 7b from the thread controller 3 while the save buffer active bit 42 is being set (YES in Steps S114 and S115), the execution unit 23 transfers the content of the register file 25 saved in the save buffer 41 to the fork destination processor 1-j by the register transfer unit 26 (Step S116). At this time, the forked bit 28 is set and the fork active bit 33 and the save buffer active bit 42 are reset. When the fork reply 7b to the last fork instruction is not returned from the thread controller 3 before the execution of the next fork instruction, since the save buffer active bit 42 is reset by the execution of this fork instruction (Step S76), the last fork instruction results in an invalid instruction.

The operation when the execution of an instruction advances in the processor 1-i and the value of the PC 21 is coincident with the fork destination address stored in the register 27, is the same as that of the fourth embodiment.

(Sixth Embodiment of Second Invention)

Although each processor 1-i finishes the processing of a thread when the value of its program counter is coincident with the start address of the effective thread, in the first to the fifth embodiments, each processor finishes the processing of a thread according to a term instruction corresponding to a fork instruction forking the effective child thread, of the term instructions inserted just before the fork destination addresses of the parallel program correspondingly to the respective fork instructions, in this embodiment. Hereafter, this embodiment will be described, mainly about a difference between the first embodiment and this embodiment.

Figure 35:
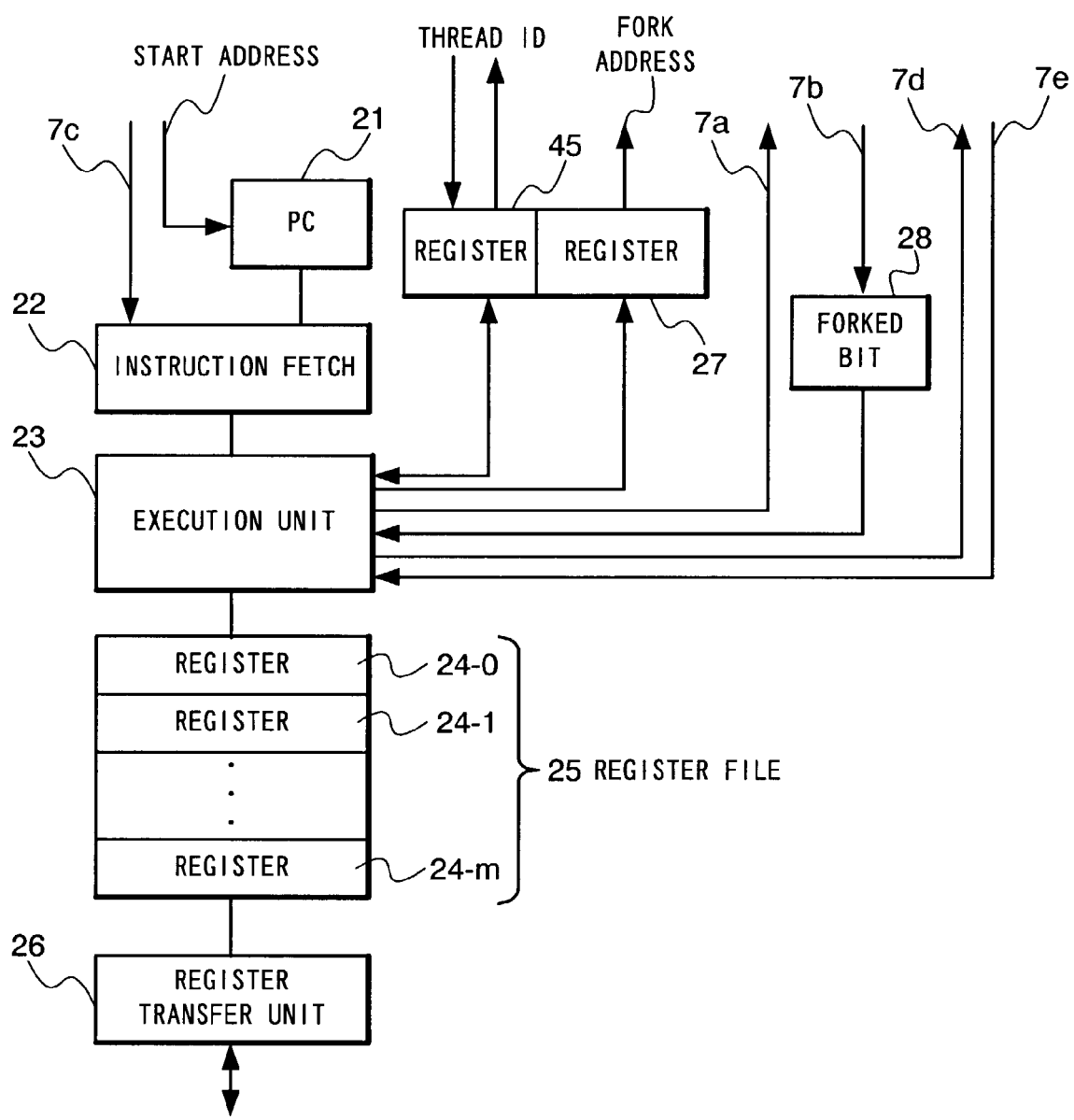
FIG. 35 is a block diagram showing an example of the structure of a processor in a parallel processing system according to a sixth embodiment of the second invention.

With reference to FIG. 35, each processor 1-i of the parallel processing system in this embodiment excludes the coincidence circuit 29 and the AND gate 30 from the processor shown in FIG. 23, and a register 45 for holding a thread ID is provided in this embodiment. In this register 45, a thread ID accompanying the thread starting request 7c from the thread controller 3 is initially set, and every time the processor 1-i executes a fork instruction, the thread ID specified by the fork instruction is set. Further, the fork request 7a toward the thread controller 3 includes the fork destination address stored in the register 27 and the thread ID stored in the register 45.

The thread controller 3 sends the thread ID and the fork destination address accompanying the fork request 7a from the processor 1-i to the fork destination processor 1-j, when sending the thread starting request 7c to the fork destination processor 1-j in Step S63 in FIG. 22.

Figure 36:
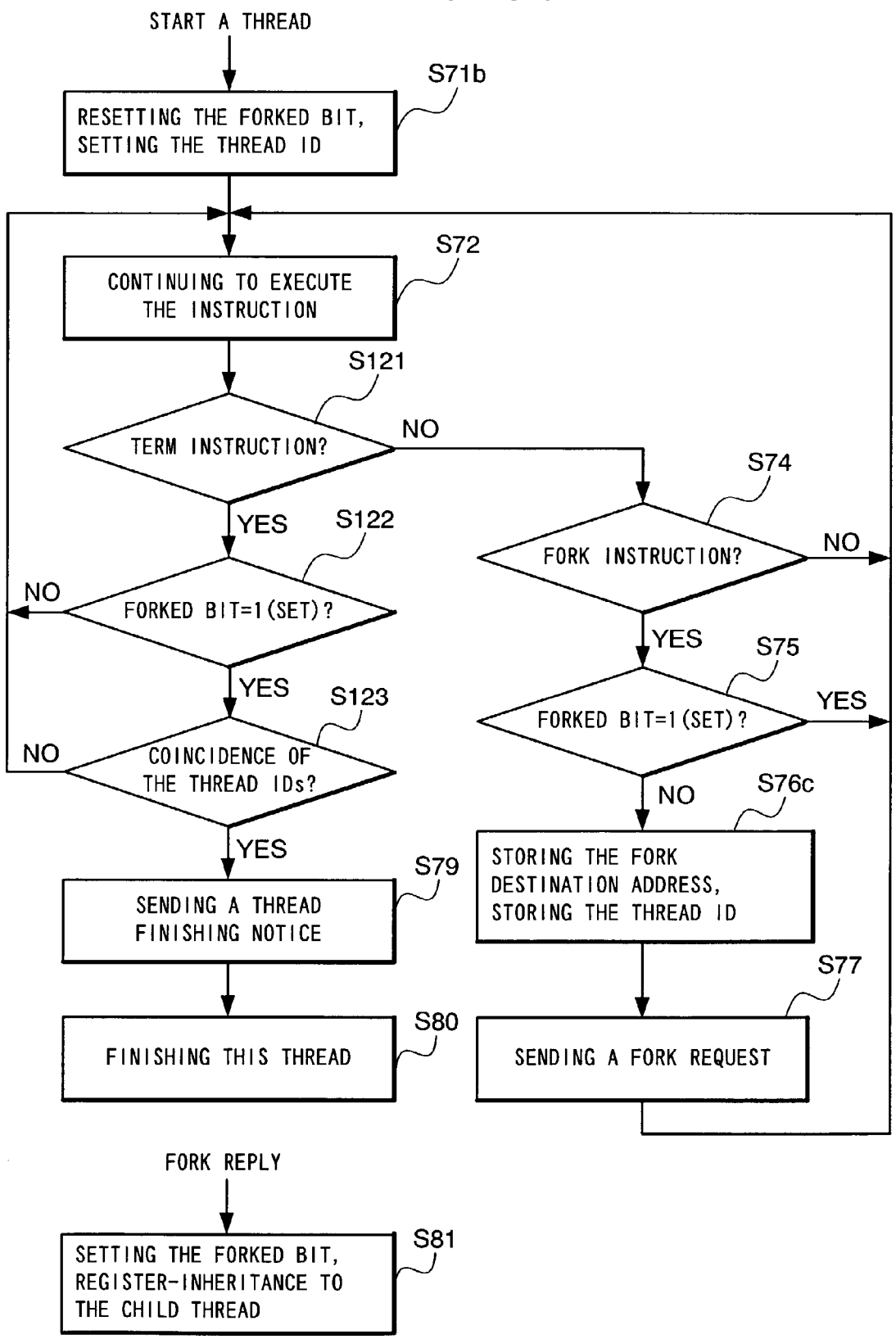
FIG. 36 is a flow chart showing an example of the processing of a processor from start to finish of a thread in the parallel processing system according to the sixth embodiment of the second invention in the present invention.
Figure 37:
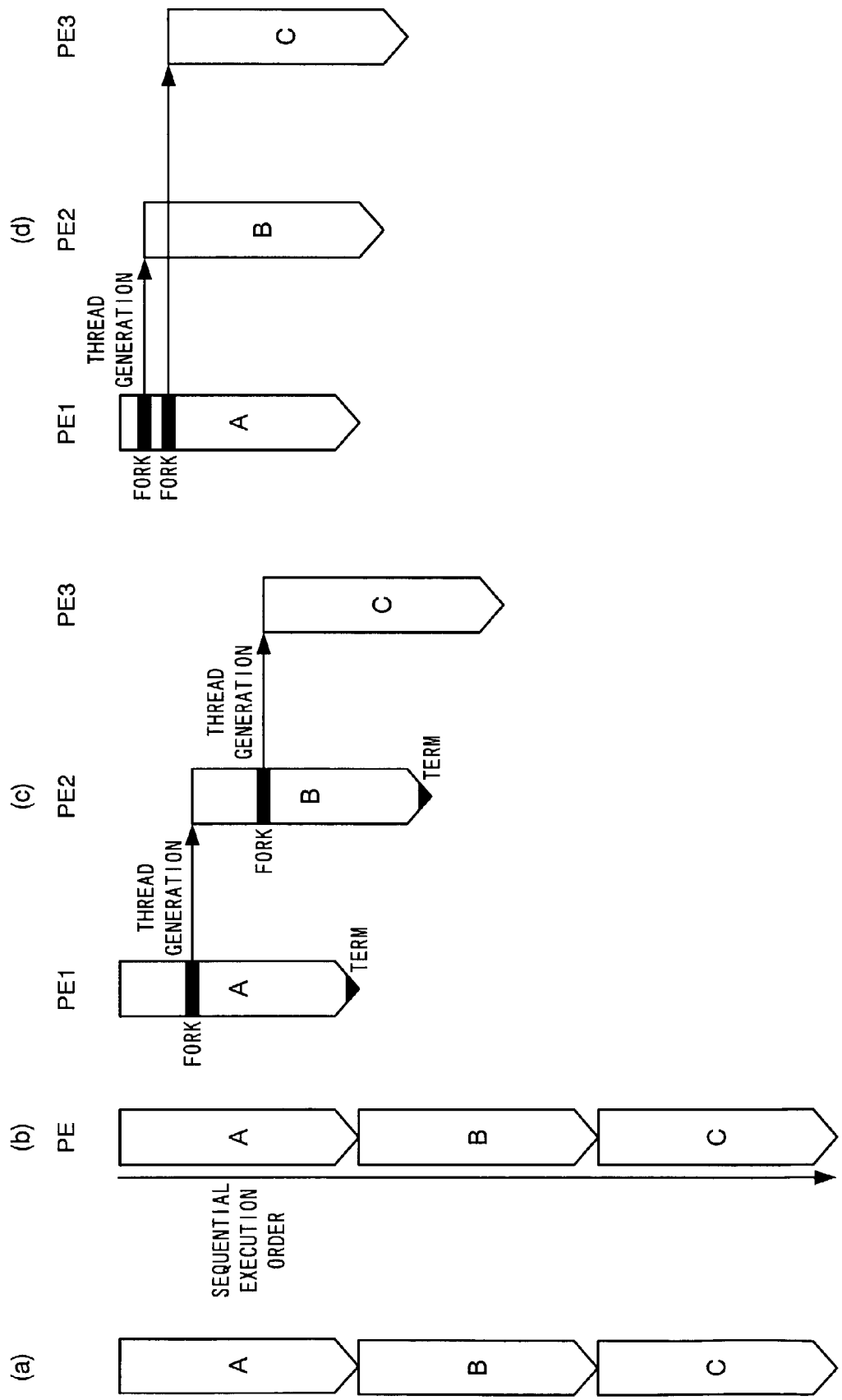
FIGS. 37(a)–37(d) are views showing an outline of the processing of the conventional multi-thread executing method.
Figure 38:
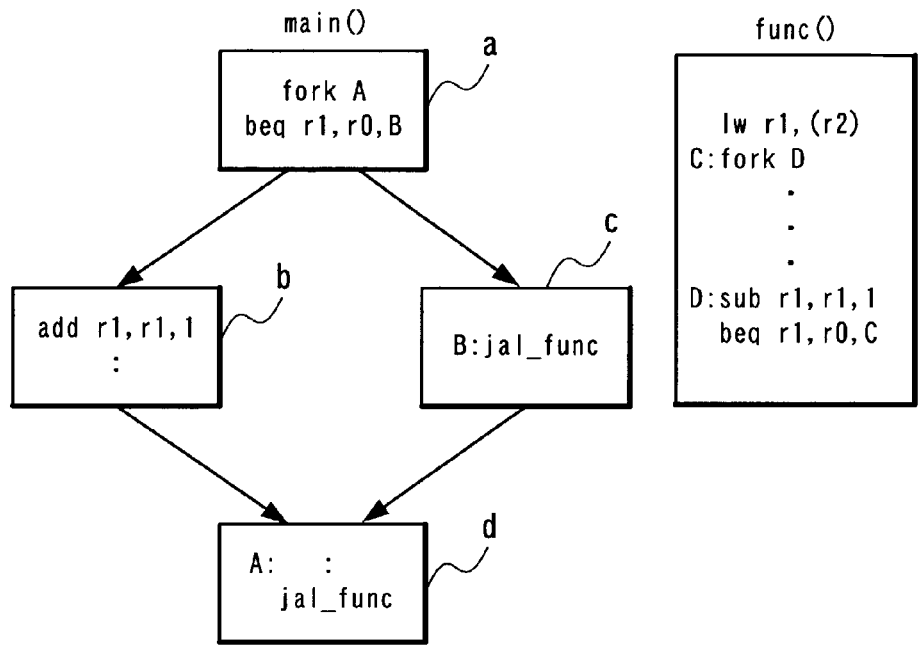
FIG. 38 is a view showing an example of a conventional program including the main function and the func function.
Figure 39:
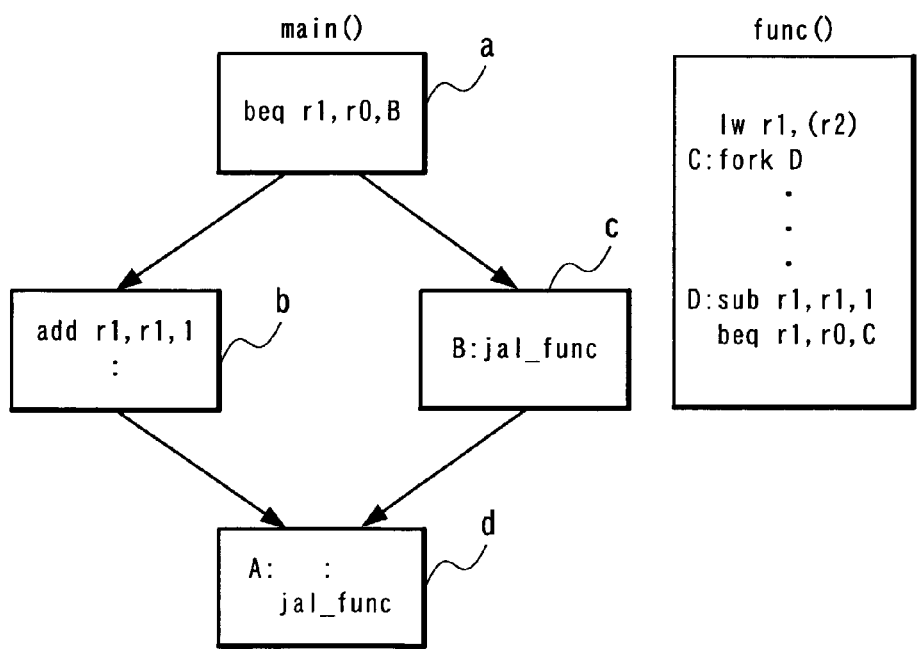
FIG. 39 is a view showing an example of a conventional program including the main function and the func function.

The outline of the processing of the processor 1-i from start to finish of a thread is shown in FIG. 36. When the processor 1-i starts the execution of a thread, forked bit 28 of the processor 1-i based on the thread starting request 7c from the thread controller 3, the forked bit 28 of the above processor 1-i is reset, the thread ID accompanying the thread start request 7c is set in the register 45 (Step S71b). Hereafter, fetch, decode, and execution of a thread instruction are continuously performed (Step S72).

When the instruction decoded by the execution unit 23 is a fork instruction (YES in Step S74), the execution unit 23 makes this fork instruction invalid if the forked bit 28 is set at 1 (YES in Step S75) and executes the next instruction (Step S72). While, if the forked bit 28 is set at 0 (NO in Step S75), the execution unit 23 stores the fork destination address into the register 27 and stores (overwrites) the thread ID specified by the fork instruction into the register 45 (Step S76c), and sends the fork request 7a accompanied by the fork destination address stored in this register 27 and the thread ID stored in the register 45 to the thread controller 3 (Step S77). The thread controller 3 returns the fork reply 7b to the processor 1-i of the request source if a fork toward the neighboring processor 1-j is possible, and sends the thread starting request 7c with the fork destination address and the thread ID attached there, to the neighboring processor 1-j. The processor 1-i receiving the fork reply 7b sets the forked bit 28 at 1, and performs the register-value inheritance to transfer the content of the register file 25 of the parent thread to the register file of the fork destination processor 1-j through the communication bus 6 by the register transfer unit 26 (Step S81). The processing of Step S71 and later in FIG. 36 will be executed in the fork destination processor 1-j.

On the other hand, the thread controller 3 abandons the fork request 7a sent from the processor 1-i if a fork toward the neighboring processor 1-j is possible. Accordingly, this fork instruction executed by the processor 1-i is made invalid, and the fork of a child thread according to the above fork instruction is abandoned.

When the instruction decoded by the execution unit 23 is a term instruction (YES in Step S121), the execution unit 23 sends the thread finishing notice 7d to the thread controller 3 (Step S79), by executing the term instruction when the forked bit 28 is set at 1 and the thread ID specified by the term instruction is coincident with the thread ID stored in the register 45 (YES in Steps S122 and S123), and finishes the processing of the thread when receiving the thread finish permission 7e from the thread controller 3 (Step S80). When the forked bit 28 is not set at 1 or the thread ID specified by the term instruction is not coincident with the thread ID stored in the register 45, the above term instruction is made invalid and the execution unit 23 continues to execute the instruction according to the PC 21 (Step S72).

In this embodiment, since each processor finishes the processing of a thread according to the term instruction, the parallel code inserting unit 450 in the compiler 410 of FIG. 10 inserts a term instruction having the same thread ID as the thread ID attached to the fork instruction to fork a child thread, just before the starting point of the child thread.

Similarly to this embodiment, the second and the fifth embodiments can be modified so that each processor can finish the processing of a thread according to a term instruction corresponding to a fork instruction having forked the effective child thread, of the term instructions inserted just before the fork destination addresses within the parallel program correspondingly to the respective fork instructions.

As mentioned above, the second invention enables the multi-thread execution by the Fork-Once Parallel Execution model even in a parallel program without assurance of the Fork-Once limitation. Further, a processor starting the execution of a parent thread can make invalid all the fork instructions other than the fork instruction having succeeded in a fork of a child thread at first, thereby assuring the Fork-Once limitation at a time of program execution. Therefore, the operation is decisive and the control is easy.

As mentioned above, although the present invention has been described taking some embodiments as an example, the present invention is not restricted to the above embodiments, but various modifications are possible. For example, in the respective embodiments, although the present invention is adopted to a concentrated thread control-typed parallel processing system with the common thread controller 3 provided for a plurality of processors, the present invention can be adopted to a distributed thread control typed parallel processing system with each thread controller provided for every processor as described in the article 1. Further, although the processors are connected together through the communication bus 6, the present invention is applicable to a parallel processing system formed by connecting the adjacent processors with each other through a communication line in a ring shape, in a ring fork model.

As mentioned above, the present invention can obtain a multi-thread executing method and a parallel program processing system capable of assuring the Fork-Once limitation at a time of program execution, even in a parallel program without assurance of the Fork-Once limitation and remove the Fork-Once limitation at a compile state.

Both the first invention and the second invention have such an effect that the operation of assuring the Fork-Once limitation at a time of program execution is decisive and that the control is easy.

The second invention has the effect of enabling the control dependency speculation processing without a thread abort instruction.

The first and third embodiments of the first and second inventions can prevent from an increase of the hardware amount because of provision of the save buffer and an increase of overhead at a time of switching the process of OS, and perform the processing of a program without any problem and without any interruption of the processing, even in the case where there is no free processor that can generate a child thread at a time of a fork instruction of a parent thread.

According to the second embodiment of the first and second inventions, even if a fork is impossible at a time of a fork instruction, when a free processor that can start the execution of a child thread appears before the register file is updated, the fork becomes possible. This can increase the probability of a fork more than in the first embodiment and improve the parallelism of thread execution.

According to the third embodiment of the first and second inventions, even if the register file of a parent thread is updated, if this update is not performed on a register to be inherited by a child thread, a fork is executed. This can increase the probability of a fork more than in the second embodiment and improve the parallelism of thread execution much more.

According to the first and fifth embodiments of the first and second inventions, it is not necessary to put a term instruction just before the starting point of a child thread. This elimination of a term instruction makes a program compact in size, the capacity necessary for an instruction memory can be reduced, and the number of instruction fetches can be reduced, thereby improving the performance.

The sixth embodiment of the first and second inventions can execute a program with a term instruction put just before the starting point of a child thread, like the conventional program, without any problem.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A multi-thread executing method of dividing a single program into a plurality of threads and executing the program by a plurality of processors in parallel, comprising the following steps in which:
    each of said processors assures Fork-Once limitation at a time of program execution, by selecting one fork instruction for creating an effective child thread from a plurality of fork instructions existing within a parent thread, during execution of said parent thread; and
    said processor having generated an effective child thread finishes processing of a thread by executing an instruction up to an address just before a starting address of said effective child thread,
    wherein when there already exists a child thread generated from said parent thread for every fork instruction of said parent thread, said child thread is cancelled and
    wherein when said first fork instruction has succeeded in forking a child thread, making invalid all said fork instructions other than said first fork instruction having succeeded in forking a child thread, in a processor having started execution of said parent thread.

2. The multi-thread executing method as set forth in claim 1, comprising a step of
    finishing said processing of a thread in said processor, according to a term instruction corresponding to a fork instruction having forked said effective child thread, of said term instructions inserted just before fork destination addresses within a parallel program correspondingly to said respective fork instructions.

3. The multi-thread executing method as set forth in claim 1, comprising a step of
    finishing said processing of a thread in said processor, on condition that a value of a program counter is coincident with said starting address of said effective child thread.

4. The multi-thread executing method as set forth in claim 1, comprising a step of
    waiting said execution of said fork instruction until said other processor capable of starting the execution of said child thread appears after execution of said parent thread starts in one processor when there exists no other processor capable of starting execution of a child thread at a time of a fork instruction.

5. The multi-thread executing method as set forth in claim 1, comprising a step of after execution of said parent thread starts in one processor, when there exists no other processor capable of starting execution of a child thread at a time of a fork instruction, saving content of a register file of said parent thread and performing a fork of a child thread based on said saved information if said other processor capable of starting the execution of said child thread appears.

6. The multi-thread executing method as set forth in claim 1, comprising a step of
making such a fork instruction invalid that has no other processor capable of starting execution of a child thread at a time of every fork instruction, after execution of said parent thread starts in one processor.

7. The multi-thread executing method as set forth in claim 1, comprising a step of
making such a fork instruction invalid that has no other processor capable of starting execution of a child thread at a time of every fork instruction and before a register file of said parent thread is updated, after execution of said parent thread starts in one processor.

8. The multi-thread executing method as set forth in claim 1, comprising a step of
making such a fork instruction invalid that has no other processor capable of starting execution of a child thread at a time of every fork instruction and before a register to be inherited by a child thread, of said registers of a register file of said parent thread, is updated, after execution of said parent thread starts in one processor.

9. A multi-thread executing method in a parallel processing system which has a plurality of processors for fetching, decoding, and executing instructions of threads simultaneously according to a program counter, each of said processors having a temporary buffer capable of canceling execution of a thread, and which is provided with a function of starting the execution of a child thread starting from a fork destination address specified by a fork instruction within a parent thread executed by one of said processors, in a fork destination processor concerned with said parent thread executing processor, by making said child thread inherit at least a value of a register necessary for said child thread, of a register file of said parent thread, the method comprising:
assuring Fork-Once limitation at a time of program execution by following steps of
(a) starting the execution of said parent thread in said processor, with a forked bit provided in said processor reset;
(b) storing said fork destination address into a register provided in said processor at a time of every fork instruction in said parent thread; when said forked bit is reset, forking said child thread to said fork destination processor and then setting said forked bit if said fork destination processor in said processor is free; while making said fork instruction invalid if said fork destination processor is busy; when said forked bit is set, canceling said thread execution of said fork destination processor and forking said child thread to said fork destination processor; and
(c) finishing the processing of a thread in said processor in which said forked bit is set and a value of a program counter is coincident with said fork destination address stored in said register.

10. The multi-thread executing method as set forth in claim 9, comprising
a step of finishing the processing of a thread in said processor, according to a term instruction corresponding to a fork instruction having forked an effective child thread, of said term instructions inserted just before said fork destination addresses within a parallel program correspondingly to the respective fork instructions, instead of said step of finishing the processing of a thread in said processor in which said forked bit is set and the value of said program counter is coincident with said fork destination address stored in said register.

11. A multi-thread executing method in a parallel processing system which has a plurality of processors for fetching, decoding, and executing instructions of threads simultaneously according to a program counter, each of said processors having a temporary buffer capable of canceling execution of a thread, and which is provided with a function of starting the execution of a child thread starting from a fork destination address specified by a fork instruction within a parent thread executed by one of said processors, in a fork destination processor concerned with said parent thread executing processor, by making said child thread inherit at least a value of a register necessary for said child thread, of a register file of said parent thread, the method comprising:
assuring Fork-Once limitation at a time of program execution by following steps of
(a) starting the execution of said parent thread in said processor, with a forked bit and a fork active bit provided in said processor reset;
(b) storing said fork destination address into a register provided in said processor at a time of every fork instruction within said parent thread and setting said fork active bit;
(c) resetting said fork active bit when said register file of said parent thread is updated;
(d) when said fork active bit of said processor is set and said forked bit is reset, forking said child thread to said fork destination processor if said fork destination processor turns free, then setting said forked bit and resetting said fork active bit, while when said forked bit is set, canceling the thread execution of said fork destination processor, so to fork said child thread to said fork destination processor;
(e) finishing the processing of a thread in said processor in which said forked bit is set and a value of a program counter is coincident with said fork destination address stored in said register.

12. The multi-thread executing method as set forth in claim 11, comprising
a step of finishing the processing of a thread in said processor, according to a term instruction corresponding to a fork instruction having forked an effective child thread, of the term instructions inserted just before said fork destination addresses within a parallel program correspondingly to the respective fork instructions, instead of said step of finishing the processing of a thread in said processor in which said forked bit is set and the value of said program counter is coincident with said fork destination address stored in said register.

13. A multi-thread executing method in a parallel processing system which has a plurality of processors for fetching, decoding, and executing instructions of threads simultaneously according to a program counter, each of said processors having a temporary buffer capable of canceling execution of a thread, and which is provided with a function of starting the execution of a child thread starting from a fork destination address specified by a fork instruction within a parent thread executed by one of said processors, in a fork destination processor concerned with said parent thread executing processor, by making said child thread inherit at least a value of a register necessary for said child thread, of a register file of said parent thread, the method comprising:

assuring Fork-Once limitation at a time of program execution by following steps of
(a) starting the execution of said parent thread in said processor, with a forked bit and a fork active bit provided in said processor reset;
(b) storing said fork destination address into a register provided in said processor at a time of every fork instruction within said parent thread and setting said fork active bit;
(c) resetting said fork active bit when a register to be inherited by said child thread, of said registers within said register file of said parent thread, is updated;
(d) when said fork active bit of said processor is set and said forked bit is reset, forking said child thread to said fork destination processor if said fork destination processor turns free, then setting said forked bit and resetting said fork active bit, while when said forked bit is set, canceling said thread execution of said fork destination processor, so to fork said child thread to said fork destination processor;
(e) finishing the processing of a thread in said processor in which said forked bit is set and a value of a program counter is coincident with said fork destination address stored in said register.

14. The multi-thread executing method as set forth in claim 13, comprising a step of finishing the processing of a thread in said processor, according to a term instruction corresponding to a fork instruction having forked an effective child thread, of said term instructions inserted just before said fork destination addresses within a parallel program correspondingly to the respective fork instructions, instead of said step of finishing the processing of a thread in said processor in which said forked bit is set and the value of said program counter is coincident with said fork destination address stored in said register.

15. A multi-thread executing method in a parallel processing system which has a plurality of processors for fetching, decoding, and executing instructions of threads simultaneously according to a program counter, each of said processors having a temporary buffer capable of canceling execution of a thread, and which is provided with a function of starting the execution of a child thread starting from a fork destination address specified by a fork instruction within a parent thread executed by one of said processors, in a fork destination processor concerned with said parent thread executing processor, by making said child thread inherit at least a value of a register necessary for said child thread, of a register file of said parent thread, the method comprising:

assuring Fork-Once limitation at a time of program execution by following steps of
(a) starting the execution of said parent thread in said processor, with a forked bit provided in said processor reset;
(b) storing said fork destination address into a register provided in said processor at a time of every fork instruction within said parent thread; when said forked bit is reset, if said fork destination processor of said processor is free, immediately forking said child thread to said fork destination processor; while if said processor is not free, waiting said fork instruction until said processor turns free, then forking said child thread to said fork destination processor, and setting said forked bit; when said forked bit is set, canceling said thread execution of said fork destination processor so to fork said child thread to said fork destination processor; and
(c) finishing the processing of a thread in said processor in which said forked bit is set and a value of a program counter is coincident with said fork destination address stored in said register.

16. The multi-thread executing method as set forth in claim 15, comprising a step of finishing the processing of a thread in said processor, according to a term instruction corresponding to a fork instruction having forked an effective child thread, of the term instructions inserted just before said fork destination addresses within a parallel program correspondingly to said respective fork instructions, instead of said step of finishing the processing of a thread in said processor in which said forked bit is set and the value of said program counter is coincident with said fork destination address stored in said register.

17. A multi-thread executing method in a parallel processing system which has a plurality of processors for fetching, decoding, and executing instructions of threads simultaneously according to a program counter, each of said processors having a temporary buffer capable of canceling execution of a thread, and which is provided with a function of starting the execution of a child thread starting from a fork destination address specified by a fork instruction within a parent thread executed by one of said processors, in a fork destination processor concerned with said parent thread executing processor, by making said child thread inherit at least a value of a register necessary for said child thread, of a register file of said parent thread, the method comprising:

assuring Fork-Once limitation at a time of program execution by following steps of
(a) starting the execution of said parent thread in said processor, with a forked bit provided in said processor reset;
(b) storing said fork destination address into a register provided in said processor at a time of every fork instruction within said parent thread, when said forked bit is reset, if said fork destination processor of said processor is free, immediately forking said child thread to said fork destination processor based on content of said register file and setting said forked bit; while if said fork destination processor of said processor is busy, saving the content of said register file into a save buffer provided in said processor and holding a fork of said child thread until said fork destination processor turns free; when said forked bit is set, canceling the thread execution of said fork destination processor so to fork said child thread to said fork destination processor; and
(c) finishing the processing of a thread in said processor in which said forked bit is set and a value of a program counter is coincident with said fork destination address stored in said register.

18. The multi-thread executing method as set forth in claim 17, comprising a step of finishing the processing of a thread in said processor, according to a term instruction corresponding to a fork instruction having forked an effective child thread, of the term instructions inserted just before said fork destination addresses within a parallel program correspondingly to said respective fork instructions, instead of said step of finishing the processing of a thread in said processor in which said forked bit is set and the value of said program counter is coincident with said fork destination address stored in said register.

19. A multi-thread executing method in a parallel processing system including a plurality of processors for fetching, decoding, and executing instructions of threads simultaneously according to a program counter, and provided with a function of starting the execution of a child thread starting from a fork destination address specified by a fork instruction within a parent thread executed by one of said processors, in a fork destination processor concerned with said parent thread executing processor, by making said child thread inherit at least a value of a register necessary for said child thread, of a register file of said parent thread, the method comprising:

assuring Fork-Once limitation at a time of program execution by following steps of
(a) starting the execution of said parent thread in said processor, with a forked bit provided in said processor reset;
(b) at a time of every fork instruction within said parent thread, when said forked bit is reset, if said fork destination processor concerned with said parent thread executing processor is free, forking said child thread, then setting said forked bit, and storing said fork destination address into a register provided in said processor; while if said fork destination processor is busy, making said fork instruction invalid; and when said forked bit is set, making said fork instruction invalid; and
(c) finishing the processing of a thread in said processor in which said forked bit is set and a value of a program counter is coincident with said fork destination address stored in said register.

20. The multi-thread executing method as set forth in claim 19, comprising
a step of finishing the processing of a thread in said processor, according to a term instruction corresponding to a fork instruction having forked an effective child thread, of the term instructions inserted just before said fork destination addresses within a parallel program correspondingly to the respective fork instructions, instead of said step of finishing the processing of a thread in said processor in which said forked bit is set and the value of said program counter is coincident with said fork destination address stored in said register.

21. A multi-thread executing method in a parallel processing system including a plurality of processors for fetching, decoding, and executing instructions of threads simultaneously according to a program counter, and provided with a function of starting the execution of a child thread starting from a fork destination address specified by a fork instruction within a parent thread executed by one of said processors, in a fork destination processor concerned with said parent thread executing processor, by making said child thread inherit at least a value of a register necessary for said child thread, of a register file of said parent thread, the method comprising:

assuring Fork-Once limitation at a time of program execution by following steps of
(a) starting the execution of said parent thread in said processor, with a forked bit provided in said processor reset;
(b) at a time of every fork instruction within said parent thread, when said forked bit is reset, setting said fork active bit provided in said processor and storing said fork destination address into a register provided in said processor, while when said forked bit is set, making said fork instruction invalid;
(c) resetting said fork active bit when said register file of said parent thread is updated;
(d) when said fork active bit of said processor is set, if said fork destination processor concerned with said parent thread executing processor is free, forking said child thread starting from said fork destination address stored in said register of said processor to said fork destination processor, then setting said forked bit of said processor and resetting said fork active bit; and
(e) finishing the processing of a thread in said processor in which said forked bit is set and a value of a program counter is coincident with said fork destination address stored in said register.

22. The multi-thread executing method as set forth in claim 21 comprising
a step of finishing the processing of a thread in said processor, according to a term instruction corresponding to a fork instruction having forked an effective child thread, of the term instructions inserted just before said fork destination addresses within a parallel program correspondingly to said respective fork instructions, instead of said step of finishing the processing of a thread in said processor in which said forked bit is set and the value of said program counter is coincident with said fork destination address stored in said register.

23. A multi-thread executing method in a parallel processing system including a plurality of processors for fetching, decoding, and executing instructions of threads simultaneously according to a program counter, and provided with a function of starting the execution of a child thread starting from a fork destination address specified by a fork instruction within a parent thread executed by one of said processors, in a fork destination processor concerned with said parent thread executing processor, by making said child thread inherit at least a value of a register necessary for said child thread, of a register file of said parent thread, the method comprising:

assuring Fork-Once limitation at a time of program execution by following steps of
(a) starting the execution of said parent thread in said processor, with a forked bit provided in said processor reset;
(b) at a time of every fork instruction within said parent thread, when said forked bit is reset, setting said fork active bit provided in said processor and storing said fork destination address into a register provided in said processor, while when said forked bit is set, making said fork instruction invalid;
(c) resetting said fork active bit when a register to be inherited by said child thread, of said registers of said register file of said parent thread, is updated;
(d) when said fork active bit is set, if said fork destination processor concerned with said parent thread executing processor is free, forking said child thread to said fork destination processor, then setting said forked bit and resetting said fork active bit; and
(e) finishing the processing of a thread in said processor in which said forked bit is set and a value of a program counter is coincident with said fork destination address stored in said register.

24. The multi-thread executing method as set forth in claim 23, comprising
a step of finishing the processing of a thread in said processor, according to a term instruction corresponding to a fork instruction having forked an effective child thread, of the term instructions inserted just before said fork destination addresses within a parallel program correspondingly to said respective fork instructions, instead of said step of finishing the processing of a thread in said processor in which said forked bit is set and said value of said program counter is coincident with said fork destination address stored in said register.

25. A multi-thread executing method in a parallel processing system including a plurality of processors for fetching, decoding, and executing instructions of threads simultaneously according to a program counter, and provided with a function of starting the execution of a child thread starting from a fork destination address specified by a fork instruction within a parent thread executed by one of said processors, in a fork destination processor concerned with said parent thread executing processor, by making said child thread inherit at least a value of a register necessary for said child thread, of a register file of said parent thread, the method comprising:
assuring Fork-Once limitation at a time of program execution by following steps of
(a) starting the execution of said parent thread in said processor, with a forked bit provided in said processor reset;
(b) at a time of every fork instruction within said parent thread, when said forked bit is reset, if said fork destination processor concerned with said parent thread executing processor is free, immediately forking said child thread, while if said fork destination processor is not free, waiting said fork instruction until the same processor turns free, then forking said child thread, setting said forked bit, storing said fork destination address into a register provided in said processor, while when said forked bit is set, making said fork instruction invalid;
(c) finishing the processing of a thread in said processor in which said forked bit is set and a value of a program counter is coincident with said fork destination address stored in said register.

26. The multi-thread executing method as set forth in claim 25, comprising
a step of finishing the processing of a thread in said processor, according to a term instruction corresponding to a fork instruction having forked an effective child thread, of the term instructions inserted just before said fork destination addresses within a parallel program correspondingly to said respective fork instructions, instead of said step of finishing the processing of a thread in said processor in which said forked bit is set and the value of said program counter is coincident with said fork destination address stored in said register.

27. A multi-thread executing method in a parallel processing system including a plurality of processors for fetching, decoding, and executing instructions of threads simultaneously according to a program counter, and provided with a function of starting the execution of a child thread starting from a fork destination address specified by a fork instruction within a parent thread executed by one of said processors, in a fork destination processor concerned with said parent thread executing processor, by making said child thread inherit at least a value of a register necessary for said child thread, of a register file of said parent thread, the method comprising:
assuring Fork-Once limitation at a time of program execution by following steps of
(a) starting the execution of said parent thread in said processor, with a forked bit provided in said processor reset;
(b) at a time of every fork instruction within said parent thread, when said forked bit is reset, if said fork destination processor concerned with said parent thread executing processor is free, immediately forking said child thread to a neighboring processor based on content of said register file and then setting said forked bit, while if said fork destination processor is busy, saving the content of said register file into a save buffer provided in said processor, and holding a fork of said child thread until said fork destination processor turns free, while when said forked bit is set, making said fork instruction invalid;
(c) finishing the processing of a thread in said processor in which said forked bit is set and a value of a program counter is coincident with said fork destination address stored in said register.

28. The multi-thread executing method as set forth in claim 27, comprising
a step of finishing the processing of a thread in said processor, according to a term instruction corresponding to a fork instruction having forked an effective child thread, of the term instructions inserted just before said fork destination addresses within a parallel program correspondingly to said respective fork instructions, instead of said step of finishing the processing of a thread in said processor in which said forked bit is set and the value of said program counter is coincident with said fork destination address stored in said register.

29. A parallel processing system of dividing a single program into a plurality of threads and executing said program by a plurality of processors in parallel, wherein
each of said processors comprises
means for assuring Fork-Once limitation at a time of program execution, by selecting one fork instruction for creating an effective child thread from a plurality of fork instructions existing within a parent thread, during execution of said parent thread; and
means for finishing processing of a thread by executing an instruction up to an address just before a starting address of said effective child, when said processor has generated said effective child thread, wherein
when there already exists a child thread generated from said parent thread for every fork instruction of said parent thread, said child thread is cancelled, and
wherein when said first fork instruction has succeeded in forking a child thread, a processor having started execution of said parent thread makes invalid all said fork instructions other than said first fork instruction having succeeded in forking a child thread.

30. The parallel processing system as set forth in claim 29, wherein
said processor finishes the processing of a thread according to a term instruction corresponding to a fork instruction having forked said effective child thread, of said term instructions inserted just before fork destination addresses within a parallel program correspondingly to said respective fork instructions.

31. The parallel processing system as set forth in claim 29, wherein
said processor finishes the processing of a thread on condition that a value of a program counter is coincident with said starting address of said effective child thread.

32. The parallel processing system as set forth in claim 29, wherein
after execution of said parent thread starts in one processor, when there exists no other processor capable of starting execution of a child thread at a time of a fork instruction, the execution of said fork instruction is waited until said other processor capable of starting the execution of said child thread appears.

33. The parallel processing system as set forth in claim 29, wherein
after execution of said parent thread starts in one processor, when there exists no other processor capable of starting execution of a child thread, at a time of a fork instruction, content of a register file of said parent thread is saved and when said other processor capable of starting the execution of said child thread appears, a fork of said child thread is performed based on said saved information.

34. The parallel processing system as set forth in claim 29, wherein
after execution of said parent thread starts in one processor, such a fork instruction is made invalid, that has no other processor capable of starting execution of a child thread at a time of every fork instruction.

35. The parallel processing system as set forth in claim 29, wherein
after execution of said parent thread starts in one processor, such a fork instruction is made invalid, that has no other processor capable of starting execution of a child thread at a time of every fork instruction and before a register file of said parent thread is updated.

36. The parallel processing system as set forth in claim 29, wherein
after execution of said parent thread starts in one processor, such a fork instruction is made invalid, that has no other processor capable of starting execution of a child thread at a time of every fork instruction and before a register to be inherited by a child thread, of said registers of a register file of said parent thread, is updated.

* * * * *